US006400667B1

(12) United States Patent
Utsumi et al.

(10) Patent No.: US 6,400,667 B1
(45) Date of Patent: Jun. 4, 2002

(54) RECORDING/REPRODUCTION METHOD AND APPARATUS IN WHICH SUB DATA IS WRITTEN/READ IN PERIODS DURING WHICH WRITING/READING OF MAIN DATA IS NOT PERFORMED

(75) Inventors: Yoshimasa Utsumi, Tokyo; Yasuaki Maeda, Kanagawa; Hideki Nagashima, Tokyo; Tsutomu Harada, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/414,090

(22) Filed: Oct. 7, 1999

(30) Foreign Application Priority Data

Oct. 13, 1998 (JP) .......................................... 10-291045

(51) Int. Cl.[7] .................................................. G11B 3/90
(52) U.S. Cl. .................................................... 369/53.34
(58) Field of Search ........................... 369/47.13, 47.21, 369/47.22, 47.54, 53.2, 53.24, 53.41, 124.07, 124.08, 47.32, 53.34

(56) References Cited

U.S. PATENT DOCUMENTS 5,363,362 A 11/1994 Maeda et al.
5,675,559 A 10/1997 Maeda et al.
5,768,252 A * 6/1998 Yokota ................ 369/47.54 X
5,790,484 A 8/1998 Maeda et al.

FOREIGN PATENT DOCUMENTS

| | | |
|---|---|---|
| AU | A-88371/98 | 5/1999 |
| EP | 0 165 320 A1 | 12/1985 |
| EP | 0 613 144 A2 | 8/1994 |

* cited by examiner

*Primary Examiner*—Paul W. Huber
(74) *Attorney, Agent, or Firm*—Oblon, Spivak, McClelland, Maier & Neustadt, P.C.

(57) ABSTRACT

A reproduction apparatus and method a recording apparatus and method by which two different kinds of data can be reproduced and recorded efficiently are disclosed. When main data are intermittently read in from a recording medium, periods within which reading in of the main data is not performed appear inevitably, and the periods are made use of to read in sub data from the recording medium, thereby allowing synchronized reproduction of the main data and the sub data which relate to the main data. On the other hand, when main data are intermittently written onto a recording medium, periods within which writing of the main data is not performed appear inevitably, and the periods are made use of to write sub data onto the recording medium, thereby allowing parallel recording of the main data and the sub data.

30 Claims, 32 Drawing Sheets

FIG. 3B COMPACTED TYPE

EXAMPLE OF ADDRESS

|  | CLUSTER | SECTOR | SOUND GROUP |
|---|---|---|---|
| | 0032h | 00h | 0h |
| | 0000000000110010 | 00000000 | 0000 |

| | | |
|---|---|---|
| COMPACTED | 00h | C8h |
| | 00000000 | 11001000 | 00000000 |

| | CLUSTER | SECTOR | SOUND GROUP |
|---|---|---|---|
| | 0032h | 04h | 0h |
| | 0000000000110010 | 00000100 | 0000 |

| | | |
|---|---|---|
| COMPACTED ABSOLUTE ADDRESS | 00h | C8h | 40h |
| | 00000000 | 11001000 | 01000000 |

| | | |
|---|---|---|
| COMPACTED OFFSET ADDRESS | 00h | 00h | 40h |
| | 00000000 | 00000000 | 01000000 |

Figures 4F, 4G, 4H:
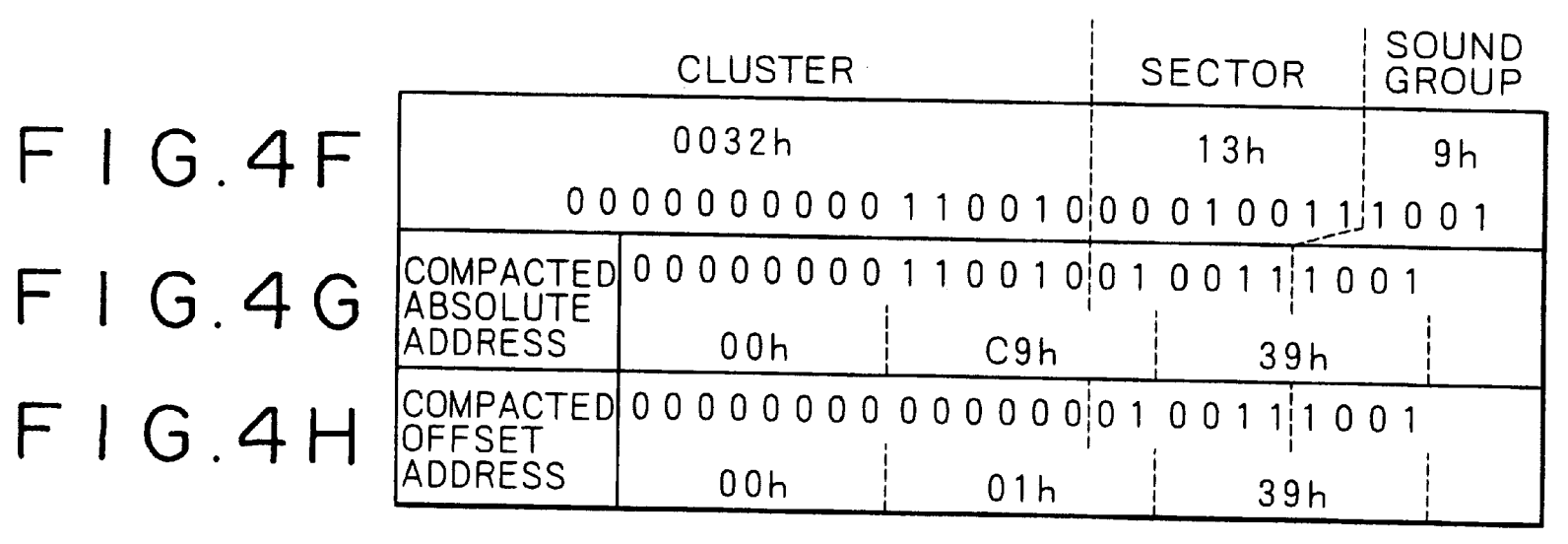

| | CLUSTER | SECTOR | SOUND GROUP |
|---|---|---|---|
| FIG.4F | 0032h<br>0 0 0 0 0 0 0 0 0 0 1 1 0 0 1 0 | 13h<br>0 0 0 1 0 0 1 1 | 9h<br>1 0 0 1 |

| | | | | |
|---|---|---|---|---|
| FIG.4G | COMPACTED ABSOLUTE ADDRESS | 0 0 0 0 0 0 0 0 1 1 0 0 1 0 0 1 0 0 1 1 1 0 0 1 | | |
| | | 00h | C9h | 39h |
| FIG.4H | COMPACTED OFFSET ADDRESS | 0 0 0 0 0 0 0 0 0 0 0 0 0 0 0 1 0 0 1 1 1 0 0 1 | | |
| | | 00h | 01h | 39h |

F I G. 6

| | | ← 16bits | → | ← 16bits | → | |
|---|---|---|---|---|---|---|
| | | MSB LSB | MSB LSB | MSB LSB | MSB LSB | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (00h) | MODE (02h) | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | First TNO | Last TNO | 7 |
| | | 00000000 | 00000000 | 00000000 | Used Sectors | 8 |
| | | 00000000 | 00000000 | 00000000 | 00000000 | 9 |
| | | 00000000 | 00000000 | 00000000 | Disc Serial No | 10 |
| POINTER SECTION | | Disc | ID | P-DFA | P-EMPTY | 11 |
| POINTER SECTION | | P-FRA | P-TN01 | P-TN02 | P-TN03 | 12 |
| POINTER SECTION | | P-TN04 | P-TN05 | P-TN06 | P-TN07 | 13 |
| POINTER SECTION | | … | … | … | … | |
| POINTER SECTION | | P-TN0248 | P-TN0249 | P-TN0250 | P-TN0251 | 74 |
| POINTER SECTION | | P-TN0252 | P-TN0253 | P-TN0254 | P-TN0255 | 75 |
| | | 00000000 | 00000000 | 00000000 | 00000000 | 76 |
| | | 00000000 | 00000000 | 00000000 | 00000000 | 77 |
| TABLE SECTION (255 PART TABLES) | (01h) | Start address | (TRACK ADDRESS) | | TRACK MODE | 78 |
| TABLE SECTION (255 PART TABLES) | | End address | (TRACK ADDRESS) | | LINK INFORMATION | 79 |
| TABLE SECTION (255 PART TABLES) | (02h) | Start address | (TRACK ADDRESS) | | TRACK MODE | 80 |
| TABLE SECTION (255 PART TABLES) | | End address | (TRACK ADDRESS) | | LINK INFORMATION | 81 |
| TABLE SECTION (255 PART TABLES) | (03h) | Start address | (TRACK ADDRESS) | | TRACK MODE | 82 |
| TABLE SECTION (255 PART TABLES) | | End address | (TRACK ADDRESS) | | LINK INFORMATION | 83 |
| TABLE SECTION (255 PART TABLES) | | … | … | | … | |
| TABLE SECTION (255 PART TABLES) | (FCh) | Start address | (TRACK ADDRESS) | | TRACK MODE | 580 |
| TABLE SECTION (255 PART TABLES) | | End address | (TRACK ADDRESS) | | LINK INFORMATION | 581 |
| TABLE SECTION (255 PART TABLES) | (FDh) | Start address | (TRACK ADDRESS) | | TRACK MODE | 582 |
| TABLE SECTION (255 PART TABLES) | | End address | (TRACK ADDRESS) | | LINK INFORMATION | 583 |
| TABLE SECTION (255 PART TABLES) | (FEh) | Start address | (TRACK ADDRESS) | | TRACK MODE | 584 |
| TABLE SECTION (255 PART TABLES) | | End address | (TRACK ADDRESS) | | LINK INFORMATION | 585 |
| TABLE SECTION (255 PART TABLES) | (FFh) | Start address | (TRACK ADDRESS) | | TRACK MODE | 586 |
| TABLE SECTION (255 PART TABLES) | | End address | (TRACK ADDRESS) | | LINK INFORMATION | 587 |

U-TOC SECTOR 0

FIG. 8

| Section | Slot | 16bits: MSB–LSB | | 16bits: MSB–LSB | | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (01h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | 00000000 | 10 |
| POINTER SECTION | | 00000000 | 00000000 | 00000000 | P-EMPTY | 11 |
| POINTER SECTION | | 00000000 | P-TNA1 | P-TNA2 | P-TNA3 | 12 |
| POINTER SECTION | | P-TNA4 | P-TNA5 | P-TNA6 | P-TNA7 | 13 |
| POINTER SECTION | | | | | | |
| POINTER SECTION | | P-TNA248 | P-TNA249 | P-TNA250 | P-TNA251 | 74 |
| POINTER SECTION | | P-TNA252 | P-TNA253 | P-TNA254 | P-TNA255 | 75 |
| SLOT SECTION (255+1 SLOTS) | (00h) | DISC NAME | | | | 76 |
| SLOT SECTION (255+1 SLOTS) | | DISC NAME | | | LINK INFORMATION | 77 |
| SLOT SECTION (255+1 SLOTS) | (01h) | DISC NAME/TRACK NAME | | | | 78 |
| SLOT SECTION (255+1 SLOTS) | | DISC NAME/TRACK NAME | | | LINK INFORMATION | 79 |
| SLOT SECTION (255+1 SLOTS) | (02h) | DISC NAME/TRACK NAME | | | | 80 |
| SLOT SECTION (255+1 SLOTS) | | DISC NAME/TRACK NAME | | | LINK INFORMATION | 81 |
| SLOT SECTION (255+1 SLOTS) | (03h) | DISC NAME/TRACK NAME | | | | 82 |
| SLOT SECTION (255+1 SLOTS) | | DISC NAME/TRACK NAME | | | LINK INFORMATION | 83 |
| SLOT SECTION (255+1 SLOTS) | | | | | | |
| SLOT SECTION (255+1 SLOTS) | (FEh) | DISC NAME/TRACK NAME | | | | 584 |
| SLOT SECTION (255+1 SLOTS) | | DISC NAME/TRACK NAME | | | LINK INFORMATION | 585 |
| SLOT SECTION (255+1 SLOTS) | (FFh) | DISC NAME/TRACK NAME | | | | 586 |
| SLOT SECTION (255+1 SLOTS) | | DISC NAME/TRACK NAME | | | LINK INFORMATION | 587 |

U-TOC SECTOR 1

FIG. 9

| | 16bits: MSB | LSB | 16bits: MSB | LSB | |
|---|---|---|---|---|---|
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (02h) | MODE | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | 00000000 | 00000000 | 00000000 | 00000000 | 7 |
| | 00000000 | 00000000 | 00000000 | 00000000 | 8 |
| | 00000000 | 00000000 | 00000000 | 00000000 | 9 |
| | 00000000 | 00000000 | 00000000 | 00000000 | 10 |
| POINTER SECTION | 00000000 | 00000000 | 00000000 | P-EMPTY | 11 |
| | 00000000 | P-TRD1 | P-TRD2 | P-TRD3 | 12 |
| | P-TRD4 | P-TRD5 | P-TRD6 | P-TRD7 | 13 |
| | … | … | … | … | |
| | P-TRD248 | P-TRD249 | P-TRD250 | P-TRD251 | 74 |
| | P-TRD252 | P-TRD253 | P-TRD254 | P-TRD255 | 75 |
| SLOT SECTION 255+1 SLOTS (00h) | DISC RECORDING DATE/TIME | | | | 76 |
| | | | MAKER CODE | MODEL CODE | 77 |
| (01h) | DISC RECORDING DATE/TIME | | | | 78 |
| | | | MAKER CODE | MODEL CODE | 79 |
| (02h) | DISC RECORDING DATE/TIME | | | | 80 |
| | | | MAKER CODE | MODEL CODE | 81 |
| (03h) | DISC RECORDING DATE/TIME | | | | 82 |
| | | | MAKER CODE | MODEL CODE | 83 |
| | … | … | … | … | |
| (FEh) | DISC RECORDING DATE/TIME | | | | 584 |
| | | | MAKER CODE | LINK INFORMATION | 585 |
| (FFh) | DISC RECORDING DATE/TIME | | | | 586 |
| | | | MAKER CODE | LINK INFORMATION | 587 |

U-TOC SECTOR 2

FIG.10

| | | 16bits: MSB LSB | MSB LSB | 16bits: MSB LSB | MSB LSB | |
|---|---|---|---|---|---|---|
| HEADER | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | ClusterH | ClusterL | Sector (04h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | char.code | 10 |
| POINTER SECTION | | 00000000 | 00000000 | 00000000 | P-EMPTY | 11 |
| | | 00000000 | P-TNA1 | P-TNA2 | P-TNA3 | 12 |
| | | P-TNA4 | P-TNA5 | P-TNA6 | P-TNA7 | 13 |
| | | P-TNA248 | P-TNA249 | P-TNA250 | P-TNA251 | 74 |
| | | P-TNA252 | P-TNA253 | P-TNA254 | P-TNA255 | 75 |
| SLOT SECTION (255+1 SLOTS) | (00h) | DISC NAME | | | | 76 |
| | | DISC NAME | | | LINK INFORMATION | 77 |
| | (01h) | DISC NAME/TRACK NAME | | | | 78 |
| | | DISC NAME/TRACK NAME | | | LINK INFORMATION | 79 |
| | (02h) | DISC NAME/TRACK NAME | | | | 80 |
| | | DISC NAME/TRACK NAME | | | LINK INFORMATION | 81 |
| | (03h) | DISC NAME/TRACK NAME | | | | 82 |
| | | DISC NAME/TRACK NAME | | | LINK INFORMATION | 83 |
| | (FEh) | DISC NAME/TRACK NAME | | | | 584 |
| | | DISC NAME/TRACK NAME | | | LINK INFORMATION | 585 |
| | (FFh) | DISC NAME/TRACK NAME | | | | 586 |
| | | DISC NAME/TRACK NAME | | | LINK INFORMATION | 587 |

U-TOC SECTOR 4

FIG. 11

| | 16bits even m: Wm B | 16bits even m: Wm A | 16bits odd m: Wm B | 16bits odd m: Wm A | |
|---|---|---|---|---|---|
| | MSB LSB | MSB LSB | MSB LSB | MSB LSB | |
| | d1 d8 | d1 d8 | d1 d8 | d1 d8 | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | ClusterH | ClusterL | Sector (00h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | (00h) | (00h) | 7 |
| | Used Sector3 | Used Sector2 | Used Sector1 | Used Sector0 | 8 |
| | (00h) | (00h) | (00h) | (00h) | 9 |
| | (00h) | (00h) | (00h) | (00h) | 10 |
| POINTER SECTION | (00h) | (00h) | (00h) | (P-EMPTY) | 11 |
| POINTER SECTION | (P-BLANK) | (00h) | (00h) | (00h) | 12 |
| | (00h) | (00h) | (00h) | (00h) | 13 |
| | (00h) | (00h) | (00h) | (00h) | 14 |
| | (00h) | (00h) | (00h) | (00h) | 15 |
| | (00h) | (00h) | (00h) | (00h) | 16 |
| | | | | | |
| | (00h) | (00h) | (00h) | (00h) | 74 |
| | (00h) | (00h) | (00h) | (00h) | 75 |
| | (00h) | (00h) | (00h) | (00h) | 76 |
| | (00h) | (00h) | (00h) | (00h) | 77 |
| TABLE SECTION (99 PART TABLES) (01h) | Start address | | | (00h) | 78 |
| | End address | | | LINK INFORMATION | 79 |
| (02h) | Start address | | | (00h) | 80 |
| | End address | | | LINK INFORMATION | 81 |
| (03h) | Start address | | | (00h) | 82 |
| | End address | | | LINK INFORMATION | 83 |
| (04h) | Start address | | | (00h) | 84 |
| | End address | | | LINK INFORMATION | 85 |
| . . . | | | | | 86 |
| (63h) | Start address | | | (00h) | 274 |
| | End address | | | LINK INFORMATION | 275 |
| (64h) | (zeros) | | | | 276 |
| | (zeros) | | | | 277 |
| . . . | (zeros) | | | | |
| (FFh) | (zeros) | | | | 586 |
| | (zeros) | | | | 587 |

AUX-TOC SECTOR 0
(AREA ALLOCATION TABLE)

FIG. 12

| Section | Part | 16bits even m: Wm B (MSB d1 … LSB d8) | 16bits even m: Wm A (MSB d1 … LSB d8) | 16bits odd m: Wm B (MSB d1 … LSB d8) | 16bits odd m: Wm A (MSB d1 … LSB d8) | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (01h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First PNO | Last PNO | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER SECTION | | (00h) | (00h) | (00h) | (P-EMPTY) | 11 |
| POINTER SECTION | | (P-PFRA) | P-PN01 | P-PN02 | P-PN03 | 12 |
| POINTER SECTION | | P-PN04 | P-PN05 | P-PN06 | P-PN07 | 13 |
| POINTER SECTION | | | | | | |
| POINTER SECTION | | P-PN092 | P-PN093 | P-PN094 | P-PN095 | 35 |
| POINTER SECTION | | P-PN096 | P-PN097 | P-PN098 | P-PN099 | 36 |
| | | (00h) | (00h) | (00h) | (00h) | 37 |
| | | | | | | |
| | | (00h) | (00h) | (00h) | (00h) | 74 |
| | | (00h) | (00h) | (00h) | (P-PN0255) | 75 |
| TABLE SECTION (99+1 PART TABLES) | (00h) | Start address (cover picture) | | | S.Pict.MODE | 76 |
| TABLE SECTION (99+1 PART TABLES) | | End address | | | (00h) | 77 |
| TABLE SECTION (99+1 PART TABLES) | (01h) | Start address | | | S.Pict.MODE | 78 |
| TABLE SECTION (99+1 PART TABLES) | | End address | | | (00h) | 79 |
| TABLE SECTION (99+1 PART TABLES) | (02h) | Start address | | | S.Pict.MODE | 80 |
| TABLE SECTION (99+1 PART TABLES) | | End address | | | (00h) | 81 |
| TABLE SECTION (99+1 PART TABLES) | (03h) | Start address | | | S.Pict.MODE | 82 |
| TABLE SECTION (99+1 PART TABLES) | | End address | | | (00h) | 83 |
| TABLE SECTION (99+1 PART TABLES) | (04h) | Start address | | | S.Pict.MODE | 84 |
| TABLE SECTION (99+1 PART TABLES) | . | End address | | | (00h) | 85 |
| TABLE SECTION (99+1 PART TABLES) | . | | | | | 86 |
| TABLE SECTION (99+1 PART TABLES) | . | | | | | |
| TABLE SECTION (99+1 PART TABLES) | (63h) | Start address | | | (00h) | 274 |
| TABLE SECTION (99+1 PART TABLES) | | End address | | | LINK INFORMATION | 275 |
| | (64h) | (zeros) | | | | 276 |
| | . | (zeros) | | | | 277 |
| | . | (zeros) | | | | |
| | . | | | | | |
| | (FFh) | (zeros) | | | | 586 |
| | | (zeros) | | | | 587 |

AUX-TOC SECTOR 1
(PICTRE ALLOCATION TABLE)

FIG. 13

| | | 16bits even m: Wm B | 16bits even m: Wm A | 16bits odd m: Wm B | 16bits odd m: Wm A | |
|---|---|---|---|---|---|---|
| | | MSB LSB | MSB LSB | MSB LSB | MSB LSB | |
| | | d1 d8 | d1 d8 | d1 d8 | d1 d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (02h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First PIF | Last PIF | 7 |
| | | (00h) | (00h) | (00h) | (00h) | 8 |
| | | (00h) | (00h) | (00h) | (00h) | 9 |
| | | (00h) | (00h) | (00h) | char. code | 10 |
| POINTER SECTION | | (00h) | (00h) | (00h) | (P-EMPTY) | 11 |
| POINTER SECTION | | (00h) | P-PIF1 | P-PIF2 | P-PIF3 | 12 |
| POINTER SECTION | | P-PIF4 | P-PIF5 | P-PIF6 | P-PIF7 | 13 |
| POINTER SECTION | | P-PIF92 | P-PIF93 | P-PIF94 | P-PIF95 | 35 |
| POINTER SECTION | | P-PIF96 | P-PIF97 | P-PIF98 | P-PIF99 | 36 |
| | | (00h) | (00h) | (00h) | (00h) | 37 |
| | | (00h) | (00h) | (00h) | (00h) | 74 |
| | | (00h) | (00h) | (00h) | (P-PIF255) | 75 |
| TABLE SECTION (255+1 SLOTS) | (00h) | Cover Picture information | | | | 76 |
| TABLE SECTION (255+1 SLOTS) | | Cover Picture information | | | LINK INFORMATION | 77 |
| TABLE SECTION (255+1 SLOTS) | (01h) | Cover Picture or still Picture information | | | | 78 |
| TABLE SECTION (255+1 SLOTS) | | Cover Picture or still Picture information | | | LINK INFORMATION | 79 |
| TABLE SECTION (255+1 SLOTS) | (02h) | Cover Picture or still Picture information | | | | 80 |
| TABLE SECTION (255+1 SLOTS) | | Cover Picture or still Picture information | | | LINK INFORMATION | 81 |
| TABLE SECTION (255+1 SLOTS) | (03h) | Cover Picture or still Picture information | | | | 82 |
| TABLE SECTION (255+1 SLOTS) | | Cover Picture or still Picture information | | | LINK INFORMATION | 83 |
| TABLE SECTION (255+1 SLOTS) | (04h) | Cover Picture or still Picture information | | | | 84 |
| TABLE SECTION (255+1 SLOTS) | | Cover Picture or still Picture information | | | LINK INFORMATION | 85 |
| TABLE SECTION (255+1 SLOTS) | ⋮ | | | | | 86 |
| TABLE SECTION (255+1 SLOTS) | (63h) | Cover Picture or still Picture information | | | | 274 |
| TABLE SECTION (255+1 SLOTS) | | Cover Picture or still Picture information | | | LINK INFORMATION | 275 |
| TABLE SECTION (255+1 SLOTS) | (64h) | Cover Picture or still Picture information | | | | 276 |
| TABLE SECTION (255+1 SLOTS) | | Cover Picture or still Picture information | | | LINK INFORMATION | 277 |
| TABLE SECTION (255+1 SLOTS) | (FFh) | Cover Picture or still Picture information | | | | 586 |
| TABLE SECTION (255+1 SLOTS) | | Cover Picture or still Picture information | | | LINK INFORMATION | 587 |

AUX-TOC SECTOR 2
(PICTURE INFORMATION TABLE)

FIG. 14

| | | 16bits even m: Wm B | 16bits even m: Wm A | 16bits odd m: Wm B | 16bits odd m: Wm A | |
|---|---|---|---|---|---|---|
| | | MSB d1 … LSB d8 | MSB d1 … LSB d8 | MSB d1 … LSB d8 | MSB d1 … LSB d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (03h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First TNP | Last TNP | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER SECTION | | (00h) | (00h) | (00h) | (P-EMPTY) | 11 |
| POINTER SECTION | | (00h) | P-TNP1 | P-TNP2 | P-TNP3 | 12 |
| POINTER SECTION | | P-TNP4 | P-TNP5 | P-TNP6 | P-TNP7 | 13 |
| POINTER SECTION | | … | … | … | … | |
| POINTER SECTION | | P-TNP92 | P-TNP93 | P-TNP94 | P-TNP95 | 35 |
| POINTER SECTION | | P-TNP96 | P-TNP97 | P-TNP98 | P-TNP99 | 36 |
| | | (00h) | (00h) | (00h) | (00h) | 37 |
| | | … | … | … | … | |
| | | (00h) | (00h) | (00h) | (00h) | 74 |
| | | (00h) | (00h) | (00h) | (P-TNP255) | 75 |
| TABLE SECTION (99+1 SLOTS) | (00h) | zeros | | | P-PNOj | 76 |
| TABLE SECTION (99+1 SLOTS) | | zeros | | | LINK INFORMATION | 77 |
| TABLE SECTION (99+1 SLOTS) | (01h) | Start offset address | | | P-PNOj | 78 |
| TABLE SECTION (99+1 SLOTS) | | End offset address | | | LINK INFORMATION | 79 |
| TABLE SECTION (99+1 SLOTS) | (02h) | Start offset address | | | P-PNOj | 80 |
| TABLE SECTION (99+1 SLOTS) | | End offset address | | | LINK INFORMATION | 81 |
| TABLE SECTION (99+1 SLOTS) | (03h) | Start offset address | | | P-PNOj | 82 |
| TABLE SECTION (99+1 SLOTS) | | End offset address | | | LINK INFORMATION | 83 |
| TABLE SECTION (99+1 SLOTS) | (04h) | Start offset address | | | P-PNOj | 84 |
| TABLE SECTION (99+1 SLOTS) | | End offset address | | | LINK INFORMATION | 85 |
| TABLE SECTION (99+1 SLOTS) | ⋮ | | | | | 86 |
| TABLE SECTION (99+1 SLOTS) | | … | | | … | |
| TABLE SECTION (99+1 SLOTS) | (63h) | Start address | | | P-PNOj | 274 |
| TABLE SECTION (99+1 SLOTS) | | End address | | | LINK INFORMATION | 275 |
| TABLE SECTION (99+1 SLOTS) | (64h) | (zeros) | | | | 276 |
| | | (zeros) | | | | 277 |
| | | (zeros) | | | | |
| | ⋮ | … | | | | |
| | (FFh) | (zeros) | | | | 586 |
| | | (zeros) | | | | 587 |

AUX-TOC SECTOR 3
(PICTURE PLAYBACK SEQUENCE TABLE)

FIG. 15

| Section | | 16bits even m: Wm B (MSB d1 … LSB d8) | 16bits even m: Wm A (MSB d1 … LSB d8) | 16bits odd m: Wm B (MSB d1 … LSB d8) | 16bits odd m: Wm A (MSB d1 … LSB d8) | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (04h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First TXNO | Last TXNO | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER SECTION | | (00h) | (00h) | (00h) | (P-EMPTY) | 11 |
| POINTER SECTION | | (P-PFRA) | P-TXN01 | P-TXN02 | P-TXN03 | 12 |
| POINTER SECTION | | P-TXN04 | P-TXN05 | P-TXN06 | P-TXN07 | 13 |
| POINTER SECTION | | … | … | … | … | |
| POINTER SECTION | | P-TXN092 | P-TXN093 | P-TXN094 | P-TXN095 | 35 |
| POINTER SECTION | | P-TXN096 | P-TXN097 | P-TXN098 | P-TXN099 | 36 |
| | | (00h) | (00h) | (00h) | (00h) | 37 |
| | | … | … | … | … | |
| | | (00h) | (00h) | (00h) | (00h) | 74 |
| | | (00h) | (00h) | (00h) | (P-TXN0255) | 75 |
| TABLE SECTION (99+1 PART TABLES) | (00h) | Start address (cover text) | | | Text MODE | 76 |
| | | End address | | | LINK INFORMATION | 77 |
| | (01h) | Start address | | | Text MODE | 78 |
| | | End address | | | LINK INFORMATION | 79 |
| | (02h) | Start address | | | Text MODE | 80 |
| | | End address | | | LINK INFORMATION | 81 |
| | (03h) | Start address | | | Text MODE | 82 |
| | | End address | | | LINK INFORMATION | 83 |
| | (04h) | Start address | | | Text MODE | 84 |
| | | End address | | | LINK INFORMATION | 85 |
| | · · · | … | | | … | 86 |
| | (63h) | Start address | | | Text MODE | 274 |
| | | End address | | | LINK INFORMATION | 275 |
| | (64h) | (zeros) | | | | 276 |
| | | (zeros) | | | | 277 |
| | | (zeros) | | | | |
| | · · | … | | | | |
| | (FFh) | (zeros) | | | | 586 |
| | | (zeros) | | | | 587 |

AUX-TOC SECTOR 4
(TEXT ALLOCATION TABLE)

FIG.16

| | 16bits even m | | 16bits odd m | | |
|---|---|---|---|---|---|
| | Wm B | Wm A | Wm B | Wm A | |
| | MSB LSB | MSB LSB | MSB LSB | MSB LSB | |
| | d1 d8 | d1 d8 | d1 d8 | d1 d8 | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | ClusterH | ClusterL | Sector (05h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First TXIF | Last TXIF | 7 |
| | (00h) | (00h) | (00h) | (00h) | 8 |
| | (00h) | (00h) | (00h) | (00h) | 9 |
| | (00h) | (00h) | (00h) | char. code | 10 |
| POINTER SECTION | (00h) | (00h) | (00h) | (P-EMPTY) | 11 |
| POINTER SECTION | (00h) | P-TXIF1 | P-TXIF2 | P-TXIF3 | 12 |
| POINTER SECTION | P-TXIF4 | P-TXIF5 | P-TXIF6 | P-TXIF7 | 13 |
| POINTER SECTION | P-TXIF92 | P-TXIF93 | P-TXIF94 | P-TXIF95 | 35 |
| POINTER SECTION | P-TXIF96 | P-TXIF97 | P-TXIF98 | P-TXIF99 | 36 |
| | (00h) | (00h) | (00h) | (00h) | 37 |
| | (00h) | (00h) | (00h) | (00h) | 74 |
| | (00h) | (00h) | (00h) | (P-TXIF255) | 75 |
| TABLE SECTION (255+1 SLOTS) (00h) | Cover text information | | | | 76 |
| | Cover text information | | | LINK INFORMATION | 77 |
| (01h) | Cover text or text information | | | | 78 |
| | Cover text or text information | | | LINK INFORMATION | 79 |
| (02h) | Cover text or text information | | | | 80 |
| | Cover text or text information | | | LINK INFORMATION | 81 |
| (03h) | Cover text or text information | | | | 82 |
| | Cover text or text information | | | LINK INFORMATION | 83 |
| (04h) | Cover text or text information | | | | 84 |
| | Cover text or text information | | | LINK INFORMATION | 85 |
| ⋮ | | | | | 86 |
| (63h) | Cover text or text information | | | | 274 |
| | Cover text or text information | | | LINK INFORMATION | 275 |
| (64h) | Cover text or text information | | | | 276 |
| | Cover text or text information | | | LINK INFORMATION | 277 |
| ⋮ | | | | | |
| (FFh) | Cover text or text information | | | | 586 |
| | Cover text or text information | | | LINK INFORMATION | 587 |

AUX-TOC SECTOR 5
(TEXT INFORMATION TABLE)

PICTURE FILE SECTOR

TEXT FILE SECTOR

FIG. 19A

| | | |
|---|---|---|
| d1, d2 (COPY STATUS) | 0h | COPY PERMITTED |
| | 1h | COPY PERMITTED ONLY ONCE |
| | 2h | COPY PERMITTED ONLY ONCE THROUGH AUTHENTICATED BUS (COPY INHIBITED THROUGH BUS NOT AUTHENTICATED) |
| | 3h | COPY INHIBITED |
| d3 ~ d8 | Reserved(UNDEFINED) | |

S. Pict. MODE (COPY STATUS)

FIG. 19B

| | BEFORE COPY | AFTER COPY |
|---|---|---|
| COPY STATUS | 0h (COPY PERMITTED) | 0h (COPY PERMITTED) |
| | 1h (COPY PERMITTED ONLY ONCE) | 3h (COPY INHIBITED) |
| | 2h (COPY PERMITTED ONLY ONCE THROUGH AUTHENTICATED BUS) | 3h (COPY INHIBITED) |
| | 3h (COPY INHIBITED) | —— |

COPY STATUS UPDATING TABLE

DATA STRUCTURE OF PICTURE (TEXT) INFORMATION FILE

FIG. 21

| | | |
|---|---|---|
| d1, d2 (COPY STATUS) | 0h | COPY PERMITTED |
| | 1h | COPY PERMITTED ONLY ONCE |
| | 2h | COPY PERMITTED ONLY ONCE THROUGH AUTHENTICATED BUS (COPY INHIBITED THROUGH BUS NOT AUTHENTICATED) |
| | 3h | COPY INHIBITED |
| d3, d4 | 0h | sung text |
| | 1h | ARTIST INFORMATION |
| | 2h | LINER NOTE |
| | 3h | OTHERS |
| d5 | 0 | TIME STAMP ABSENT |
| | 1 | TIME STAMP PRESENT |
| d6, d7, d8 | 0h | ASCII |
| | 1h | modified ISO 8859-1 |
| | 2h | Music Shifted JIS |
| | 3h | KS C 5601-1989 |
| | 4h | GB2312-80 |
| | 5h | reserved |
| | 6h | reserved |
| | 7h | plain text |

Text MODE

FIG. 25

| Section | Part | 16 bits (MSB–LSB) | (MSB–LSB) | 16 bits (MSB–LSB) | (MSB–LSB) | |
|---|---|---|---|---|---|---|
| HEADER | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | CL·H (00h) | CL·L (03h~05h) | Sector (00h) | MODE (02h) | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | F·TNO (01h) | L·TNO (03h) | 7 |
| | | 00000000 | 00000000 | 00000000 | US (01h) | 8 |
| | | 00000000 | 00000000 | 00000000 | 00000000 | 9 |
| | | 00000000 | 00000000 | 00000000 | Disc Serial No | 10 |
| POINTER SECTION | | Disc | ID | P-DFA (00h) | P-EMPTY (07h) | 11 |
| | | P-FRA (06h) | P-TN01 (01h) | P-TN02 (03h) | P-TN03 (04h) | 12 |
| | | P-TN04 (00h) | P-TN05 | P-TN06 | P-TN07 | 13 |
| | | … | … | … | … | |
| | | P-TN0248 | P-TN0249 | P-TN0250 | P-TN0251 | 74 |
| | | P-TN0252 | P-TN0253 | P-TN0254 | P-TN0255 | 75 |
| | | 00000000 | 00000000 | 00000000 | 00000000 | 76 |
| | | 00000000 | 00000000 | 00000000 | 00000000 | 77 |
| TABLE SECTION (255 PART TABLES) | (01h) | Start address | 32h. | 00h-La | TRACK MODE (06h) | 78 |
| | | End address | | Lb | LINK INFORMATION (02h) | 79 |
| | (02h) | Start address | | Lc | C6h | 80 |
| | | End address | | Ld | 00h | 81 |
| | (03h) | Start address | | Le | C6h | 82 |
| | | End address | | Lf | 00h | 83 |
| | (04h) | Start address | | Lg | C6h | 84 |
| | | End address | | Lh | 05h | 85 |
| | (05h) | Start address | | Li | C6h | 86 |
| | | End address | | Lj | 00h | 87 |
| | (06h) | Start address | | Lk | TRACK MODE | 88 |
| | | End address | 8Ch. | 1Fh | 00h | 89 |
| | (07h) | Start address | (TRACK ADDRESS) | | TRACK MODE | 90 |
| | | End address | | | 08h | 91 |
| | (08h) | Start address | (TRACK ADDRESS) | | TRACK MODE | 92 |
| | | End address | | | 09h | 93 |
| | (09h) | Start address | (TRACK ADDRESS) | | TRACK MODE | 94 |
| | | End address | | | 0Ah | 95 |
| | | … | … | … | … | |
| | (FCh) | Start address | (TRACK ADDRESS) | | TRACK MODE | 580 |
| | | End address | | | LINK INFORMATION | 581 |
| | (FDh) | Start address | (TRACK ADDRESS) | | TRACK MODE | 582 |
| | | End address | | | LINK INFORMATION | 583 |
| | (FEh) | Start address | (TRACK ADDRESS) | | TRACK MODE | 584 |
| | | End address | | | LINK INFORMATION | 585 |
| | (FFh) | Start address | (TRACK ADDRESS) | | TRACK MODE | 586 |
| | | End address | | | LINK INFORMATION | 587 |

U-TOC SECTOR 0

FIG. 26

| Section | Slot | 16bits even m: Wm B (MSB d1 … LSB d8) | 16bits even m: Wm A (MSB d1 … LSB d8) | 16bits odd m: Wm B (MSB d1 … LSB d8) | 16bits odd m: Wm A (MSB d1 … LSB d8) | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | CL·H(00h) | CL·L(07h~09h) | Sector(03h) | MODE(02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | F·TNP(01h) | L·TNP(03h) | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER SECTION | | (00h) | (00h) | (00h) | P-EMPTY(07h) | 11 |
| POINTER SECTION | | (00h) | P-TNP1(01h) | P-TNP2(04h) | P-TNP3(05h) | 12 |
| POINTER SECTION | | P-TNP4 | P-TNP5 | P-TNP6 | P-TNP7 | 13 |
| POINTER SECTION | | P-TNP92 | P-TNP93 | P-TNP94 | P-TNP95 | 35 |
| POINTER SECTION | | P-TNP96 | P-TNP97 | P-TNP98 | P-TNP99 | 36 |
| | | (00h) | (00h) | (00h) | (00h) | 37 |
| | | (00h) | (00h) | (00h) | (00h) | 74 |
| | | (00h) | (00h) | (00h) | (P-TNP255) | 75 |
| TABLE SECTION (99+1 SLOTS) | (00h) | zeros | | | P-PNOj | 76 |
| | | zeros | | | LINK INFORMATION | 77 |
| | (01h) | Start offset address (L1) | | | 01h | 78 |
| | | End offset address (all zero) | | | 02h | 79 |
| | (02h) | Start offset address (L2) | | | 02h | 80 |
| | | End offset address (all zero) | | | 03h | 81 |
| | (03h) | Start offset address (L3) | | | 04h | 82 |
| | | End offset address (all zero) | | | 00h | 83 |
| | (04h) | Start offset address (L4=0) | | | 03h | 84 |
| | | End offset address (L5) | | | 00h | 85 |
| | (05h) | Start offset address (L6) | | | 05h | 86 |
| | | End offset address (all zero) | | | 06h | 87 |
| | (06h) | Start offset address (L7) | | | 03h | 88 |
| | | End offset address (L8) | | | 00h | 89 |
| | (07h) | Start offset address | | | P-PNOj | 90 |
| | | End offset address | | | 08h | 91 |
| | (08h) | Start offset address | | | P-PNOj | 92 |
| | | End offset address | | | 09h | 93 |
| | (09h) | Start offset address | | | P-PNOj | 94 |
| | | End offset address | | | 0Ah | 95 |
| | (63h) | Start offset address | | | P-PNOj | 274 |
| | | End offset address | | | LINK INFORMATION | 275 |
| | (64h) | (zeros) | | | | 276 |
| | . | (zeros) | | | | 277 |
| | . | (zeros) | | | | 278 |
| | (FFh) | (zeros) | | | | 586 |
| | | (zeros) | | | | 587 |

AUX-TOC SECTOR 3

RECORDING/REPRODUCTION METHOD AND APPARATUS IN WHICH SUB DATA IS WRITTEN/READ IN PERIODS DURING WHICH WRITING/READING OF MAIN DATA IS NOT PERFORMED

BACKGROUND OF THE INVENTION

1. Field of the Invention

This invention relates to a reproduction apparatus and a reproduction method by which, from a recording medium on or from which main data, sub data relating to the main data, main management data indicative of recorded positions of the main data, and sub management data indicative of recorded positions of the sub data and reproduction starting timings of the sub data are recorded or reproduced, the main data and the sub data are reproduced based on the main management data and the sub management data in synchronism with each other, and a recording apparatus and a recording method by which recording of the main data and the sub data onto the recording medium is performed parallelly.

2. Description of the Related Art

As a recording apparatus and a reproduction apparatus which can record and reproduce music and so forth, a recording apparatus and a reproduction apparatus are known on which a magneto-optical disc, a magnetic tape or the like on which audio data are recorded as a digital signal is used as a recording medium.

In a recording and reproduction system in which a magneto-optical disc known as mini disc (Trade Mark) is used, a user not only can record and reproduce audio data of tunes and so forth as programs, but also can record a disc name as a title of the disc, track names as titles of the programs such as tunes recorded on the disc, and so forth as character information on the disc. For example, upon reproduction, the disc title, the titles of the tunes, the names of the artists and so forth can be displayed on a display section of a reproduction apparatus.

It is to be noted that, in the present specification, the term "program" is used to signify a unit of audio data or the like such as a tune as main data recorded on a disc. For Example, audio data for one tune make one program. Also the term "track" is used in the same significance as the "program".

A mini disc system in which a mini disc is used as a recording medium has been proposed by the Assignee of the present invention wherein a recording region into which sub data incidental to audio data as main data can be recorded is provided separately from a recording region into which the main data are recorded on a mini disc such that still picture data and character data can be recorded as the sub data. It is to be noted that the character data in the present specification include also data of symbols, marks and so forth.

For example, also a conventional mini disc system different from the mini disc system described above can record character information such as a disc name and a track name. Such character information is recorded in a corresponding relationship to each program in the U-TOC (User Table Of Contents) of a mini disc. However, since the U-TOC itself does not have a very large capacity, it merely allows recording of characters of titles and so forth.

In contrast, where a recording region for sub data is provided on a mini disc as described above, it can be realized readily to record not only character information but also video data which do not require a very large capacity such as, for example, a still picture.

As a form of utilization of sub data where a mini disc system is so configured as to record video and character information as sub data in addition to audio data as main data onto a mini disc, it seems a possible idea, for example, to prescribe a reproduction time or times of one or a plurality of data files as one or a plurality of sub data with respect to a reproduction time of a program of main data to reproduce or output the data file or files in synchronism with reproduction of the program.

More particularly, for example, it is assumed that a program of main data as a tune having a playing time of 2 minutes and two still picture files Picture #1 and #2 as sub data whose synchronous reproduction times are prescribed with respect to the program are recorded on a disc. Then, in accordance with the prescribed synchronous reproduction times the still picture file Picture #1 is displayed or outputted in synchronism for one minute of the former half of the 2-minute period within which audio reproduction of the program is performed, and the still picture file Picture #2 is displayed in synchronism for one minute of the latter half.

The configuration which allows such synchronous reproduction not only allows enjoyment of a program such as a tune reproduced as sound but allows a different manner of enjoyment such as to enjoy a still picture or characters displayed in accordance with a progress of the tune being reproduced.

Main data of programs and data files as sub data are information recorded on a disc. Accordingly, in order to effect synchronous reproduction in such a manner as described above, naturally it is necessary to read out the information of the programs and the data files and reproduce the information.

In this instance, the data of the programs are audio data and are information having continuity. Therefore, interruption in a reproduction output of such program data must be avoided as far as possible. Accordingly, in order to allow synchronized reproduction of a data file to be performed with certainty while preventing interruption in a reproduction output of a program, for example, when a disc is loaded, all data files which are prescribed to be reproduced in synchronism with programs are read out from the disc and stored into a predetermined storage area such as, for example, a memory of the mini disc system. Then, starting of reproduction of a program is enabled only after the storage of data files into the memory is completed. The configuration described is considered one of reasonable methods.

However, if the configuration described is adopted, then reproduction of a program cannot be started for a period before the storage operation of all data files into the memory is completed, for example, for several seconds although the period depends upon the sizes of all data files. Consequently, the user is obliged to wait until the storage operation of data files is completed even though the user wants to perform reproduction of a program, for example, immediately after a disc is loaded. This imposes an operational stress on the user as much.

In particular, from a point of view of the convenience in use of an apparatus, it is demanded that, in addition to the requirement that synchronized reproduction of a data file can be performed without suffering from interruption of a reproduction audio output of a program, reproduction of a program can be started as rapidly as possible, for example, after a disc is loaded.

Further, where the configuration described above is adopted, if the capacity of a data file increases, then it is required to increase also the capacity of the memory for storing data files. However, when an apparatus is constructed, an increase of the capacity of the memory gives rise to additional problems such as an increase of the number of parts, an increase of the power consumption by the increased number of parts and an increase of the part cost. Therefore, for example, where the configuration described above is applied to a portable apparatus of a small size driven by a battery, exhaustion of the battery is accelerated and miniaturization of the apparatus is hindered.

Further, if attention is paid to the convenience of use of a mini disc system apparatus which can reproduce a data file in synchronism with a program, it is inevitably demanded to make it possible to record still picture data or a character information file selected by the user as a data file to be reproduced in synchronism with a program onto a disc. In other words, for a mini disc system, it is demanded to adopt a configuration which not only allows recording of program data but also allows recording of data files. Also it is demanded to pay attention so that recording of two different kinds of data including such program data and data files as described above can be performed as efficiently as possible.

SUMMARY OF THE INVENTION

It is an object of the present invention to provide a reproduction apparatus and method and a recording apparatus and method by which two different kinds of data can be reproduced and recorded efficiently.

In order to attain the object described above, according to an aspect of the present invention, there is provided a reproduction apparatus for playing back a recording medium, on which one or a plurality of main data to be reproduced continuously with respect to time, main management data to be used for management of recorded positions of the main data, one or a plurality of sub data, and sub management data to be used for management of recorded positions and reproduction operation definitions of the sub data are recorded, based on the main management data to intermittently perform reading out of the main data from the recording medium, including main data storage means for temporarily storing the main data read out from the recording medium, and control means for intermittently reading out the main data from the recording medium based on the main management data and storing the main data into the main data storage means and for reading out the sub data from the recording medium based on the sub management data within a period within which reading of the main data is not performed and reproducing the sub data in a synchronized or non-synchronized relationship with the reproduction of the main data based on the reproduction operation definitions of the sub data managed with the sub management data.

According to another aspect of the present invention, there is provided a recording apparatus for recording onto a recording medium, which allows recording thereon of one or a plurality of main data inputted continuously with respect to time and one or a plurality of sub data and has main management data to be used for management of recorded positions of the main data and sub management data to be used for management of recorded positions of the sub data, the main data intermittently based on the main management data, including main data storage means for temporarily storing the main data, and control means for writing the main data stored in the main data storage means intermittently onto the recording medium based on the main management data and writing the sub data onto the recording medium based on the sub management data within a period within which writing of the main data is not performed.

According to a further aspect of the present invention, there is provided a reproduction method for playing back a recording medium, on which one or a plurality of main data to be reproduced continuously with respect to time, main management data to be used for management of recorded positions of the main data, one or a plurality of sub data, and sub management data to be used for management of recorded positions and reproduction operation definitions of the sub data are recorded, based on the main management data to intermittently perform reading out of the main data from the recording medium, including a step of intermittently reading out the main data from the recording medium based on the main management data, storing the main data into main data storage means provided for temporarily storing the main data, reading out the sub data from the recording medium based on the sub management data within a period within which reading of the main data is not performed, and reproducing the sub data in a synchronized or non-synchronized relationship with the reproduction of the main data based on the reproduction operation definitions of the sub data managed with the sub management data.

According to a still further aspect of the present invention, there is provided a recording method for recording onto a recording medium, which allows recording thereon of one or a plurality of main data inputted continuously with respect to time and one or a plurality of sub data and has main management data to be used for management of recorded positions of the main data and sub management data to be used for management of recorded positions of the sub data, the main data intermittently based on the main management data, including a step of writing the main data stored in main data storage means provided for temporarily storing the main data intermittently onto the recording medium based on the main management data and writing the sub data onto the recording medium based on the sub management data within a period within which writing of the main data is not performed.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3B is a diagrammatic view illustrating a compacted type address format of the disc;

FIG. 4F is a diagrammatic view showing an example of an address of a second certain position in the first program;

FIG. 4G is a diagrammatic view showing an example of a compacted address of the second certain position in the first program;

FIG. 4H is a diagrammatic view showing a compacted type offset address of the example of the address of the second certain position in the first program;

FIG. 6 is a diagrammatic view illustrating the U-TOC sector 0 of the disc;

FIG. 8 is a diagrammatic view illustrating the U-TOC sector 1 of the disc;

FIG. 9 is a diagrammatic view illustrating the U-TOC sector 2 of the disc;

FIG. 10 is a diagrammatic view illustrating the U-TOC sector 4 of the disc;

FIG. 11 is a diagrammatic view illustrating the AUX-TOC sector 0 of the disc;

FIG. 12 is a diagrammatic view illustrating the AUX-TOC sector 1 of the disc;

FIG. 13 is a diagrammatic view illustrating the AUX-TOC sector 2 of the disc;

FIG. 14 is a diagrammatic view illustrating the AUX-TOC sector 3 of the disc;

FIG. 15 is a diagrammatic view illustrating the AUX-TOC sector 4 of the disc;

FIG. 16 is a diagrammatic view illustrating the AUX-TOC sector 5 of the disc;

FIG. 19A is a diagrammatic view illustrating a copy status of the disc;

FIG. 19B is a diagrammatic view illustrating a copy status updating table for updating the copy status illustrated in FIG. 19A;

FIG. 21 is a diagrammatic view illustrating contents of a definition of a text mode used in the recording and reproduction apparatus shown in FIG. 1;

FIG. 25 is a diagrammatic view illustrating an example of contents of the U-TOC sector 0 of the disc illustrated in FIGS. 23A to 23E;

FIG. 26 is a diagrammatic view illustrating an example of contents of the AUX-TOC sector 3 of the disc illustrated in FIGS. 23A to 23E;

DESCRIPTION OF THE PREFERRED EMBODIMENT

A preferred embodiment of the present invention is described below.

In the present embodiment, a mini disc which is one of magneto-optical discs is used as a recording medium, and a mini disc recording and reproduction apparatus is used as a recording apparatus and a reproduction apparatus.

The description proceeds in the following order.

1. Construction of the Recording and Reproduction apparatus
2. Sector Format and Address Format
3. Area Structure
4. U-TOC
   - 4-1 U-TOC Sector 0
   - 4-2 U-TOC Sector 1
   - 4-3 U-TOC Sector 2
   - 4-4 U-TOC Sector 3
5. AUX-TOC
   - 5-1 AUX-TOC Sector 0
   - 5-2 AUX-TOC Sector 1

5-3 AUX-TOC Sector 2
5-4 AUX-TOC Sector 3
5-5 AUX-TOC Sector 4
5-6 AUX-TOC Sector 5
6. Data File
6-1 Picture File Sector
6-2 Text File Sector
7. Data Reading Out Operation upon Synchronized Reproduction
7-1 Example of Operation
7-1-1 Example of Disc
7-1-2 Structure of Buffer Memory
7-1-3 Outline of Operation
7-2 Processing Operation
8. Program/Data File Simultaneous Recording Operation
8-1 Outline of Operation
8-2 Processing Operation

1. Construction of the Recording and Reproduction Apparatus

Figure 1:
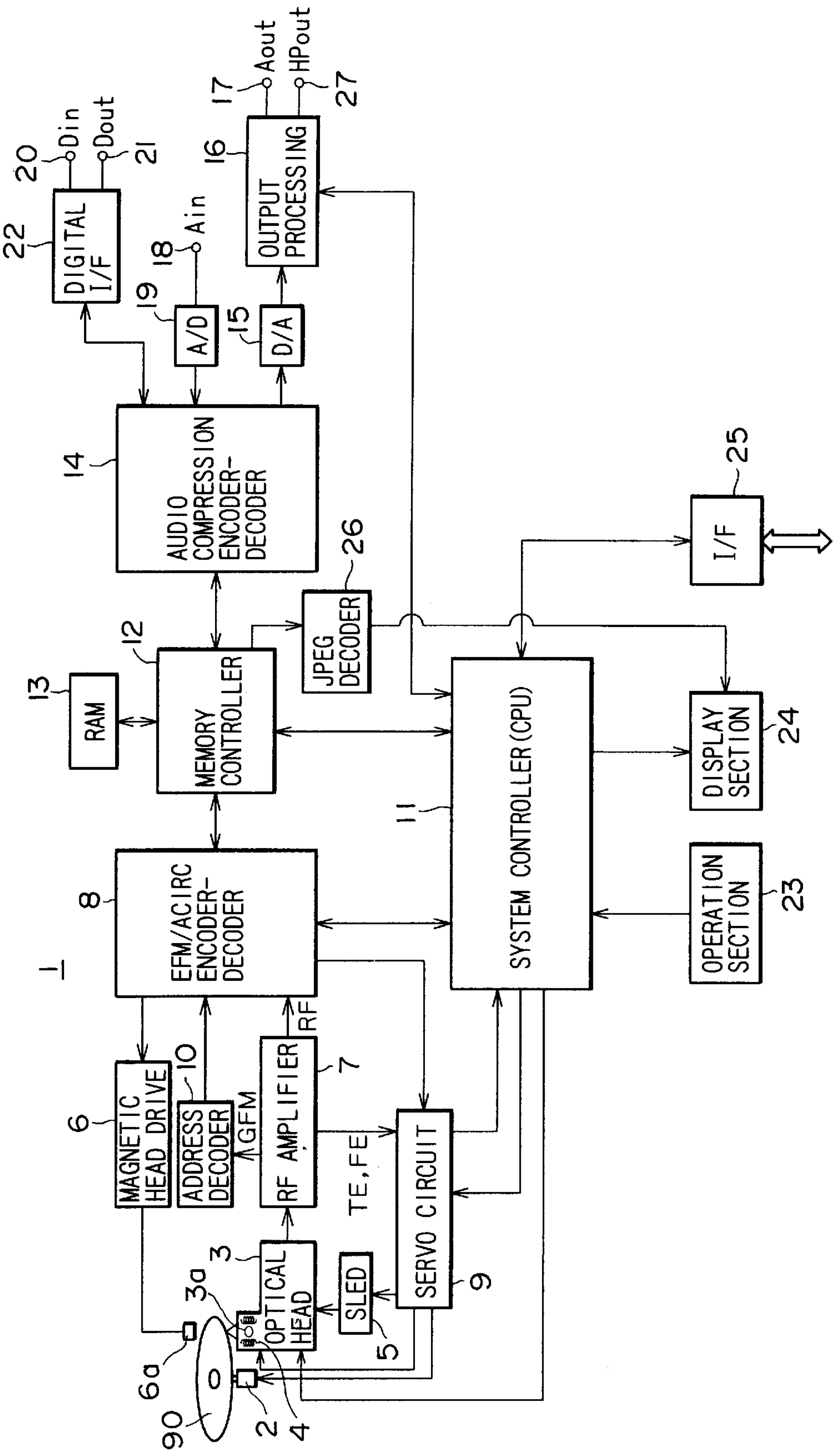
FIG. 1 is a block diagram of a recording and reproduction apparatus according to a preferred embodiment of the present invention.

FIG. 1 shows an internal construction of the mini disc recording and reproduction apparatus 1 of the present embodiment.

Referring to FIG. 1, a magneto-optical disc 90 onto which audio data are to be recorded is driven to rotate by a spindle motor 2. Upon recording or reproduction, a laser beam from an optical head 3 is irradiated upon the magneto-optical disc 90. In the present embodiment, a mini disc is used for the magneto-optical disc 90.

Upon recording, the optical head 3 outputs a laser beam of a high level for heating a recording track to a Curie temperature, but upon reproduction, the optical head 3 outputs a laser beam of a comparatively low level for detecting data from reflected light from the magneto-optical disc 90 by a magnetic Kerr effect.

To this end, the optical head 3 includes an optical system which in turn includes a laser diode serving as laser outputting means, a polarizing beam splitter, an objective lens 3*a* and so forth, a detector for detecting reflected light, and other necessary elements. The objective lens 3*a* is supported for displacement in a radial direction of and in a direction toward or away from the magneto-optical disc 90 by a biaxial mechanism 4.

A magnetic head 6*a* is disposed in an opposing relationship to the optical head 3 across the magneto-optical disc 90. The magnetic head 6*a* is adapted to apply to the magneto-optical disc 90 a magnetic field modulated with data supplied thereto.

The entire optical head 3 and the magnetic head 6*a* are supported for movement in a radial direction of the magneto-optical disc 90 by a thread mechanism 5.

Information detected from the magneto-optical disc 90 by the optical head 3 upon reproduction is supplied to a RF amplifier 7. The RF amplifier 7 performs arithmetic processing for the information supplied thereto to detect a reproduction RF signal, a tracking error signal TE, a focusing error signal FE, groove information GFM and other necessary information. The groove information is absolute position information recorded as pre-grooves (wobbling grooves) on the magneto-optical disc 90.

The extracted reproduction RF signal is supplied to an encoder and decoder section 8. The tracking error signal TE and the focusing error signal FE are supplied to a servo circuit 9, and the groove information GFM is supplied to an address decoder 10.

The servo circuit 9 generates various servo driving signals based on the tracking error signal TE and the focusing error signal FE supplied thereto from the RF amplifier 7, a track jump instruction or an access instruction from a system controller 11, which is formed from a microcomputer, rotational speed detection information of the spindle motor 2, and so forth to control the biaxial mechanism 4 and the thread mechanism 5 to effect focusing and tracking control and control the spindle motor 2 to rotate at a constant linear velocity (CLV).

The address decoder 10 decodes the groove information GFM supplied thereto from the RF amplifier 7 to extract address information. The address information is supplied to the system controller 11 and used for various controlling operations by the system controller 11.

The reproduction RF signal is subject to decoding processing such as EFM (8 to 14 Modulation) demodulation and CIRC (Cross Interleave Reed Solomon Coding) in the encoder and decoder section 8. Upon such decoding processing, also an address, sub code data and so forth are extracted and supplied to the system controller 11.

Audio data as sector data obtained by the decoding processing such as EFM demodulation and CIRC by the encoder and decoder section 8 are written once into a buffer memory 13 by a memory controller 12. It is to be noted that reading of data from the disc 90 by the optical head 3 and transfer of reproduction data in a system from the optical head 3 to the buffer memory 13 are performed intermittently at the rate of 1.41 Mbit/sec.

The data written in the buffer memory 13 are read out at a timing at which transfer of the reproduction data is performed at the rate of 0.3 Mbit/sec, and are supplied to an encoder and decoder section 14. The data supplied to the encoder and decoder section 14 are subject to reproduction signal processing such as decoding processing corresponding to audio compression processing so that they are converted into a digital audio signal sampled with 44.1 KHz and quantized with 16 bits.

The digital audio signal is converted into an analog signal by a D/A converter 15 and then subject to level adjustment, impedance adjustment and so forth by an output processing section 16. A resulting signal from the output processing section 16 is outputted as an analog audio signal Aout from a line output terminal 17 to an external apparatus. The signal from the output processing section 16 is supplied also as a headphone output HPout to a headphone output terminal 27 so that it is outputted to a headphone connected to the headphone output terminal 27.

Meanwhile, the digital audio signal after decoded by the encoder and decoder section 14 is supplied to a digital interface section 22 so that it can be outputted as a digital audio signal Dout from a digital output terminal 21 to an external apparatus. The digital audio signal is outputted to the external apparatus, for example, by transmission over an optical cable.

When a recording operation onto the magneto-optical disc 90 is to be performed, an analog audio signal Ain as a recording signal supplied to a line input terminal 18 is converted into digital data by an A/D converter 19 and then supplied to the encoder and decoder section 14, by which audio compression encoding is performed therefor.

On the other hand, if a digital audio signal Din is supplied from an external apparatus to a digital input terminal 20, then extraction of audio data, control codes and so forth is performed by the digital interface section 22. The audio data are supplied to the encoder and decoder section 14, by which audio compression encoding processing is performed therefor.

Though not shown, it is naturally possible to provide a microphone input terminal so that a microphone input may be used as a recording signal.

The compressed recording data from the encoder and decoder section 14 are written once into and accumulated in the buffer memory 13 by the memory controller 12 and then read out for each data unit of a predetermined amount and sent to the encoder and decoder section 8. Then, the recording data are subject to encoding processing such as CIRC encoding and EFM modulation by the encoder and decoder section 8, and resulting data are supplied to a magnetic head drive circuit 6.

The magnetic head drive circuit 6 supplies a magnetic head driving signal to the magnetic head 6*a* in accordance with the encoded recording data from the encoder and decoder section 8. In other words, the magnetic head drive circuit 6 causes the magnetic head 6*a* to perform application of a magnetic field of the N or S pole to the magneto-optical disc 90. Further, the system controller 11 thereupon supplies a control signal to the optical head 3 so that the optical head 3 may output a laser beam of a recording level.

An operation section 23 is operated by a user and includes operation keys, a dial and so forth which serve as operation elements. The operation elements include, for example, operation elements regarding recording and reproduction operations such as reproduction, recording, pause, stop, FF (fast feeding), REW (rewinding) and AMS (Auto Music Search) (head search), operation elements regarding play modes such as normal reproduction, program reproduction and shuffle reproduction, an operation element for a display mode operation for switching the displaying state of a display section 24, and operation elements for program editing operations such as track division, track connection, track erasure, track name inputting and disc name inputting.

Operation information by the operation keys and the dial is supplied to the system controller 11. The system controller 11 thus executes operation control based on the control information.

A displaying operation of the display section 24 is controlled by the system controller 11.

In particular, in order to cause the display section 24 to perform a displaying operation, the system controller 11 transmits data to be displayed to a display driver in the display section 24. The display driver drives a displaying operation of a display unit such as a liquid crystal panel based on the data supplied thereto to display required numerals, characters, marks and so forth.

The display section 24 displays an operation mode state of a disc being recorded or played back, a track number, a recording time or reproduction time, an editing operation state and so forth.

The disc 90 allows recording thereon of character information such as a track name which is managed incidentally to a program as main data. When such character information is inputted, the inputted characters are displayed, and also character information read out from the disc is displayed.

Further, in the present embodiment, sub data called AUX data which make data files independent of data of tunes and so forth as programs can be recorded on the disc 90.

A data file as AUX data includes information of characters, a still picture or the like, and such characters or still picture can be displayed on the display section 24.

In the present embodiment, a JPEG decoder 26 is provided as a component for allowing the display section 24 to display a still picture of AUX data.

In particular, in the present embodiment, still picture data of a data file as AUX data are recorded in the form of a file compressed in accordance with the JPEG (joint Photographic Coding Experts Group) system. The JPEG decoder 26 receives a file of still picture data reproduced from the disc 90 and stored, for example, in the buffer memory 13 through the memory controller 12, performs decompression processing in accordance with the JPEG system for the file, and outputs resulting data to the display section 24. Consequently, the still picture data as the AUX data are displayed on the display section 24.

It is to be noted, however, that, where character information or still picture information of AUX data is outputted, a full dot display unit or a CRT display unit which has a comparatively large screen and can use the screen freely to some degree is preferably used frequently. Therefore, it is a possible idea to display AUX data on an external monitor apparatus or the like which is connected to an interface section 25.

Further, while a user can record an AUX data file onto the disc 90, it is sometimes necessary to use an image scanner, a personal computer or a keyboard as an inputting apparatus then, and it is a possible idea to input information as an AUX data file from such an inputting apparatus as just mentioned to the mini disc recording and reproduction apparatus 1 through the interface section 25.

The system controller 11 is formed as a microcomputer including a CPU, a program ROM, a working RAM, an interface unit and so forth and control the various operations described hereinabove.

When a recording or reproduction operation is performed for the magneto-optical disc 90, management information recorded on the magneto-optical disc 90, that is, the P-TOC (pre-mastered TOC) and the U-TOC (user TOC) must be read out. The system controller 11 discriminates an address of an area to be recorded or an address of an area to be played back on the magneto-optical disc 90 based on the management information.

The management information is stored in the buffer memory 13.

When the magneto-optical disc 90 is loaded into the recording and reproduction apparatus 1, the system controller 11 causes a reproduction operation of the innermost circumference of the magneto-optical disc 90, on which the management information is recorded, to be executed to read out the management information and stores the management information into the buffer memory 13 so that the management information may thereafter be referred to upon recording, reproduction or editing operation for the magneto-optical disc 90.

The U-TOC is rewritten in response to recording or editing processing of program data. More particularly, each time a recording or editing operation is performed, the system controller 11 performs U-TOC updating processing for the U-TOC information stored in the buffer memory 13 and rewrites the U-TOC area of the magneto-optical disc 90 at a predetermined timing in response to the rewriting operation.

While AUX data files are recorded on the magneto-optical disc 90 separately from programs, an AUX-TOC is formed on the magneto-optical disc 90 for allowing management of the AUX data files.

The system controller 11 performs also reading out of the AUX-TOC upon reading out of the U-TOC and stores the AUX-TOC into the buffer memory 13 so that, when necessary, it can refer to the AUX data management state.

Further, when necessary, the system controller 11 reads out an AUX data file at a predetermined timing or simultaneously upon reading out of the AUX-TOC and stores the AUX data file into the buffer memory 13. Then, in response to an outputting timing which is managed with the AUX-TOC, the system controller 11 causes the display section 24 or the external apparatus connected to the interface section 25 to execute an outputting operation of characters or an image.

2. Sector Format and Address Format

Data units called sector and cluster are described below with reference to FIGS. 2A, 2B, 2C, 2D and 2E.

Figures 2A, 2B, 2C, 2D, 2E:
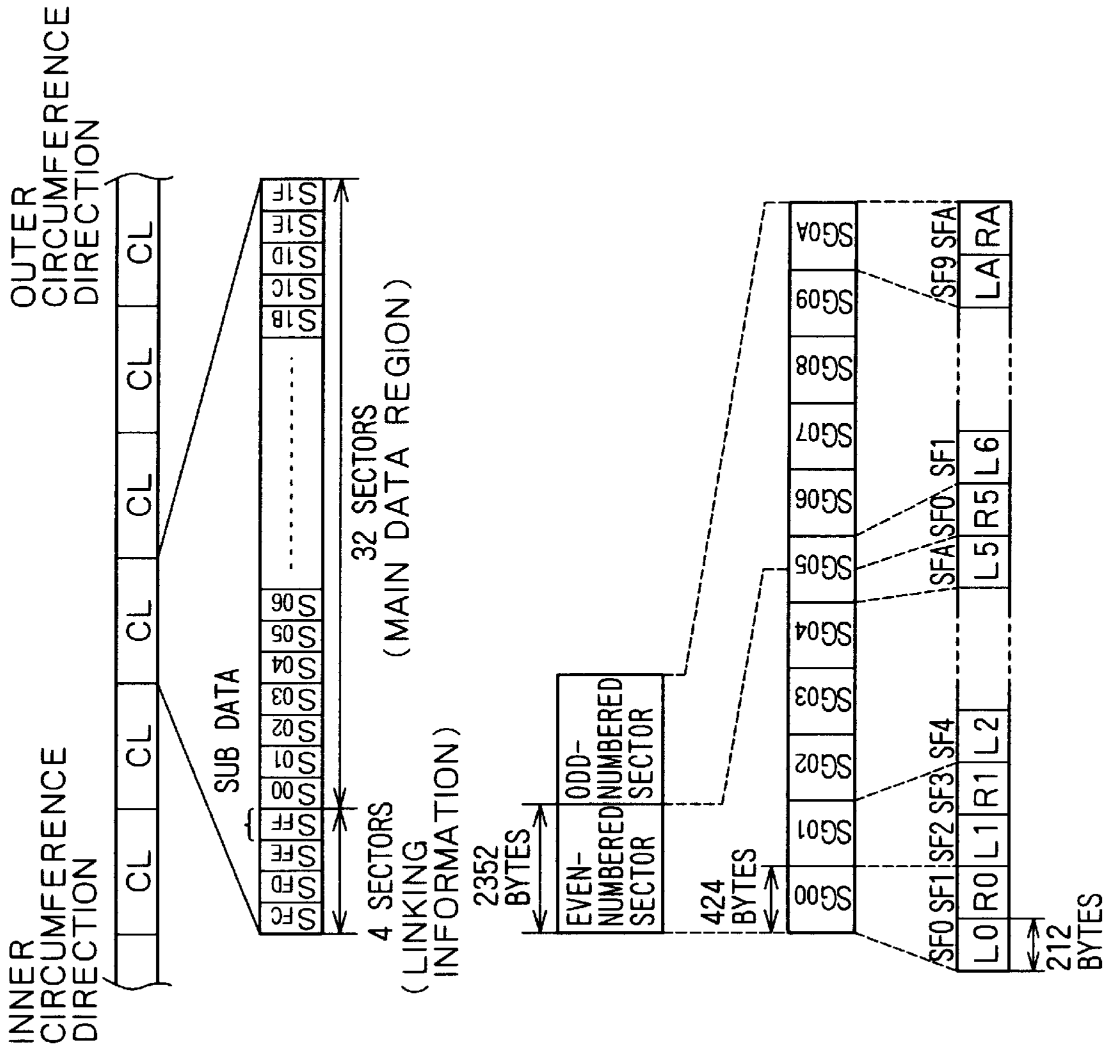
FIG. 2A is a diagrammatic view illustrating a track in a sector format of a disc used in the recording and reproduction apparatus of FIG. 1.
FIG. 2B is a diagrammatic view illustrating a cluster in the sector format of the disc.
FIG. 2C is a diagrammatic view illustrating arrangement of sectors in the sector format of the disc and sector lengths.
FIG. 2D is a diagrammatic view illustrating a sector in the sector format of the disc.
FIG. 2E is a diagrammatic view illustrating a sound group in the sector format of the disc.

In a recording track in the mini disc system, clusters CL are formed successively as seen in FIG. 2A, and one cluster makes a minimum unit upon recording. One cluster corresponds to 2 to 3 circumferential tracks.

Referring to FIG. 2B, one cluster CL includes a linking region of four sectors SFC to SFF and a main data region of 32 sectors S00 to S1F.

As seen from FIG. 2C, one sector is a unit of data including 2,352 bytes.

Of the sub data region of four sectors shown in FIG. 2B, the sector SFF is used as a sub data sector which can be used for recording of information as sub data. However, the remaining three sectors SFC to SFE are not used for recording of data.

Meanwhile, TOC data, audio data, AUX data and so forth are recorded into the main data region for 32 sectors.

It is to be noted that an address is recorded for each one sector.

Referring to FIG. 2D, one sector is further divided into units called sound groups. More particularly, two sectors are divided into 11 sound groups.

More specifically, as seen from FIGS. 2C and 2D, two successive sectors including an even-numbered sector such as the sector S00 and an odd-numbered sector such as the sector S01 include sound groups SG00 to SG0A. One sound group is formed from 424 bytes and includes an amount of audio data corresponding to the time of 11.61 msec.

As seen from FIGS. 2D and 2E, data are recorded separately for the L channel and the R channel in one sound group SG. For example, the sound group SG00 includes L channel data L0 and R channel data R0, and the sound group SG01 includes L channel data L1 and R channel data R1.

It is to be noted that 212 bytes which make a data region for the L channel or the R channel is called sound frame.

Figure 3A:
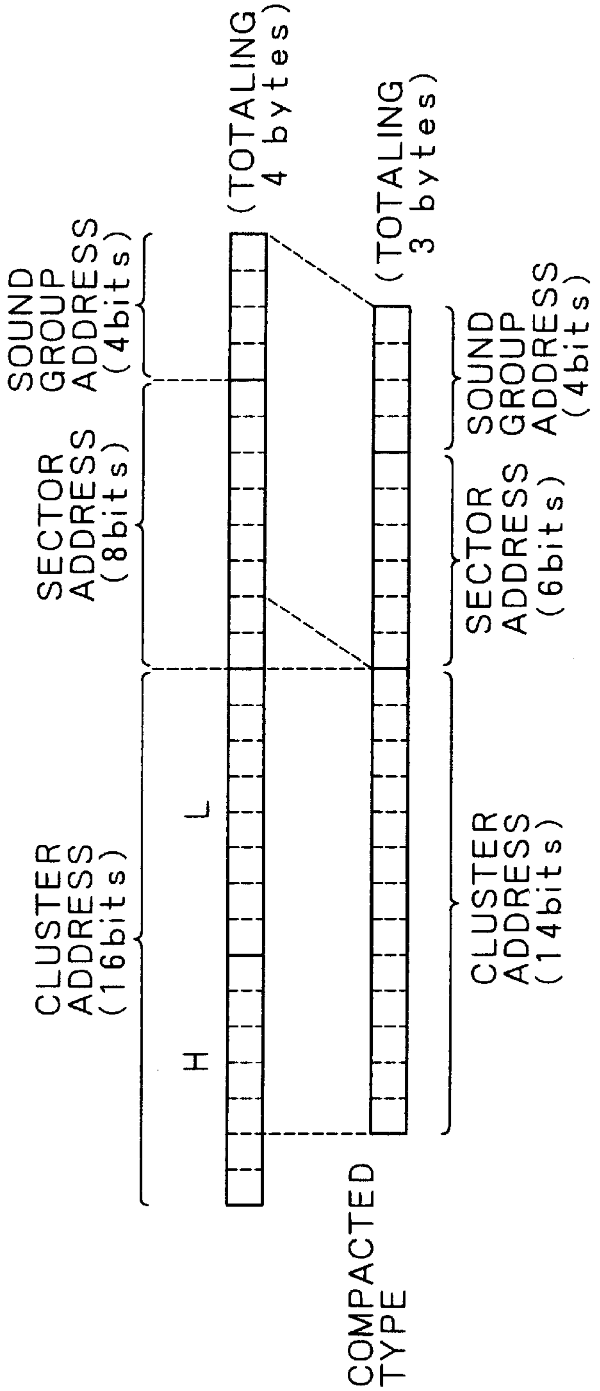
FIG. 3A is a diagrammatic view illustrating an address format of the disc.

An address format in the mini disc system is described below with reference to FIGS. 3A and 3B.

An address of each sector is represented by a cluster address and a sector address. As seen from FIG. 3A, a cluster address has a value of 16 bits (=2 bytes), and a sector address has a value of 8 bits (=1 byte).

Thus, an address of 3 bytes is recorded at the top position of each sector.

Further, by adding a sound group address of 4 bits, also an address of a sound group in a sector can be represented. For example, if a sound group address is described for management of the U-TOC or the like, setting of a reproduction position in a unit of a sound group is allowed.

By the way, in the U-TOC or the AUX-TOC, in order to allow a cluster address, a sector address and a sound group address to be represented in three bytes, such a compacted type address as seen in FIG. 3B is used.

First, a sector can be represented with 6 bits because one cluster includes 36 sectors. Accordingly, the two high order bits of a sector address can be omitted. Similarly, since a cluster up to the outermost circumference of the disc can be represented with 14 bits, the two high order bits can be omitted.

By omitting the two most significant bits of each of a sector address and a cluster address, an address which allows designation also of a sound group can be represented with 3 bytes.

Further, in the U-TOC and the AUX-TOC which are hereinafter described, an address to be used for management of a reproduction position, a reproduction timing or the like is described in an address of the compacted type. The address may be represented in the form of an absolute address or in the form of an offset address. The offset address is, for example, a relative address which represents the position in each program such as a tune with reference to the top position of the program determined as a position of the address 0. An example of the offset address is described below with reference to FIGS. 4A, 4B, 4C, 4D, 4E, 4F, 4G and 4H.

As hereinafter described with reference to FIGS. 5A and 5B, programs such as tunes are recorded in clusters beginning with the 50th cluster on the disc, that is, the 32h-th cluster in hexadecimal notation. It is to be noted that any numerical value followed by "h" represents a value of the hexadecimal notation.

Figures 4A, 4B, 4C, 4D, 4E:
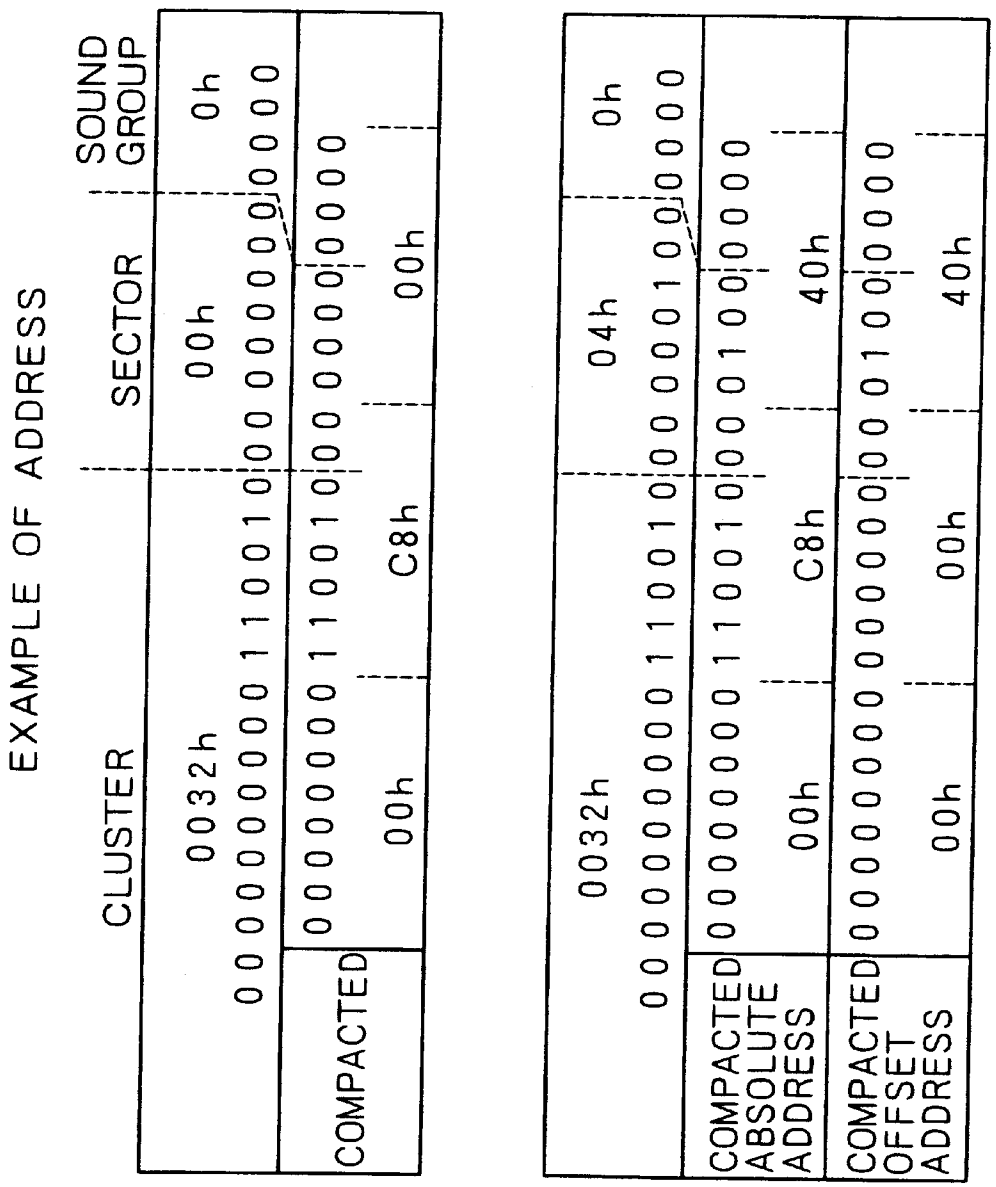
FIG. 4A is a diagrammatic view showing an example of a top address of a first program on the disc.
FIG. 4B is a diagrammatic view showing an example of a compacted type top address of the first program.
FIG. 4C is a diagrammatic view showing an example of an address of a first certain position in the first program.
FIG. 4D is a diagrammatic view showing an example of a compacted address of the first certain position in the first program.
FIG. 4E is a diagrammatic view showing a compacted type offset address of the example of the address of the first certain position in the first program.

For example, the address value of the address of the top position of the first program, that is, cluster 32h, sector 00h, sound group 0h, is "0000000000110010000000000000" as seen in FIG. 4A. If this is represented in the compacted type, it is "000000001100100000000000", that is, 00h, C8h, 00h in the hexadecimal notation as shown in FIG. 4B.

With the top address determined as a start point, the address of a certain point in the first program, for example, the address of the cluster 0032h, sector 04h, sound group 0h as in FIG. 4C is, in the compacted absolute address representation as in FIG. 4D, "00h, C8h, 40h". Meanwhile, the address described above in the offset address representation is "00h, 00h, 40h" as seen in FIG. 4E because the cluster 00h, sector 04h, sound group 0h is represented as a finite difference from the start portion provided by the top address.

On the other hand, with the top address of FIG. 4A determined as a start point, another certain position in the first program, for example, the address of the cluster 0032h, sector 13h, sound group 9h as in FIG. 4F is, in the compacted absolute address, "00h, C9h, 39h" as seen in FIG. 4G, but is, in the offset address, "00h, 01h, 39h" as seen in FIG. 4H.

Like the examples described above, a position in a program can be designated with an absolute address or an offset address.

3. Area Structure

An area structure of the disc 90 in the present embodiment is described below with reference to FIGS. 5A and 5B.

Figures 5A, 5B:
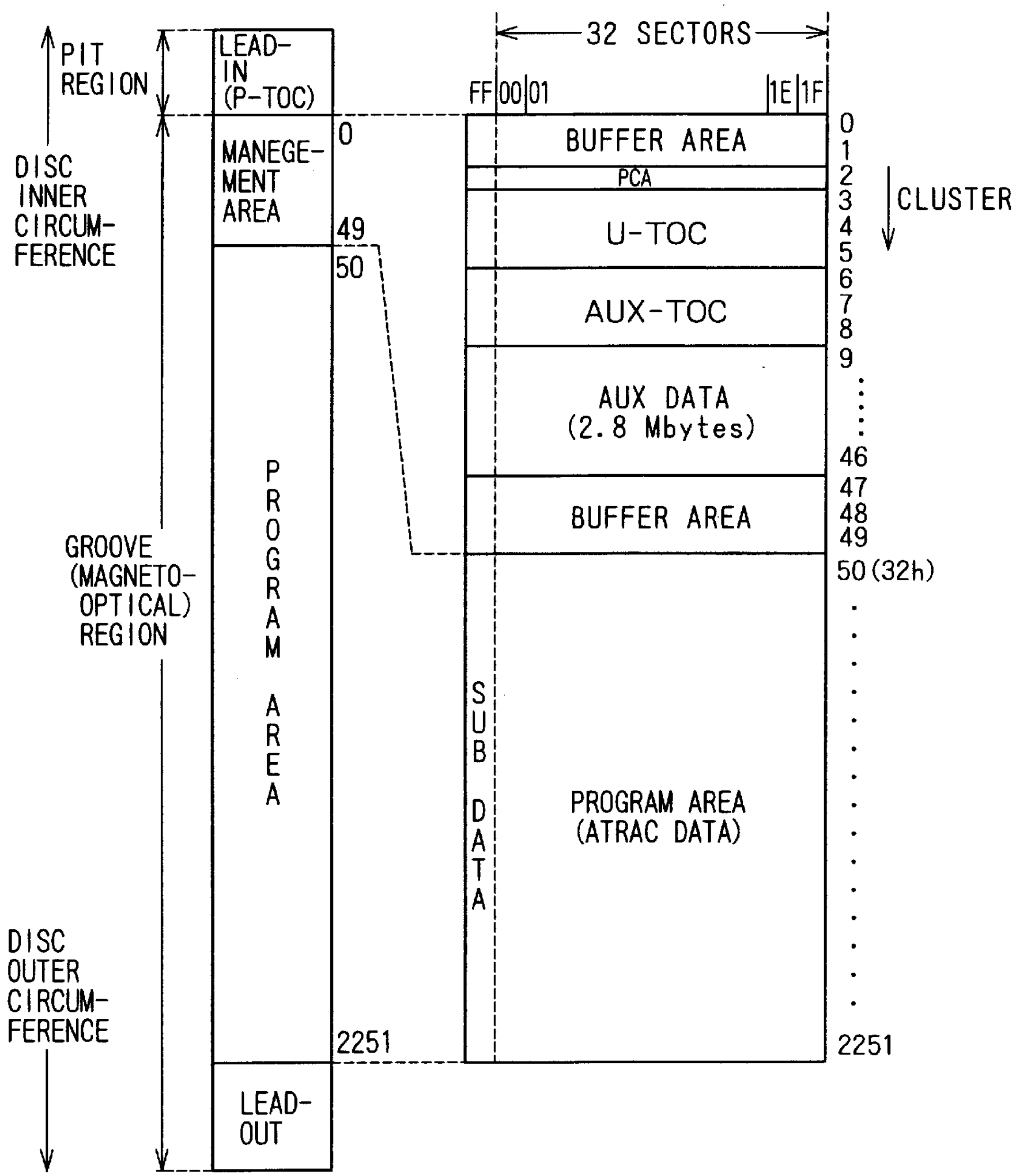
FIG. 5A is a diagrammatic view showing an area structure of the disc.
FIG. 5B is a diagrammatic view showing details of a management area of the area structure of the disc.

FIG. 5A shows different areas from the innermost circumference side to the outermost circumference side of the disc 90.

The disc 90 as a magneto-optical disc has, on the innermost circumference side, a pit region in which read only data in the form of embossed pits are formed and the P-TOC is recorded.

The remaining region on the outer circumferences with respect to the pit region is formed as a magneto-optical region and as a recording/reproduction allowing region in which grooves as guide grooves for recording tracks are formed.

A section of the magneto-optical region from the cluster 0 on the innermost circumference side to the cluster 49 is used as a management area whereas another section from the cluster 50 to the cluster 2,251 is used as a program area in which actual programs such as tunes are recorded. The remaining outer circumferential area with respect to the program area is used as a lead-out area.

The management area is illustrated more particularly in FIG. 5B. FIG. 5B shows sectors in a horizontal direction and shows clusters in a vertical direction.

The clusters 0 and 1 in the management area form a buffer area to the pit region. The cluster 2 is used as a power calibration area PCA and used for output power adjustment of a laser beam and so forth.

In the clusters 3, 4 and 5, the U-TOC are recorded. While contents of the U-TOC are hereinafter described, a data format is defined in each sector in one cluster, and predetermined management information is recorded in each sector. The U-TOC data are repetitively recorded three times in the three clusters 3, 4 and 5 having the sectors in which the U-TOC data are recorded.

The clusters 6, 7 and 8 are used to record the AUX-TOC. Although also contents of the AUX-TOC are hereinafter described, a data format is defined in each sector in one cluster and predetermined management information is recorded in each sector. The AUX-TOC data are repetitively recorded three times in the three clusters 6, 7 and 8 having the sectors in which the AUX-TOC data are recorded.

The region from the cluster 9 to the cluster 46 is used to record AUX data. A data file of AUX data is formed in a unit of a sector and includes picture file sectors as a still picture file, text file sectors as a character information file, karaoke text file sectors as a character information file synchronized with a program and so forth which are hereinafter described.

Data file of AUX data, a region in which AUX data files can be recorded in the AUX data area, and so forth are managed with the AUX-TOC.

It is to be noted that the recording capacity for data files in the AUX data area is 2.8 Mbytes where an error correction system mode 2 is presumed.

Also it is possible to form a second AUX data area, for example, in a rear half portion of the program area or a region on the outer circumference side than the program area such as, for example, the lead-out portion to increase the recording capacity for data files.

The clusters 47, 48 and 49 are used as a buffer area to the program area.

In the program area beginning with the cluster 50 (=32h), data of one or a plurality of tunes or the like are recorded in the form compressed by a compression system called ATRAC.

Programs recorded and a recording allowing region are managed with the U-TOC.

It is to be noted that, in each cluster in the program region, the sector FFh can be used for recording of some information as sub data as described hereinabove.

It is to be noted that, although, in the present mini disc system, a reproduction only disc on which programs and so forth are recorded as reproduction only data in the form of pits can be used, the entire area of the reproduction only disc is formed as a pit area. The programs recorded on the reproduction only disc are managed with the P-TOC in a manner substantially similar to that with the U-TOC, which is hereinafter described, and the U-TOC is not formed.

However, where reproduction only data files are recorded as AUX data, the AUX-TOC for managing the files is recorded.

4. U-TOC 4-1 U-TOC Sector 0

As described hereinabove, in order to perform a recording or reproduction operations of a track as a program onto and from the disc 90, the system controller 11 reads out the P-TOC and the U-TOC as management information recorded on the disc 90 in advance, and refers to them when necessary.

Here, the U-TOC sectors as management information to be used for management of recording or reproduction operations of tracks, tunes and so forth on the disc 90 are described.

It is to be noted that the P-TOC is formed in the pit area on the innermost circumference side of the disc 90 as described hereinabove with reference to FIG. 5A. Then, management of the positions of recordable areas (recordable user areas), the lead-out area and the U-TOC area and so forth of the disc is performed based on the P-TOC. It is to be noted that, with a read only optical disc on which all data are recorded in the form of pits, also management of tunes recorded as a ROM can be performed with the P-TOC, but no U-TOC is formed.

Detailed description of the P-TOC is omitted, and here, the U-TOC which is provided on a recordable magneto-optical disc is described.

FIG. 6 shows the format of the U-TOC sector 0.

It is to be noted that, as the U-TOC sectors, the sectors from the sector 0 up to the sector 7 can be provided, and among the sectors, the sector 1 and the sector 4 can be used as an area in which character information is to be recorded and the sector 2 is used as an area into which recording dates/times are to be recorded.

First, the U-TOC sector 0 required without fail for recording and reproduction operations for the disc 90 is described.

The U-TOC sector 0 is a data area in which management information principally regarding programs such as tunes recorded by a user and free areas into which programs can be recorded newly is recorded.

For example, if a user intends to record a certain tune onto the disc 90, the system controller 11 searches out a free area on the disc 90 from the U-TOC sector 0 and records audio data into the free area. On the other hand, upon reproduction, an area in which a tune to be reproduced is recorded is discriminated from the U-TOC sector 0, and the area is accessed to perform a reproduction operation.

At the top position of the data region (4 bytes×588=2,352 bytes) of the U-TOC sector 0, a synchronization pattern in which several 1-byte data of all 0s or all 1s are formed successively is recorded.

Then, an address including a cluster address (Cluster H) (Cluster L) and a sector address (Sector) is recorded over 3 bytes, and 1 byte of mode information (MODE) is added. The bytes mentioned form a header. The address of 3 bytes here is an address of the sector itself.

The structure of the header part in which the synchronization pattern and an address are recorded applies not only to the U-TOC sector 0 but also to the P-TOC sectors, AUX-TOC sectors, AUX file sectors and program sectors, and although description of the header part of any of the sectors hereinafter described with reference to FIGS. 8, 9 and 10 is omitted, in the header part of any of the sectors, an address of the sector itself and the synchronization pattern are recorded in a unit of a sector.

It is to be noted that, as the address of a sector itself, the cluster address is represented in 2 bytes of a high order address (Cluster H) and a low order address (Cluster L) and the sector address (Sector) is represented with 1 byte. In other words, the address is not of the compacted type.

Then, at predetermined byte positions, data of a maker code, a model code, a track number (First TNO) of the first track, a track number (Last TNO) of the last track, a sector use situation (Used sectors), a disc serial number, a disc ID and so forth are recorded.

Further, a region is prepared in which various pointers (P-DFA, P-EMPTY, P-FRA, P-TNO1 to P-TNO255) provided to allow identification of regions of tracks such as tunes recorded by recording operations performed by a user, free areas and so forth by making them correspond to a table section which is hereinafter described are to be recorded.

In the table section which is made correspond to the pointers (P-DFA to P-TNO255), 255 part tables 01h to FFh are provided. In each part table, a start address which defines a start point of a given part, an end address which defines an end point of the part, and mode information of the part called track mode are recorded. Further, since a part indicated by a part table may possibly be linked to another part, link information indicative of a part table in which a start address and an end address of the part of the destination of the link are recorded can be recorded.

It is to be noted that the term "part" signifies a track portion in which successive data in time are recorded physically continuously in one track.

Addresses represented as start addresses and end addresses designate a part or each of a plurality of parts which form a track of a tune.

Those addresses are recorded in compacted representations and each designates a cluster, a sector and a sound group.

In a recording and reproduction apparatus of the type described above, even if data of a program or track as a set of audio data are recorded physically discontinuously or discretely in a plurality of parts, there is no trouble in a reproduction operation by successively accessing the parts to reproduce them. Therefore, audio data or the like are sometimes recorded by a user over a plurality of parts in order to achieve efficient use of recordable areas and so forth.

To this end, link information is provided, and for example, by designating a part table to be linked based on the numbers 01h to FFh given to the individual part tables, the part table can be linked.

In particular, in the management table section in the U-TOC sector 0, one part table represents one part, and, for example, for a tune formed from three parts linked to each other, the part positions are managed with three part tables linked with the link information.

It is to be noted that the link information is actually represented by a value of byte positions in the U-TOC sector 0 obtained by a predetermined calculation processing. That is, a part table is designated by 304+(link information)×8(th byte).

Each of the part tables 01h to FFh in the U-TOC sector 0 indicates contents of the part in the following manner with the pointers (P-DFA, P-EMPTY, P-FRA, P-TNO1 to P-TNO255) in the pointer section.

The pointer P-DFA indicates a defective region on the magneto-optical disc 90 and designates a part table or the top one of a plurality of part tables which represents a track portion or part or represent track portions, that is, parts which provides or provide a defective region because of damage to the same. In short, if the magneto-optical disc 90 includes a defective part, one of the part tables 01h to FFh is recorded in the pointer P-DFA, and in the corresponding part table, the defective part is indicated with start and end addresses. Further, if the magneto-optical disc 90 includes another defective part, the part table of this defective part is designated as the link information in the first-mentioned part table, and also in the part table, the defective part is indicated. If no other defective part is included, then the link information is set, for example, to 00h, which indicates absence of any further link.

The pointer P-EMPTY indicates a part table of a non-used part or the top one of a plurality of non-used part tables in the management table section. Where a non-used part table is present, any one of 01h to FFh is recorded in the pointer P-EMPTY.

Where a plurality of non-used part tables are present, such part tables are successively designated with link information from the part table designated by the pointer P-EMPTY such that all of the non-used part tables are linked on the management table section.

The pointer P-RFA indicates a free area including an erased area on the magneto-optical disc 90 into which data can be written and designates a part table or the top one of a plurality of part tables which includes or include a part or parts as a track portion or portions which forms or form a free area. In particular, if a free area is present, then one of 01h to FFh is recorded in the pointer P-FRA, and in a part table corresponding to it, the part which forms the free area is indicated with start and end addresses. Further, where a plurality of such parts are present, or in other words, where a plurality of such part tables are present, the part tables are successively designated with link information until the link information of 00h is found.

Figure 7:
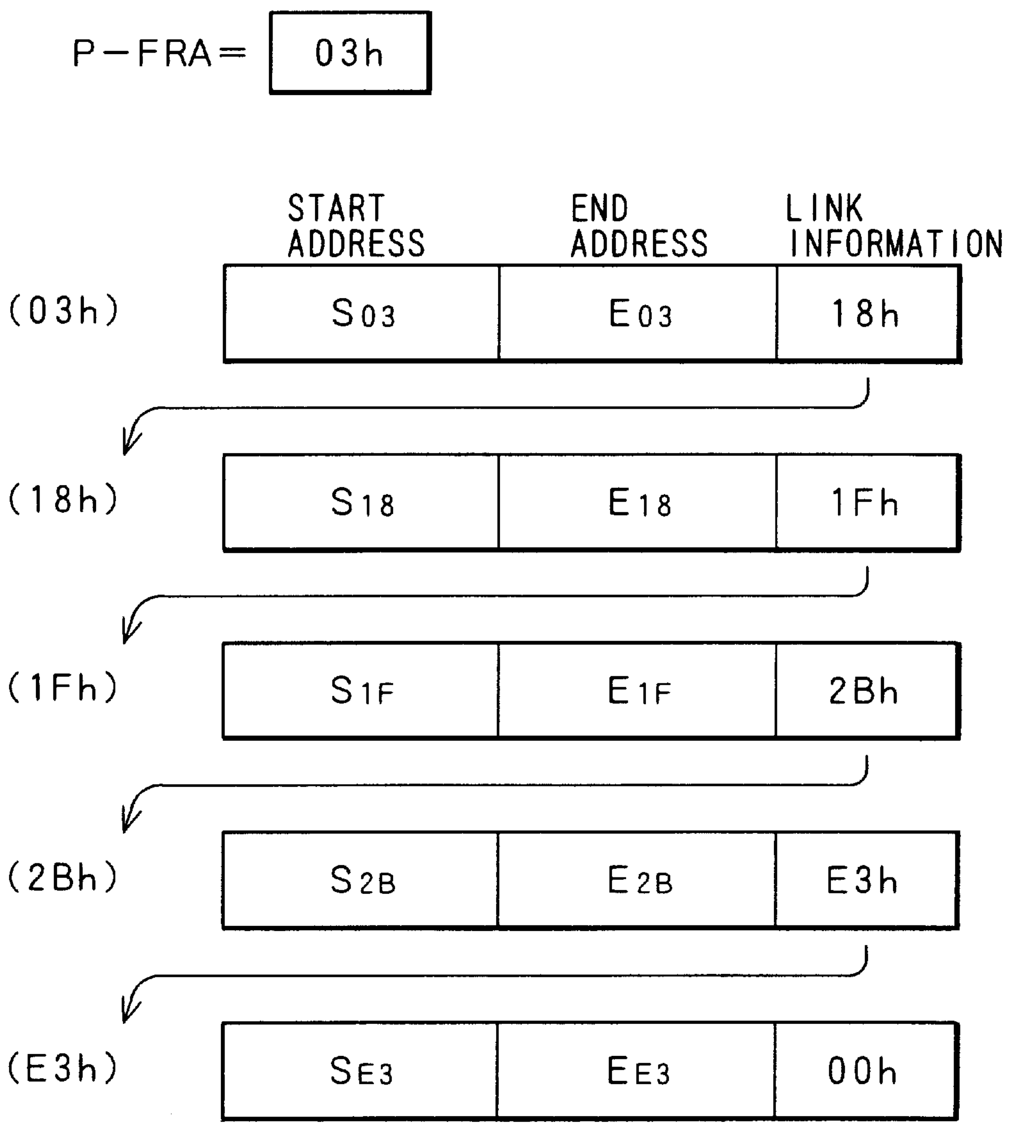
FIG. 7 is a diagrammatic view illustrating a form of a link provided by the U-TOC sector 0 of the disc.

FIG. 7 schematically illustrates a manner of management of parts which form a free area with part tables. In FIG. 7, the parts 03h, 18h, 1Fh, 2Bh and E3h form a free area and are successively linked beginning with the pointer P-FRA. Also such defective region as described above and non-used part tables are managed in a similar manner.

Referring back to FIG. 6, the pointers P-TNO1 to PTNO255 indicate tracks of tunes or the like recorded on the magneto-optical disc 90 by a user. For example, the pointer P-TNO1 designates a part table which indicates a part or a top one with respect to time of a plurality of parts in which data of the first track are recorded.

For example, if a tune of the first program as a first track is recorded without being divided, that is, recorded in one part, on the disc, the recording area of the first track is designated with start and end addresses in a part table indicated by the pointer P-TNO1.

Further, if a tune of the second program as a second track is recorded discretely in a plurality of parts on the disc, then the parts for indicating the recorded positions of the second track are designated in accordance with an order in time. In particular, beginning with a part table designated by the pointer P-TNO2, the other part tables are successively designated in accordance with an order in time with link information to link the parts until the part table whose link information is 00h is reached. The manner of linkage is similar to that described hereinabove with reference to FIG. 7.

Since all parts in which, for example, data of the second tune are recorded are successively designated and recorded in this manner, when reproduction of the second tune or overwrite recording into the region of the second tune is to be performed using the data of the U-TOC sector 0, the optical head 3 and the magnetic head 6*a* can be controlled to access the discrete parts to extract the continuous music information or to effect recording with the recording area used efficiently.

In this manner, with the re-writable magneto-optical disc 90, management of the areas on the disc is performed based on the P-TOC and management of tunes, a free area and so forth recorded in the recordable service area is performed based on the U-TOC.

4-2 U-TOC Sector 1

FIG. 8 shows the format of the U-TOC sector 1. The U-TOC sector 1 is a data region into which inputted character information is recorded when a track name is to be applied to a recorded track or a disc name as information of the name or the like of the disc itself is to be applied to the disc.

In the U-TOC sector 1, pointers P-TNA1 to P-TNA255 are prepared as a pointer section which corresponds to recorded tracks, and 255 slots 01h to FFh of 8 bytes designated by the pointers P-TNA1 to P-TNA255 and one slot 00h of 8 bytes are prepared. The U-TOC sector 1 is thus used for management of character data in a substantially similar manner to that of the U-TOC sector 0.

Character information representing a disc title or a track name is recorded in ASCII codes in each of the slots 01h to FFh.

For example, in a slot designated by the pointer P-TNA1, characters inputted corresponding to the first track by a user are recorded. Further, as a slot is linked with link information, a number of characters greater than 7 bytes (7 characters) may be inputted for one track.

It is to be noted that the slot 00h of 8 bytes is prepared as an area for exclusive use to record a disc name and is prevented from being designated by the pointer P-TNA(x).

Also in the U-TOC sector 1, the pointer P-EMPTY is used for management of non-used slots.

4-3 U-TOC Sector 2

FIG. 9 shows the format of the U-TOC sector 2. The U-TOC sector 2 is a data region in which recording dates/times of tunes recorded by a user are recorded principally.

In the U-TOC sector 2, pointers P-TRD1 to P-TRD255 are prepared as a pointer section which corresponds to tracks recorded, and a slot section designated by the pointers P-TRD1 to P-TRD255 is prepared. Further, 255 slots 01h to FFh of 8 bytes are prepared in the slot section, and the U-TOC sector 2 is used for management of date/time data substantially in a similar manner to that of the U-TOC sector 0.

In the slots 01h to FFh, recording date/times of tunes (tracks) are recorded in 6 bytes, in which values corresponding to the year, the month, the day, the hour, the minute and the second are recorded successively for each one byte. The remaining 2 bytes are prepared for a maker code and a model code, and code data representing a manufacturer of a recording apparatus used for recording of the tune and code data representing a type of the recording apparatus used for recording are recorded in them.

For example, if a track as a first tune is recorded onto the disc, then the recording date/time, the maker code of the recording apparatus used and the model code are recorded into a slot designated by the pointer P-TRD1. The recording date/time data are automatically recorded by the system controller 11 referring to an internal clock.

The slot 00h of 8 bytes is prepared as an area for exclusive use to record the recording date/time of the disc and is prevented from being designated by the pointer P-TRD(x).

It is to be noted that, also in the U-TOC sector 2, the slot pointer P-EMPTY is used for management of slots which are not used. In such non-used slots, link information is recorded in place of a model code. Thus, the non-used slots are linked with such link information beginning with the slot pointer P-EMPTY to manage the non-used slots.

4-4 U-TOC Sector 4

FIG. 10 shows the U-TOC sector 4. The U-TOC sector 4 is a data area into which inputted character information is recorded when a tune name as a track name is to be applied to a track recorded by a user or a disc name is to be applied to the disc similarly to the U-TOC sector 1 described hereinabove. As can be seen from comparison of FIG. 10 with FIG. 8, the format of the U-TOC sector 4 is substantially similar to that of the U-TOC sector 1.

However, the U-TOC sector 4 allows recording of 2 byte codes as code data corresponding to a kanji or a European character, and in addition to data of the U-TOC sector 1 of FIG. 8, an attribute of a character code is recorded at a predetermined byte position.

Management of character information of the U-TOC sector 4 is performed with pointers P-TNA1 to P-TNA255 and slots 01h to FFh designated by the pointers P-TNA1 to P-TNA255.

It is to be noted that the recording and reproduction apparatus 1 of the present embodiment can handle a reproduction only disc on which no U-TOC is formed. Where such a reproduction only disc is used, it may have character information of a disc name and track names recorded in the P-TOC thereof.

In particular, sectors substantially similar to the U-TOC sector 1 and the U-TOC sector 4 are prepared as P-TOC sectors, and a disc maker can record a disc name and track names on the P-TOC sectors in advance.

5. AUX-TOC 5-1 AUX-TOC Sector 0

In the disc 90 in the present embodiment, regions in which AUX data files and the AUX-TOC are to be recorded are set as described hereinabove with reference to FIGS. 5A and 5B, and character information, image information and so forth independent of tracks of programs such as tunes can be recorded as AUX data files.

Such AUX data files are managed with the AUX-TOC. The AUX-TOC is recorded three times repetitively over 3 clusters, and accordingly, as a management data structure, 32 sectors in one cluster can be used similarly as in the U-TOC.

In the present embodiment, the AUX-TOC sectors 0 to 5 are set to manage the AUX data files as described below.

First, the format of the AUX-TOC sector 0 is described with reference to FIG. 11.

The AUX-TOC sector 0 is used as an area allocation table principally for management of a free area in the overall AUX data region.

As seen from FIG. 11, in the AUX-TOC sector 0, a header including a sector address (Sector)=00h and mode information (MODE)=02h is recorded first, and the four characters of "M", "D", "A" and "D" are recorded in the form of ASCII codes in a region of four bytes at predetermined byte positions. The characters "M", "D", "A" and "D" indicate a format ID and are recorded commonly at a same byte position in the AUX-TOC sectors which are hereinafter described.

Further, a maker code and a model code are recorded at predetermined byte positions following the format ID, and used sector information is recorded at predetermined byte positions following the maker code and the mode code.

The used sector information indicates a situation of use of sectors in the AUX-TOC.

The eight bits d8 to d1 which form the Used Sector 0 correspond to 0 to 7 sectors, respectively. In a similar manner, the 8 bits d8 to d1 of the Used Sector 1 correspond to 8 to 15 sectors, respectively. The 8 bits d8 to d1 of the Used Sector 2 correspond to 16 to 23 sectors, respectively. The 8 bits d8 to d1 of the Used Sector 3 correspond to 24 to 31 sectors, respectively.

In the AUX-TOC sector 0, a pointer section is formed from pointers P-EMPTY and P-BLANK.

In a table section, 99 part tables of 8 bits in which a start address, an end address and link information are formed such that management of the AUX data area may be performed in a similar manner as with the U-TOC sector 0 described hereinabove. In this instance, however, part tables 01h to 63h are used as the table section, but the remaining part tables 64h to FFh are not used with all 0s (zeros) placed therein.

It is to be noted that, although the part tables beginning with the part table 64h may possibly be used as the table section, for practical use, it is sufficient to use 99 part tables for management. Here, the reason why the part tables 01h to 63h are used as the effective table section is that it is determined taking a particular capacity of the buffer memory 13 into consideration.

The pointer P-EMPTY is used for management in the form of a linkage of non-used part tables in the AUX-TOC sector 0.

The pointer P-BLANK is used for management in the form of a linkage of part tables of a free area in the AUX data area, that is, non-recorded regions into which AUX data files can be recorded.

It is to be noted that a start address and an end address are represented in compacted representations and consequently designation up to a sound group position is allowed. However, in the AUX-TOC sector 0 in the present embodiment, it is prescribed to designate an address in a unit of a cluster, and all 0s are placed at the data position indicating a sound group unit in the sector, start address and end address.

Also the start address and the end address recorded in 3 bytes in the table section or the slot section in the AUX-TOC sectors 1 to 5 described below are represented in compacted representations. Further, the prescription of up to which data unit a start address or an end address designates is different among different sector contents, such prescriptions are hereinafter described suitably.

Where the AUX-TOC is formed on a reproduction only disc, no part table uses link information.

5-2 AUX-TOC Sector 1

The AUX-TOC sectors 1 to 3 are used for management of picture files as still picture information.

The AUX-TOC sector 1 shown in FIG. 12 is a management sector as a picture allocation table and is used for management of data files recorded as picture files in the AUX data area.

With the AUX-TOC sector 1, management of picture files is performed in a manner similar to that with the U-TOC sector 0.

In the present embodiment, the file length of a picture file of one still picture recorded in the AUX data area is not prescribed specifically. In the present embodiment, however, 100 picture files in the maximum including a cover picture can be managed as hereinafter described. Accordingly, also the number of substantially recordable picture files is 100.

The cover picture may be, for example, a cover picture which is a disc jacket or the like.

In the AUX-TOC sector 1, a sector address (Sector)=01h and mode information (MODE)=02h are recorded in the header.

As pointers P-PNO(x) to be used for management of 99 picture files other than the cover picture, pointers P-PNO1 to P-PNO99 are formed in the AUX-TOC sector 1. At individual byte positions in the pointers from the pointer P-PNO99 to the pointer immediately prior to the table section, 00h is recorded.

However, in order to allow the magneto-optical disc 90 to cope with a case wherein recording of a greater number of picture files is made possible by an expansion of an AUX data area or a change of the file size in the future, it is possible to set, as the pointers P-PNO(x), the pointers P-PNO100 to P-PNO255 to byte positions from the byte position following the pointers P-PNO1 to P-PNO99 to the byte position of the pointer P-PNO255 indicated in blankets in FIG. 12.

Further, the region of 2 bytes following the maker code and the model code is used for the pointers First PNO and Last PNO. In the pointer First PNO, the number x of the first one P-PNO(x) of used ones of the pointers P-PNO1 to P-PNO99, and the number x of the last one P-PNO(x) of used ones of the pointers P-PNO1 to P-PNO99 is recorded in the pointer Last PNO. For example, if it is assumed that, from among the pointers P-PNO1 to P-PNO99, the pointers P-PNO1 to P-PNO5 are used, then the pointer First PNO=01h and the pointer Last PNO=05h are recorded.

In the pointer section, also the pointers P-PFRA and P-EMPTY are formed.

Further, in the table section, 99 part tables 01h to 63h in each of which a start address, an end address and a picture mode as a S. Pict. mode are recorded are formed as part tables of 8 bytes corresponding to the individual pointers. In this instance, similarly to the AUX-TOC sector 0, the remaining part tables 64h to FFh are not used with all 0s (zeros) placed therein.

The part table 00h is prevented from being designated by any pointer, and is used exclusively for address management of a picture file positioned as a cover picture. The picture mode mentioned above is provided also in the part table 00h for a cover picture.

The pointers P-PNO1 to P-PNO99 are used for management of regions, in each of which one picture file is recorded, by designating a particular part table. For example, in a part table designated by the pointer P-PNO1, a start address, an end address and a picture mode as a S. Pict. Mode of a picture file of image data for a first picture are recorded.

It is to be noted that, with the AUX-TOC sector 1, file management which is performed by linking part tables with link information (Link-P) is not performed. In other words, one picture file is not recorded in sections physically spaced from each other.

However, non-used part tables in the AUX-TOC sector 1 are managed with link information, which is provided by the 8th byte of each part table, beginning with the pointer P-EMPTY.

The pointer P-PFRA in the AUX-TOC sector 1 is a pointer to be used for management of a free area where picture data whose amount is smaller than 1 cluster are recorded in a region of 1 cluster in the AUX data area and the region in the 1 cluster in which picture data are not recorded is a non-recorded region as a recordable region and hence a free area. In short, an address of a section as a free area is recorded in a part table designated by the pointer P-PFRA.

The picture mode in each part table in the AUX-TOC sector 1 represents mode information including a copy status of a picture file recorded in an address designated by each part table.

The picture mode as a S. Pict. mode is defined, for example, in such a manner as illustrated in FIG. 19A.

The picture mode is composed of 8 bits d1 to d8, and a copy status is indicated by the two bits of d1 and d2. The copy status is information set regarding whether or not copying of a corresponding picture file is permitted.

In this instance, if the copy status is 0h, then this represents that copying is permitted, and the picture file can be copied any number of times.

If the copy status is 1h, this represents that copying of the picture file is permitted only once.

If the copy status is 2h, this represents that copying of the picture file is permitted only once over an authenticated data bus.

If the copy status is 3h, this represents that copying of the picture file is inhibited.

The remaining 6 bits d3 to d8 are undefined here.

If copying of data is performed for a certain picture file, then the copy status to be given to the picture file after copying is updated in such a manner as illustrated in FIG. 19B from contents of the copy status which has been given to the picture file before copying.

In particular, if the copy status of a certain picture file is 0h before copying, then the copy status 0h is given to the picture file also after copying. In other words, copying of the picture file is permitted any number of times.

On the other hand, if the copy status is 1h or 2h before copying, then the copy status is changed to 3h after copying so that later copying of the picture file is inhibited.

5-3 AUX-TOC Sector 2

FIG. 13 shows the format of the AUX-TOC sector 2. The AUX-TOC sector 2 is used as a picture information table and as a data region into which, where information called picture information is added to each picture file recorded, the information as the picture information is recorded as character information. Here, the picture information in the present embodiment may include a picture name, a recording date/time and a URL (Uniform Resource Locator) of the Internet.

Here, before the AUX-TOC sector 2 is described, a structure of a picture information file recorded in the table section of the AUX-TOC sector 2 is described with reference to FIG. 20. The picture information file here includes information of picture information corresponding to one picture file.

Figure 20:
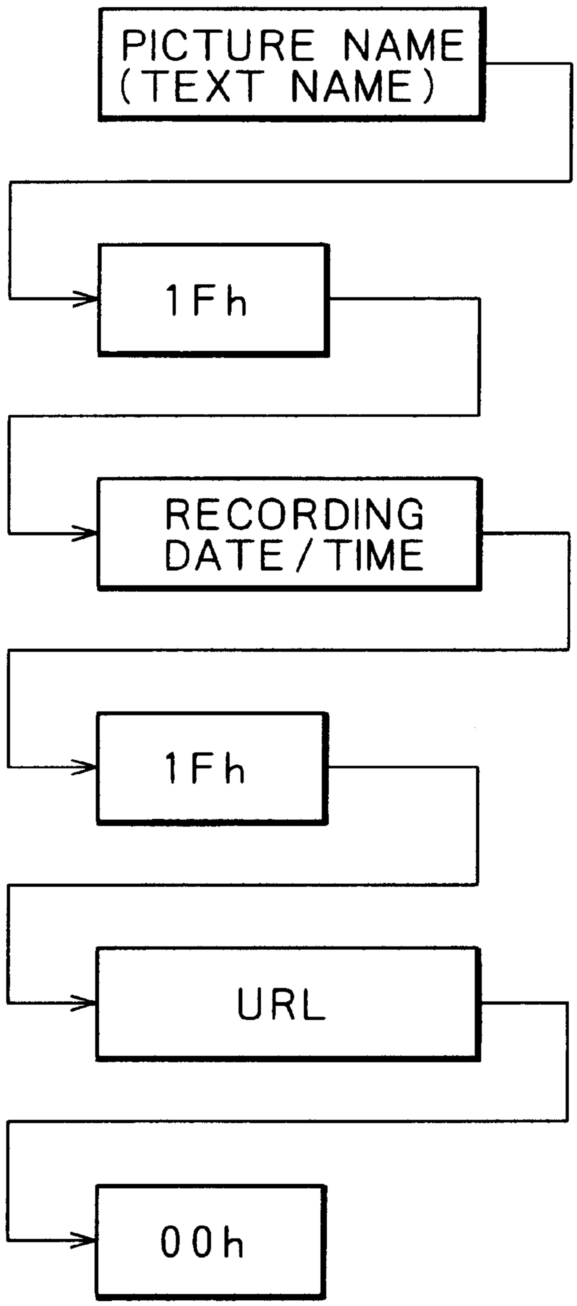
FIG. 20 is a diagrammatic view showing a data structure of a picture (text) information file on the disc.

As seen from FIG. 20, the picture information file has a data unit as a picture name disposed at the top thereof in the form of ASCII codes or some other character codes. The picture name is recorded in accordance with the format of character information recorded in a slot of the U-TOC sector 4 shown in FIG. 10.

Next to the data unit as a picture name, 1Fh indicating a delimiting point between data units is disposed, and a data unit for the recording date/time is disposed next to 1Fh. The recording date/time is recorded in accordance with the format of the recording date/time recorded in a slot of the U-TOC sector 2 shown in FIG. 9 using 6 bytes as described above.

Next to the data unit of the recording date/time, 1Fh mentioned above is disposed, and character information as a URL is disposed next to this 1Fh. The URL may be recorded as an ASCII code from the MSB (Most Significant Bit) without depending upon a character code (character.code) which will be hereinafter described. Then, 00h is disposed at the last end of the file.

It is to be noted that, where one of the data units of the picture name, recording date/time and URL has no substantive contents, 00h can be recorded in place of the data unit.

In regard to the URL described above, for example, where the picture file is obtained by downloading it from a home page of the Internet, the URL of the home page is applied as the URL to the picture file.

Referring back to FIG. 13, the AUX-TOC sector 2 is described.

First, in the header of the AUX-DOC sector 2, a sector address (Sector)=02h and mode information (MODE)=02H are recorded.

Further, in the AUX-TOC sector 2, pointers P-PIF1 to P-PIF99 are prepared in the pointer section so as to correspond to individual picture files recorded on the disc. Further, in the slot section, 255 slots 01h to FFh of 8 bytes which can be designated by the pointers P-PIF1 to P-PIF99 and one slot 00h of 8 bytes are prepared. However, the pointers P-PIF can be expanded up to P-PIF255.

In a region of 2 bytes following the maker code and the model code, pointers First PIF and Last PIF are recorded. The pointer First PIF has recorded therein the number of the first one P-PIF of used ones of the pointers P-PIF1 to P-PIF99. The pointer Last PIF has recorded therein the number of the last one P-PIF of the used ones of the pointers P-PIF1 to P-PIF99.

In the slots 00h to FFh, character information as picture information files are recorded in the form of ASCII codes or some other character codes. The type of characters recorded is defined by a character code recorded at a predetermined byte position on the AUX-TOC sector 2. The character code is denoted as chara.code in FIG. 13.

The character code is defined such that, for example, 00h designates the ASCII code; 01h designates the modified ISO. 8859-1 code; 02h designates the music shifted JIS (Japan Industrial Standard) code; 03h designates the KS C 5601-1989 code (Korean language); and 04h designates the GB 2312-80 code (Chinese language).

The pointers P-PIF1 to P-PIF99 designate particular part tables in which picture information files of file numbers corresponding to the numbers of the individual pointers are recorded. For example, in a slot designated by the pointer P-PIF1, characters corresponding to a picture of a first picture file are recorded. It is to be noted that the slot 00h of 8 bytes is used as an exclusive area for starting of recording of a picture information file corresponding to the cover picture and is prevented from being designated by the pointer P-PIF(x).

The slots are linked with link information so that a picture information file corresponding to one picture file may be recorded even if the size thereof is greater than 7 bytes.

The pointer P-EMPTY is used for management of non-used slots in the form of a link.

It is to be noted that different AUX-TOC sectors may be set for the picture name, recording date/time and URL such that they may be managed individually. However, where various character information applied to picture files is managed collectively as a picture information file as seen in FIGS. 13 and 20, the recording region of the disc is utilized effectively. This is because the amount of data (number of TOC sectors) required for management information is smaller than that where different AUX-TOC sectors are provided for the picture name, recording date/time and URL to manage them.

5-4 AUX-TOC Sector 3

The AUX-TOC sector 3 shown in FIG. 14 is used as a picture playback sequence table in which management information for outputting a picture file, that is, displaying an image of the picture file, in synchronism with reproduction of a program such as a tune.

In the header of the AUX-TOC sector 3, a picture address (sector)=03h and mode information (MODE)=02h are recorded.

Further, as the pointer section corresponding to recorded picture files, pointers P-TNP1 to P-TNP99 are prepared. The pointers P-TNP can be expanded up to PTNP255. The pointers P-TNP1 to P-TNP99 correspond to track numbers of audio data recorded in a unit of a track in the program area. In short, the pointers P-TNP1 to P-TNP99 correspond to the first to 99th tracks.

In the table section, 99 part tables 01h to 63h of 8 bytes designated by the pointers P-TNP1 to P-TNP99 and one part table 00h of 8 bytes are prepared. Also in this instance, all 0s are recorded in the remaining part tables 64h to FFh which are not used. In the pointers First TNP and Last TNO following the maker code and the model code, the number of the first one P-TNP of used ones of the pointers P-TNP1 to P-TNP99 and the number of the last one P-TNP of the used ones of the pointers P-TNP1 to P-TNP99 are recorded, respectively.

In each of the part tables designated by the pointers P-TNP1 to P-TNP99, a start address and an end address are recorded in the form of offset addresses from the address of the top position of the track. With the AUX-TOC sector 3, an address up to a unit of a sound group is designated.

In the 4th byte of each part table, a particular picture file is indicated as a pointer P-PNOj. The pointer P-PNOj has a value corresponding to a corresponding one of picture files (P-PNO1 to P-PNO99) managed with the AUX-TOC sector 1. Further, another part table can be linked with link information. In other words, it is possible to define a plurality of picture files so that they can be displayed on a same track.

For example, when reproduction of a tune of a first track is performed, if it is intended to output a picture of the first picture file at a particular timing during the reproduction, then a start address and an end address of a picture outputting period are recorded into a part table designated by the pointer P-TNP1 corresponding to the first track, and as a picture to be outputted, a particular picture file is indicated with the pointer P-PNOj. Here, a case wherein it is desired to display or output a picture of the first picture file for a period until one minute and 30 seconds pass after a point of time after one minute passes after reproduction of the first track is begun is considered. In this instance, an address point which corresponds to just one minute after the beginning of reproduction of the first track and another address which corresponds to one minute and 30 seconds are recorded as a start address and an end address in the form of offset addresses, respectively, into a part table designated with the pointer P-TNP1. Then, the pointer P-PNOj is set to the value of P-PNO1 so that it may designate the first picture file.

Where it is desired to switchably display a plurality of pictures during reproduction of one track, part tables are linked to manage the picture files to be outputted and the outputting periods.

It is to be noted that, while the part table 00h corresponds to the cover picture, since it is prescribed that, in principle, the cover picture be not outputted in synchronism with an audio track, all 0s are recorded as the start address and the end address of the part table 00h.

By the way, if the start address and the end address of a part table corresponding to a certain track are both all 0s, then a picture of a picture file indicated by the designated pointer P-PNOj is displayed within a period in which sound of the track is outputted.

If only the end address is all 0s, then a picture file designated with the pointer P-PNOj is outputted until a start address of a picture file to be displayed subsequently is reached within a period of reproduction of the track.

If both of the start address and the end address are different from all 0s and have an equal value, displaying and outputting of the picture file are inhibited.

Also with the AUX-TOC sector 5, non-used part tables are managed using a link from the pointer P-EMPTY.

5-5 AUX-TOC Sector 4

The AUX-TOC sectors 4 and 5 are used for management of text files.

First, the AUX-TOC sector 4 shown in FIG. 15 is a management sector as a text allocation table and is used for management of data files recorded as text files in the AUX data area.

With the AUX-TOC sector 4, management of text files is performed in a similar manner to that with the U-TOC sector 0.

If it is assumed that the AUX data area is used entirely for recording of text files, then text data for 38 clusters (×32 sectors×2,324 bytes) can be recorded there. Such text data can be managed as 255 files in the maximum with the AUX-TOC sector 4. However, it is assumed here that up to 100 files including one cover picture file are managed as hereinafter described.

It is to be noted that the file length of one text file is equal to the length of one sector.

One particular text file is a text file corresponding to the cover picture of the disc and can be regarded as a cover text.

In the header of the AUX-TOC sector 4, a sector address (Sector)=04h and mode information (MODE) are recorded.

As pointers P-TXNO(x) to be used for management of text files, pointers P-TXNO1 to P-TXNO99 are formed in the AUX-TOC sector 6. The pointers P-TXNO1 to P-TXNO99 correspond to the track numbers of the audio tracks. It is to be noted that the pointers P-TXNO can be expanded up to P-TXNO255. Consequently, here, 99 text files corresponding to the first to 99th audio tracks in the maximum can be managed except the cover text file.

Also the pointers P-PFRA and P-EMPTY are formed in the pointer section.

Further, as part tables of 8 bytes corresponding to the individual pointers, 99 part tables 01h to 63h in each of which a start address, an end address and a text mode are recorded are formed in the table section. The remaining part tables 64h to FFh are not used with all 0s stored therein.

It is to be noted that contents of a definition of the text mode are hereinafter described.

The part table 00h is prevented from being designated by any pointer. Here, however, the part table 00h is used exclusively for management of an address of a text file determined as a cover text and the text mode.

The pointers P-TXNO1 to P-TXNO99 are used for management of regions, in each of which one text file is recorded, each by designating a particular part table. For example, in a part table designated with the pointer P-TNXO1, a start address, an end address and a text mode of the first text file are recorded as a file number.

It is to be noted that, since a text file is handled in a unit of a sector as described above, the start address and the end address are each described up to a sector unit, and 0h is placed in the data position for indicating a sound group.

Further, with the AUX-TOC sector 6, file management which is performed with part tables linked with link information is not performed. In other words, one text file is not recorded in sections physically spaced from each other.

However, non-used part tables in the AUX-TOC sector 6 are managed with link information, which is provided by the 8th byte of each part table, beginning with the pointer P-EMPTY.

In the pointer P-PFRA in the AUX-TOC sector 4, data of a text file whose amount is smaller than 1 cluster are recorded in a region of 1 cluster in the AUX data area. Further, the pointer P-PFRA serves as a pointer for management of a free area where the region in the 1 cluster in which data are not recorded is a non-recorded region as a recordable region and hence a free area. Also for the free area management, the 8th byte of each part table may be used as link information to allow the part tables to be linked to each other so that a plurality of sections spaced from each other may be managed as a free area.

Here, contents of a definition of the text mode set in each part table of the AUX-TOC sector 4 are described with reference to FIG. 21.

The text mode is a region at the position of the fourth byte in each part table and is formed from 8 bits d1 to d8 (1 byte).

Of the 8 bits d1 to d8, the two bits d1 and d2 indicate a copy status. The copy status is similar to the S. Pict. Mode which is the copy status regarding a picture file described hereinabove with reference to FIG. 19A, and therefore, overlapping description of it is omitted here.

The two bits d3 and d4 indicate contents of the text file. In this instance, if the two bits d3 and d4 are 0h, then it indicates that the text file is a sung text.

In particular, it is indicated that the text file is a text of the words of a tune of a corresponding audio track. If the bits d3 and d4 are 1h, then it indicates that the text file is a text in which artist information such as the name of the artist who plays the tune in the corresponding audio track is described.

If the bits d3 and d4 are 2h, then it indicates that the text file describes a liner note such as explanation annexed to an album, and if the bits d3 and d4 are 3h, then it indicates that the text file describes some other information.

The one bit of d5 indicates presence or absence of a time stamp inserted in the text file. If the bit d5 is 0, then it indicates absence of a time stamp, but if the bit d5 is 1, then it indicates presence of a time stamp. It is to be noted that a time stamp is hereinafter described with reference to FIG. 22.

The three bits of d6, d7 and d8 represent a character code. The character code is set such that, for example, 0h designates the ASCII code; 1h designates the modified ISO. 8895-1 code; 2h designates the music shifted JIS code; 3h designates the KS C 5601-1989 code (Korean language); and 4h designates the GB 2312-80 code (Chinese language). The character code is undefined (reserved) for 5h and 6h. The character code 7h designates a plain text. By defining the text file as a plain text file, it is possible to provide expandability to the character code.

5-6 AUX-TOC Sector 5

FIG. 16 shows a format of the AUX-TOC sector 5. The AUX-TOC sector 5 is used as a text information table and used as a data area into which, when text information, that is, information of a text name, a recording date/time and a URL of the Internet, is applied to each text file recorded, the information as the text information is recorded as character information.

It is to be noted that a text information file recorded in the table section of the AUX-TOC sector 5 has a structure similar to that of a picture information file described hereinabove with reference to FIG. 20. More particularly, a text information file has a similar structure except that a data unit of a picture name in FIG. 20 is a data unit of a text name.

In the format of the AUX-TOC sector 5 shown in FIG. 16, a sector address (Sector)=05h and mode information (MODE)=02h are recorded in the header.

Further, in the AUX-TOC sector 5, pointers P-TXIF1 to P-TXIF99 are prepared in the pointer section in a corresponding relationship to text files recorded. Further, in the slot section, 255 slots 01h to FFh of 8 bytes which can be designated by the pointers P-TXIF1 to P-TXIF99 and one slot 00h of 8 bytes are prepared. It is to be noted that the pointers P-TXIF can be expanded up to P-TXIF255.

Further, in the pointer First TXIF following the maker code and the model code, the number of the first one P-TXIF of used ones of the pointers P-TXIF1 to P-TXIF99 is recorded, and in the pointer Last TXIF, the number of the last one P-TXIF of the used ones of the pointers P-TXIF1 to P-TXIF99 is recorded.

In the slots 00h to FFh of the table section, character information of text information files is recorded in the form of the ASCII code or some other character code. The type of characters to be recorded is defined by a character code (chara.code) recorded at a predetermined byte position on the AUX-TOC sector 2.

Also in this instance, the character code is set similarly as in the AUX-TOC sector 2 such that, for example, 00h designates the ASCII code; 01h designates the modified ISO. 8895-1 code; 02h designates the music shifted JIS code; 03h designates the KS C 5601-1989 code (Korean language); and 04h designates the GB 2312-80 code (Chinese language).

The pointers P-TXIF1 to P-TXIF99 designate particular part tables in which text information files of file numbers corresponding to the numbers of the individual pointers are recorded. For example, in a slot designated by the pointer P-TXIF1, characters corresponding to a picture of the first text file are recorded. It is to be noted that the slot 00h of 8 bytes is used as an area for exclusive use for starting of recording of a cover text information file corresponding to a cover text, and is prevented from being designated with the pointer P-TXIF(x).

The slots described above can be linked with link information so that a text information file corresponding to one text file can be treated even if the text information file has a size greater than 7 bytes.

Further, the pointer P-EMPTY is used for management non-used slots in the form of a link.

Also in this instance, different AUX-TOC sectors may be set for the text name, recording date/time and URL such that they may be managed individually. However, where various character information applied to picture files is managed collectively as text information files with the AUX-TOC sector 5, the number of TOC sectors as the amount of data required for management information is reduced similarly as with an information file.

6. Data File 6-1 Picture File Sector

Two kinds of data files including a picture file and a text file which are AUX data files managed with the AUX-TOC sectors formed in such a manner as described above are described below.

As regards a picture file, the file length of one still picture may be an arbitrary one. The image size of a still picture is 640×480 dots, and a picture file is based on the JPEG format baseline. Since management of picture files is performed with the AUX-TOC, a bit stream of a file extends from the SOI (Start Of Image) marker to the EOI (End Of Image) marker prescribed in the JPEG standards.

Further, since the sector format is the mode 2 and the 3rd layer ECC is not used, the effective byte number as an image data capacity of one sector is 2,324 bytes. As an example, if it is assumed that a picture file of the JPEG has a size of 1 cluster (=32 sectors), then the actual data size ranges from 72,045 (=2,324×31+1) bytes to 74,368 (=2,324×32) bytes.

Figure 17:
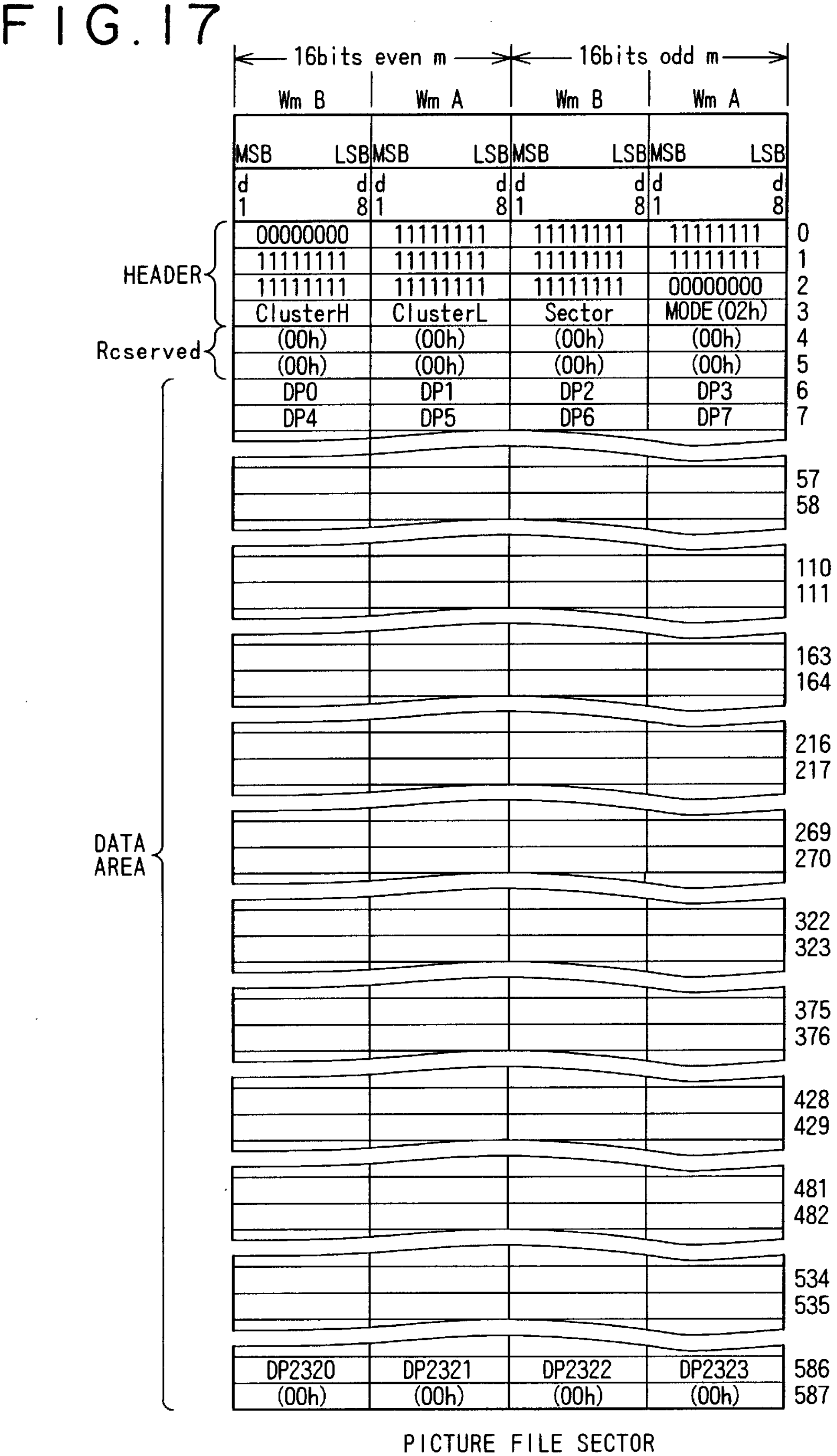
FIG. 17 is a diagrammatic view illustrating a file picture sector of the disc.

The format of sectors which form such picture files as described above is such as, for example, illustrated in FIG. 17.

Referring to FIG. 17, a header of 16 bytes which includes the synchronization pattern, a cluster address (Cluster H, Cluster L), a sector address (Sector) and mode information (02h) is provided at the top of the format, and the following 8 bytes are undefined (Reserved).

Then, as indicated as data DP0 to DP2323, a region as a data area in which image data of 2,324 bytes are recorded is provided.

In each of the last 4 bytes, 00h is recorded. Alternatively, however, error detection parities may be recorded in the last 4 bytes.

6-2 Text File Sector

In a text file, text data of the ASCII, Modified ISO 8859-1, Music Shifted JIS or the like defined by the text mode of the AUX-DOC sector 4 can be recorded.

Figure 18:
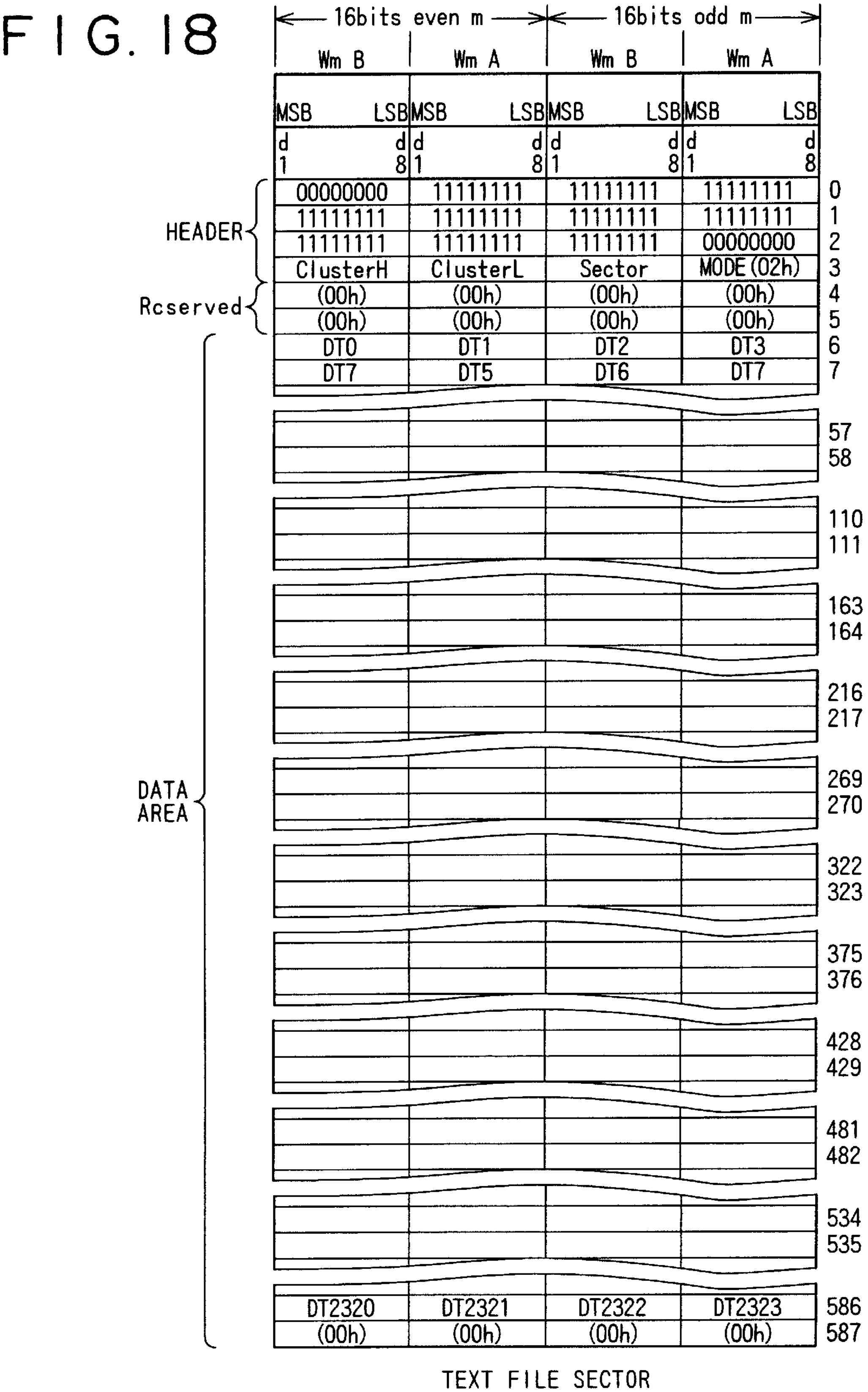
FIG. 18 is a diagrammatic view illustrating a text file sector of the disc.

The format of a sector which forms a text file is such as, for example, shown in FIG. 18. Referring to FIG. 18, similarly as in a picture file, a header (16 bytes) and an undefined (Reserved) region (8 bytes) are provided from the top of the text file. Following them, a data area is provided in which data as text files of 2,324 bytes are recorded as indicated as data DT0 to DT2323.

In each of the last 4 bytes, 00h is provided. Alternatively, however, error detection parities may be recorded in the last 4 bytes.

Figure 22:
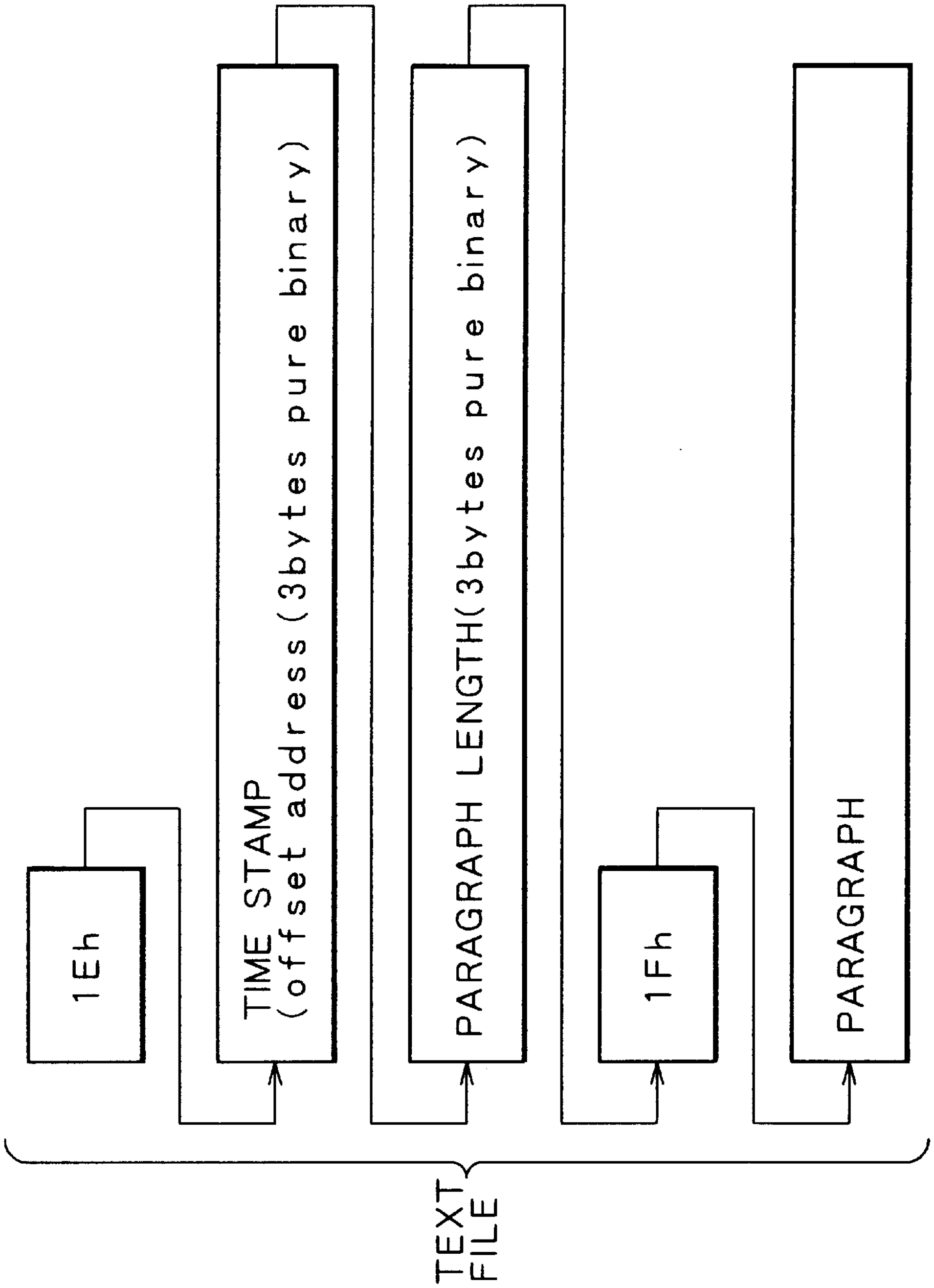
FIG. 22 is a diagrammatic view showing a data structure of a text file on the disc where the text file includes a time stamp.

A data structure of a text file recorded in a text file sector is shown in FIG. 22. It is to be noted, however, that the text file shown has a data structure corresponding to a case wherein presence of a time stamp (d5="1") is set as the text mode of the AUX-TOC sector 4.

As seen from FIG. 22, in the text file, 1Eh which indicates a delimiting point of each text file is disposed, and following this, a data unit (3 bytes pure binary) indicating a time stamp is disposed.

The time stamp defines a displaying or outputting timing of a text file synchronized with reproduction of a corresponding audio track and is indicated by an offset address of the corresponding audio track.

Following the data unit indicating a time stamp, a data unit (3 bytes pure binary) of a paragraph length indicative of a data length of a data unit of a paragraph is disposed. Further, following data of 1Fh, a data unit of a paragraph (substantive character information) is disposed.

7. Data Reading Out Operation upon Synchronized Reproduction 7-1 Example of Operation In the recording and reproduction apparatus of the present embodiment having the construction described above, audio reproduction of a program as audio data recorded in the program area of a disc can be performed based on U-TOC information. Here, if the program is in a condition compressed in accordance with the ATRAC, it is also referred to as ATRAC data. Further, based on AUX-TOC information, reproduction outputting, that is, displaying outputting, of a picture file or a text file as an AUX data file can be performed in synchronism with the reproduction time of the program. Furthermore, in the present embodiment, upon reproduction outputting (hereinafter referred to merely as synchronized reproduction) of the AUX data file synchronized with program reproduction, an operation of reading out all AUX data files required for synchronized reproduction from the disc and storing them into the buffer memory 13 in advance is not performed. Therefore, as hereinafter described in detail, an operation of reading out the AUX data file from the disc and storing it into the buffer memory 13 is performed within a period within which the stored amount of program data in the buffer memory 13 is greater than a predetermined level and reading out of program data from the disc stops during an audio reproduction outputting operation.

Therefore, before a data reading out operation upon synchronized reproduction in the present embodiment is described, an outline of synchronized reproduction is described taking a disc having certain recorded contents as an example.

In FIGS. 23A, 23B, 23C, 23D and 23E, a relationship between programs on a certain disc and picture files reproduced in synchronism with the programs is illustrated as an example.

Figures 23A, 23B, 23C, 23D, 23E:
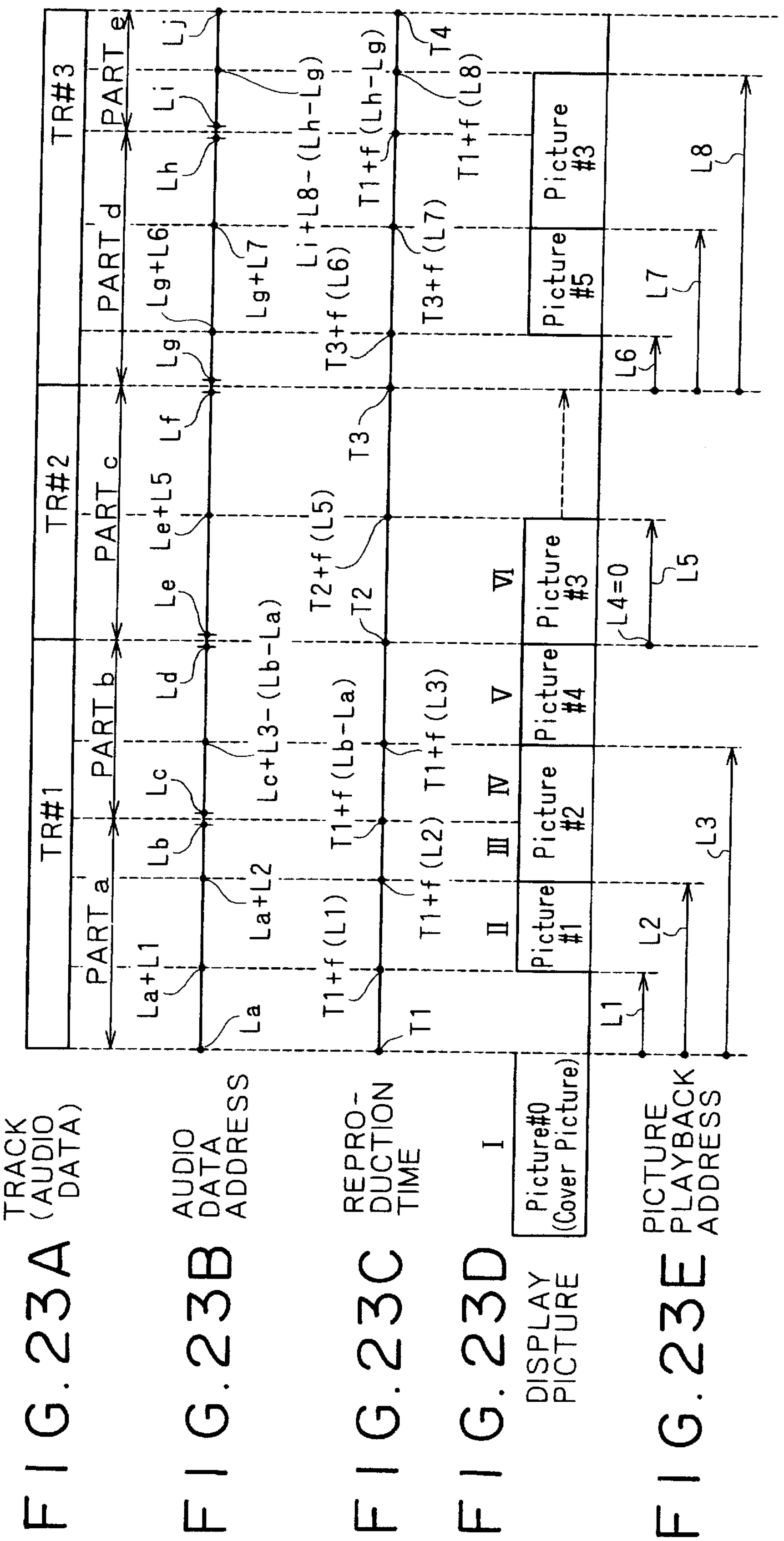
FIG. 23A is a diagrammatic view showing programs recorded on tracks in accordance with the reproduction time base in an example of a management condition wherein the tracks and picture files to be reproduced and outputted in synchronism with the tracks are managed.
FIG. 23B is a diagrammatic view showing addresses on the disc on which the programs are recorded in the example of the management condition.
FIG. 23C is a diagrammatic view showing reproduction times of the programs in the example of the management condition.
FIG. 23D is a diagrammatic view showing the picture files reproduced and displayed or outputted in synchronism with the programs in accordance with the reproduction times in the example of the management condition.
FIG. 23E is a diagrammatic view showing playback addresses of the picture files shown in FIG. 23D in the example of the management condition.

FIG. 23A shows audio data of programs recorded on the disc in accordance with a reproduction time base, and FIG. 23B shows addresses on the disc at which the programs are recorded. FIG. 23C illustrates reproduction times of the programs, and FIG. 23D show picture files reproduced and displayed or outputted in synchronism with the programs in accordance with the reproduction times. FIG. 23E shows playback addresses of the picture files shown in FIG. 23D, which are defined by contents of the AUX-TOC sector 3 described hereinabove with reference to FIG. 14.

It is assumed that, on the disc, as tracks of audio programs, 3 tracks TR #1, #2 and #3 are recorded as shown in FIG. 23A. Also it is assumed that the tracks TR #1, #2 and #3 are recorded in the order of the track number (#n) in principle.

Figure 24:
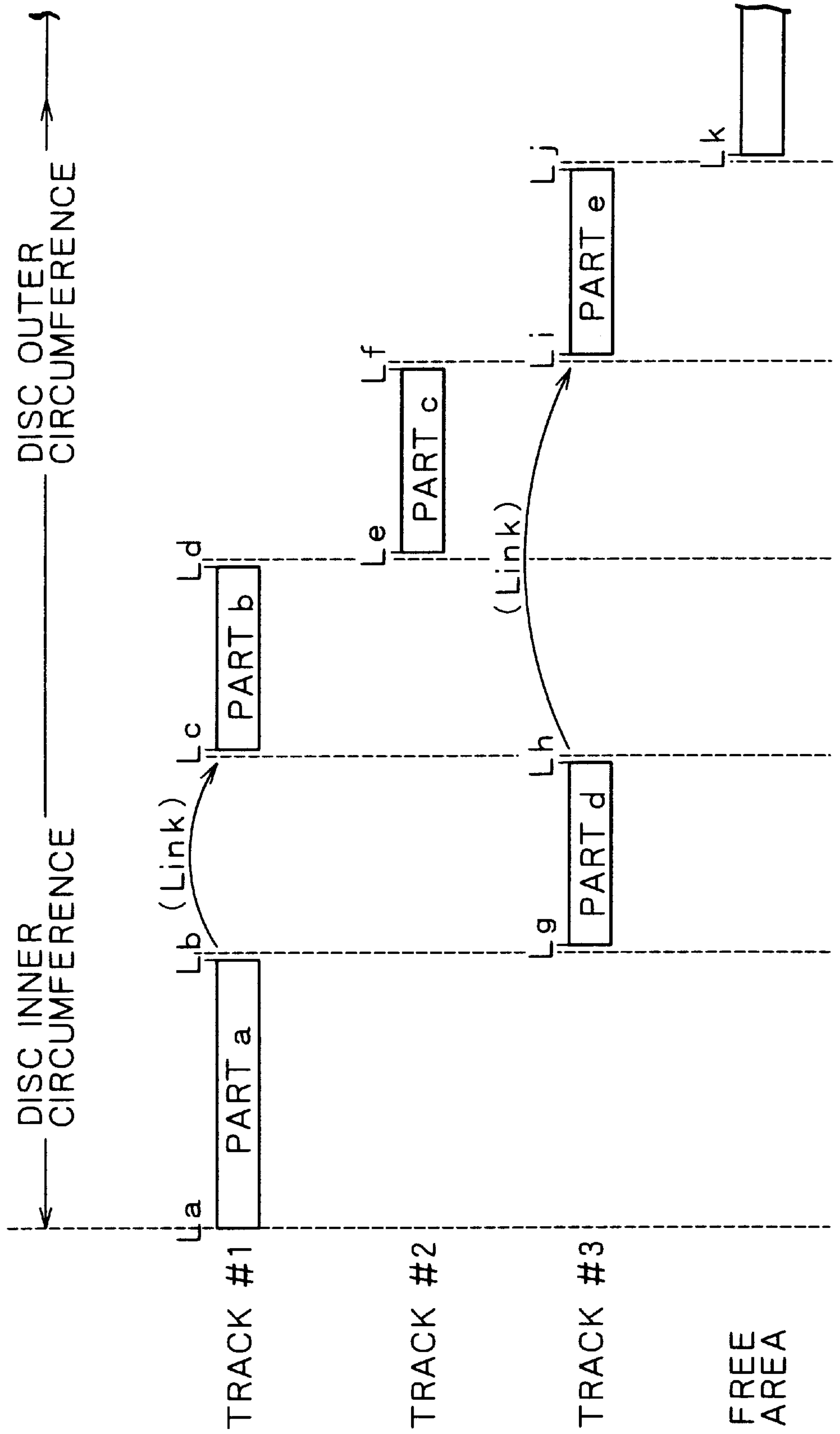
FIG. 24 is a diagrammatic view illustrating a concept of physical recorded conditions of tracks on the disc illustrated in FIGS. 23A to 23E.

Further, it is assumed that the tracks TR #1, #2 and #3 are recorded in such a manner as seen in FIGS. 23B and 24 on the disc.

The track TR #1 is composed of two parts including a part 1 of addresses La to Lb and another part b of addresses Lc to Ld, and the parts a and b are managed with link information in the U-TOC sector 0 such that they are linked to each other. In this instance, the address La is an address of the innermost circumference of the disc, and if an address of the compacted representation is not used, the address La actually is La=(0032h (cluster), 00h (sector), 0h (sound group)).

The track TR #2 is composed of one part c of addresses Le to Lf.

Also the track TR #3 here is composed of two parts including a part d of addresses Lg to Lh and another part e of addresses Li to Lj, and it is designated with link information in the U-TOC sector 0 that the two parts d and e be linked to each other.

In this instance, as shown in FIG. 24, following an address Lk of an outer circumference side of the disc from the end address of the part e on the rear side of the track TR #3, no real data is recorded. Accordingly, an area from the address Lk to the end address of the program area is defined as a free area. For example, if the disc has a recordable time of 74 minutes, then the actual end address of the program area is substantially 08CAh (cluster).

Further, each track shown in FIG. 23A corresponds to a reproduction time as shown in FIG. 23C. In this instance, it is prescribed that reproduction of the track TR #1 be started at the time T1; reproduction of the track TR #2 be started at the time T2; and reproduction of the track TR #3 be started at the time T3.

It is to be noted that a reproduction time illustrated in FIG. 23C can be determined, for example, with regard to the track TR #1, by conversion from an offset address of the track TR #1 being reproduced at present with respect to the time T1=address L1, and here, it is represented as a function. For example, the reproduction time of the track TR #1 represented by the address La+L1 is represented as T1+f(L1). Further, as regards the reproduction time at a delimiting position of a part, for example, the delimiting position between the parts a and b of the track TR #1 is represented as T1+f(Lb−La), and the delimiting position between the parts d and e of the track TR #3 is represented as T3+f(Lh−Lg).

Further, it is assumed that, as AUX data files recorded on the disc, six picture files Picture #0, #1, #2, #3, #4 and #5 are recorded. Furthermore, it is assumed that the synchronous reproduction timings of the picture files with the tracks are prescribed in such a manner as shown in FIGS. 23D and 23E.

First, the picture file Picture #0 is prescribed as a cover picture. Here, the cover picture has image contents corresponding to a cover jacket of the disc as described hereinabove. The picture file Picture #0 of the cover picture is displayed, for example, in a stage preceding to a time at which reproduction of a track is started as seen in FIG. 23D. In this instance, if reproduction of a track is started, then the displaying outputting of the cover picture is stopped. However, it is otherwise possible to continue displaying of the cover picture also after starting of reproduction of a track and stop the displaying when a picture file to be displayed or outputted in synchronism with reproduction of the track is displayed or outputted.

As regards synchronized reproduction timings after starting of reproduction, the picture files Picture #1, #2 and #4 are reproduced in synchronism with the track TR #1. Display of the picture file Picture #1 is started at a position indicated by the offset address L1 (reproduction time T1+f(L1)) after the beginning of reproduction of the track TR #1, and is ended at a point of time at which display of the picture file Picture #2 is started at a position indicated by the offset address L2 (T1+f(L2)).

Display of the picture file Picture #2 is started at the position indicated by the offset address L2 (reproduction time T1+f(L2)), and is ended at a point of time at which display of the picture file Picture #4 is started at a position indicated with the offset address L3 (T1+f(L3)). In this instance, it is prescribed that the picture file Picture #2 be displayed or outputted over reproduction of the part a and the part b.

Display of the picture file Picture #4 is started at the timing indicated by the offset address L3 (reproduction time T1+f(L3)), and is ended at a point of time at which the display of the track TR #1 is ended.

Here, the address of the track TR #1 corresponding to the offset address L3 can be determined by calculation of Lc+L3−(Lb−La) as shown in FIG. 23B because the track TR #1 is formed from the parts a and b.

As regards the track TR #2, it is prescribed that the picture file Picture #3 be displayed over a period after a reproduction starting point of time of the track TR #2 (offset address L4 from the address Le=0, reproduction time T2) till a point of time indicated by the offset address L5 (reproduction time T2+f(L5)).

The picture files Picture #5 and #3 are reproduced in synchronism with the track TR #3. It is prescribed that the picture file Picture #3 be reproduced also in synchronism with the track TR #1. As can be recognized from this, in the present format, one picture file may be prescribed to be reproduced in synchronism with a plurality of tracks.

Display of the picture file Picture #5 is started at a position indicated by the offset address L6 with reference to the starting point of time (address Lg, reproduction time T3) of reproduction of the track TR #3, and is ended at a point of time at which display of the picture file Picture #3 is started at a position indicated by the offset address L7 (T3+f(L7)).

Display of the picture file Picture #3 is started at the position indicated by the offset address L7 (reproduction time T3+f(L7)), and is ended at a point of time indicated by the offset address L8 (reproduction time T3+f(L8)).

Also here, the address of the track TR #3 corresponding to the offset address L8 can be determined by calculation of Li+L8−(Lh−Lg) as seen in FIG. 23B because the track TR #3 is formed from the parts d and e.

In order to allow reproduction of the disc to be performed in such a manner as illustrated in FIGS. 23A, 23B, 23C, 23D and 23E, the programs or tracks TR #1, #2 and #3 and the AUX data files Picture #3, #4 and #5 are managed with the management information of the U-TOC and the AUX-TOC. Here, contents of the management information corresponding to FIGS. 23A, 23B, 23C, 23D and 23E are described with reference to FIGS. 25 and 26.

FIG. 25 illustrates contents of the U-TOC sector 0 of the disc which is reproduced in such a manner as illustrated in FIGS. 23A, 23B, 23C, 23D and 23E. Reproduction of the tracks TR #1, #2 and #3 illustrated in FIGS. 23A and 23B is defined by the U-TOC sector 0.

In this instance, a cluster address (Cluster H=00h, Cluster L=one of 03h to 05h), a sector address (Sector)=00h and mode information (MODE)=02h are indicated in the header.

In this instance, since the three tracks TR #1 to #3 are recorded as programs, 01h and 03h are recorded in the track numbers First TNO and Last TNO at predetermined byte positions following the header. Further, 01h is recorded at the byte position for the sector use situation (US: Used sectors). It is to be noted that, in FIG. 25, the track numbers First TNO and Last TNO are denoted as F·TNO and L·TNO, respectively.

Further, 01h is recorded in the pointer P-TNO1 corresponding to the track TR #1. Consequently, in a part table 01h designated by the pointer P-TNO1, the start address La (=cluster (32h) and sector (00h)) and the end address Lb of the part a are recorded, and a link to the part table 02h is designated by link information 02h.

In the part table 02h of the destination of the link, the start address Lc and the end address Ld of the part b are recorded, and 00h is recorded in the link information, thereby representing absence of a further link. Consequently, management is performed such that the track TR #1 is formed by the link from the part a to the part b as seen from FIGS. 23A and 24.

Another part table 03h is designated by the pointer P-TNO2 corresponding to the track TR #2. The start address Le and the end address Lf of the part c are recorded in the part table 03h.

The pointer P-TNO3 corresponding to the track TR #3 designates the part table 04h. In the part table 04h, the start address Lg and the end address Lh of the part d are recorded, and the link information 05h is recorded, which indicates a link to the part table 05h. In the part table 05h of the destination of the link the start address Li and the end address Lj of the part e are recorded, and the link information 00h is recorded, which indicates absence of a further link. Consequently, management is performed such that the track TR3 is formed by the link from the part d to the part e as seen from FIGS. 23A and 24.

Here, the track modes in the part tables 01h to 05h which indicate the addresses of the parts a to e are set to E2h (=11100010) so that they may actually represent contents of information such as absence of protection of copyright of audio data, stereo, and presence of emphasis.

Further, 00h is placed in each of those pointers beginning with the pointer P-TNO4 and ending with the pointer P-TNO255 so as to indicate that the pointers are not used.

In this instance, the part table 06h is designated by the pointer P-FRA, and the start address Lk and the end address, cluster 8Ch, sector 00h, of a free area in the program area are indicated in the part table 06h. In this instance, the cluster 8Ch and the sector 00h correspond to the end address of the program area. Further, in this instance, the free area is formed not discretely in the program area, and accordingly, 00h is placed in the link information.

The pointer P-EMPTY designates the part table 07h, and the part tables 07h to FFh are linked with link information and managed as non-used part tables.

Further, assuming here that no defect area is involved, 00h is recorded in the pointer P-DFA.

FIG. 26 illustrates contents of the AUX-TOC sector 3 of the disc illustrated in FIGS. 23A, 23B, 23C, 23D and 23E. The AUX-TOC sector 3 defines outputting timings of the picture files Picture #1 to #5 synchronized with reproduction of the tracks TR #1, #2 and #3 illustrated in FIGS. 23A and 23B. It is to be noted that, although the start addresses and the end addresses of the picture files Picture #1 to #5 are actually managed as the recorded positions of them in the AUX data area with the AUX-TOC sector 1, description and illustration of the same are omitted.

In the AUX-TOC sector 3 illustrated in FIG. 26, the cluster address Cluster H=00h, Cluster L=one of 07h to 09h, the sector address (Sector)=03h and the mode information (MODE)=02h are indicated in the header.

In this instance, since the three tracks TR #1 to #3 are defined as tracks to be reproduced in synchronism with picture files, 01h and 03h which indicate the tracks TR #1 (first track) and TR #3 (last track) are recorded in the track numbers First TNO and Last TNO at predetermined byte positions following the header. This signifies that the pointers P-TNP1 to P-TNP3 in the pointer section are used. It is to be noted that, in FIG. 26, the track numbers First TNP and Last TNP are denoted as F·TNP and L·TNP, respectively.

Further, 01h is recorded in the pointer P-TNP1 corresponding to the track TR #1. In the slot 01h indicated by the pointer P-TNP1, the start offset address L1 and the end offset address (all 0s) with reference to the start address of the track TR #1 are recorded. Further, 01h indicating the picture file Picture #1 is recorded in the pointer P-PNOj in the slot 01h. Consequently, the picture file Picture #1 is displayed in synchronism with the track TR #1 for a period from the point of time indicated by the offset address L1 to the point of time at which display of a next picture file is started. Further, it is indicated by the link information 02h in the slot 01h that the slot 01 be linked to the slot 02h.

In the slot 02h, the start offset address L2 and the end offset address (all 0s) with reference to the start address of the track TR #1 are recorded. In the pointer P-PNOj, 02h indicating the picture file Picture #2 to be reproduced subsequently to the picture file Picture #1 is recorded. Further, 03h is recorded as the link information and indicates that the slot 02h be linked to the slot 03h.

In the slot 03h, the start offset address L3 and the end offset address (all 0s) with reference to the start address of the track TR #1 are recorded. In the pointer P-PNOj, 04h indicating the picture file Picture #4 to be reproduced subsequently to the picture file Picture #2 is recorded. Further, 00h is recorded as the link information and indicates that there is no picture file to be reproduced in synchronism with the track TR #1.

The contents described above thus designate that reproduction of the picture files Picture #1, #2 and #4 be performed in synchronism with the track TR #1 in such a manner as seen in FIGS. 23A, 23B, 23C, 23D and 23E.

Meanwhile, in the pointer P-TNP2 corresponding to the track TR #2, 04h is recorded. In the slot 04h indicated by the pointer P-TNP2, the start offset address L4 (=cluster 00h, sector 00h) and the end offset address L5 with reference to the start address of the track TR #2 are recorded. Further, 03h indicating the picture file Picture #3 to be reproduced in synchronism with the track TR #2 is recorded in the pointer P-PNOj in the slot 04h. Consequently, it is designated that the picture file Picture #3 be displayed in synchronism with the track TR #2 for a period from the reproduction starting point of time of the track TR #2 to the point of time indicated by the end offset address L5. In this instance, since the track TR #2 does not have another picture file to be displayed or outputted further, 00h is placed in the link information in the slot 04h.

In the pointer P-TNP3 corresponding to the track TR #3, 05h is recorded. In the slot 05h indicated by the pointer P-TNP3, the start offset address L6 and the end offset address (all 0s) with reference to the start address of the track TR #3 are recorded. Further, 05h indicating the picture file Picture #5 to be reproduced first in synchronism with the track TR #3 is recorded in the pointer P-PNOj in the slot 05h. Further, 06h is recorded as the link information 06h in the slot 05h and indicates that the slot 05h be linked to the slot 06h.

In the slot 06h, the start offset address L7 and the end offset address L8 with reference to the start address of the track TR #3 are recorded. In the pointer P-PNOj in the slot 06h, 03h indicating the picture file Picture #3 to be reproduced in synchronism with the track TR #3 subsequently to the picture file Picture #5 is recorded. Further, 00h is recorded as the link information in the slot 06h because there is no picture file to be displayed or outputted in the track TR #3.

The contents described above thus designate that displaying or outputting of the picture files Picture #5 and #3 be performed in synchronism with the track TR #3 in such a manner as seen in FIGS. 23A, 23B, 23C, 23D and 23E.

In the slot 00h prescribed as a slot corresponding to the cover picture, 00h indicative of the picture file Picture #0 for the pointer P-PNOj is stored, and all zeros are recorded in the start offset address and the end offset address. In this instance, since no other picture file is prescribed as the cover picture, 00h is placed in the link information.

The pointer P-EMPTY indicates the part table 07h, and the part tables 07h to FFh are linked with each other with link information so that they are managed as non-used part tables.

In this manner, reproduction of tracks and synchronized reproduction of picture files with the tracks from the disc are prescribed in such a manner as seen in FIGS. 23A, 23B, 23C, 23D and 23E based on the management information of contents illustrated in FIGS. 25 and 26.

Subsequently, an operation of reading out data from the disc upon synchronized reproduction in the present embodiment is described taking the disc of FIGS. 23A, 23B, 23C, 23D and 23E, in which synchronized reproduction is prescribed in such a manner as described above, as an example again.

As described hereinabove, the recording and reproduction apparatus of the present embodiment includes the buffer memory 13, and data read out from the disc are temporarily stored into the buffer memory 13 and then outputted as reproduction sound. Further, in the present embodiment, also AUX data files read out from the disc so as to be used for synchronized reproduction are stored into the buffer memory 13 and then read out from the buffer memory 13 to effect displaying or outputting of a reproduction output of the AUX data files. Furthermore, in the present embodiment, reading out of data from the disc upon synchronized reproduction is performed based on the stored amount of audio data in the buffer memory 13 in such a manner as described below.

Figure 27:
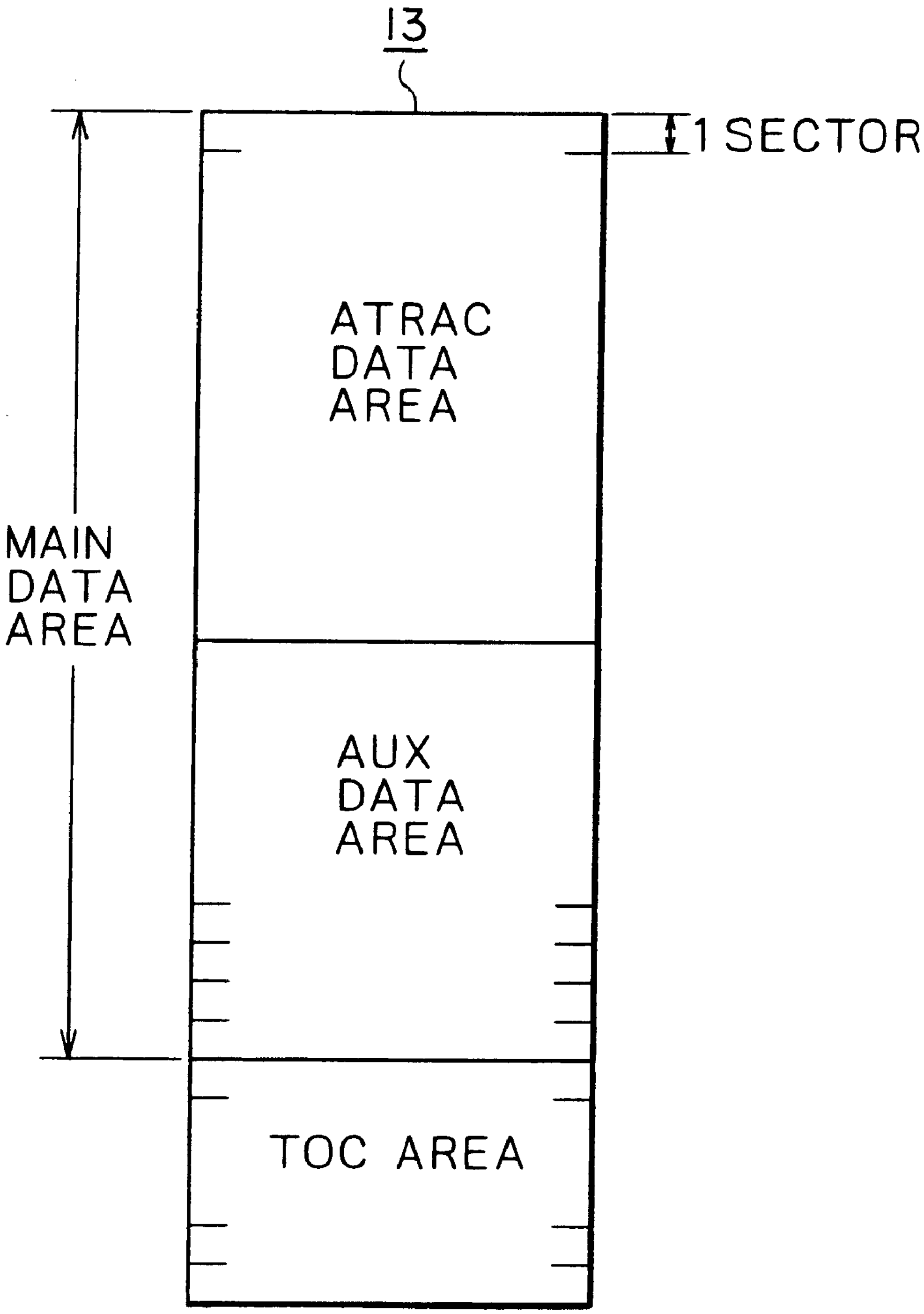
FIG. 27 is a diagrammatic view showing an example of a data allocation structure of a buffer memory in the recording and reproduction apparatus of FIG. 1.

Thus, a data allocation structure in the buffer memory 13 in the present embodiment is described first with reference to FIG. 27.

The storage area of the buffer memory 13 is roughly divided into a TOC area and a main data area as seen in FIG. 27. The TOC area is an area in which TOC data and U-TOC data read out from a disc loaded in the recording and reproduction apparatus at present are stored. Here, the U-TOC is a general term of the P-TOC, U-TOC and AUX-TOC.

The main data area is an area in which ATRAC data for recording and reproduction and AUX data file are stored, and is divided, for example, into an ATRAC data area in which ATRAC data are cumulatively stored and an AUX data area into which AUX data files are stored.

Although the capacity of the buffer memory 13 is not limited particularly, where the buffer memory 13 has the capacity of 16 Mbits, the data capacity thereof is 2,097,152 bytes. Since 1 sector=2,368 bytes, the buffer memory 13 can have 885 sectors as represented by 2,097,152/2,368 (byte number for one sector)≈885.6.

Of the totaling 885 sectors, 16 sectors are allocated to the TOC area and the remaining 869 sectors are allocated to the main data. Further, each of the ATRAC data area and the AUX data area in the main data area may be divisionally set normally fixedly with a fixed size set arbitrarily, or may be divisionally set with a suitable area size determined for each disc loaded in the recording and reproduction apparatus in accordance with data files to be stored in the AUX data area, for example, by referring to the contents of the AUX-TOC.

Subsequently, a data reading out operation from the disc shown in FIGS. 23A, 23B, 23C, 23D and 23E when synchronized reproduction of the disc is to be performed is described based on the description given hereinabove. Here, it is presumed that reproduction of the audio data is performed in the order of tracks TR #1→#2→#3.

If the disc shown in FIGS. 23A to 23E is loaded into the recording and reproduction apparatus of the present embodiment, then management information of the U-TOC and the AUX-TOC is read out from the management area of the disc and stored into the TOC area of the buffer memory 13. Thereafter, the recording and reproduction apparatus performs reproduction and recording operations based on the management information stored in the TOC area of the buffer memory 13.

Here, the recording and reproduction apparatus can refer to the contents of the AUX-TOC stored in the TOC area of the buffer memory 13 to grasp presence or absence of a cover picture, the order of reproduction of the tracks TR #1→#2→#3, that is, the reproduction outputting order of the AUX data files corresponding to the order of reproduction on the time base, and reproduction outputting timings of the AUX data files. Here, however, only picture files are used for the AUX data files for the convenience of description.

Further, the recording and reproduction apparatus of the present embodiment can set weighting in requirement degree which represents a preferential order to fetch the AUX data files into the buffer memory 13 based on a reproduction outputting order grasped based on the contents of the AUX-TOC. In this instance, the fetching preferential order into the buffer memory 13 is determined in such a manner as indicated by reference symbols I to VI applied to the picture files illustrated in FIG. 23D. Here, the reason why no preferential order number is applied to the picture file Picture #3 to be reproduced in synchronism with the track TR #3 is that it is determined that the preferential order number of the picture file Picture #3 is 5 since it is prescribed that the picture file Picture #3 be reproduced in synchronism with the track TR #2 precedently. In other words, in order to reproduce the picture file Picture #3 in synchronism upon reproduction of the track TR #3, data of the picture file Picture #3 which have been fetched into the buffer memory 13 already for reproduction of the track TR #2 can be utilized, and there is no need of reading out the picture file Picture #3 again from the disc upon reproduction of the track TR #3.

In the case of the disc shown in FIGS. 23A, 23B, 23C, 23D and 23E, the picture file Picture #0 is prescribed as a cover picture as described hereinabove. Therefore, the recording and reproduction apparatus reads out, in a stage before starting of reproduction, data of at least the picture file Picture #0 from the AUX data area of the disc and stores the data into the AUX data area of the buffer memory 13. Then, the recording and reproduction apparatus makes use of the data stored in the buffer memory 13 to display or output the cover picture in such a manner as seen from FIGS. 23A, 23B, 23C, 23D and 23E.

Then, for example, if a reproducing operation is performed by the user while a cover picture is displayed or outputted in such a manner as described above, then the recording and reproduction apparatus reads out ATRAC data of the disc, stores them into the buffer memory 13 through the decoder 8, reads out the stored ATRAC data, performs decompression processing and so forth for the ATRAC data by means of the audio compression decoder 14 and outputs resulting data as reproduction sound.

Figure 28:
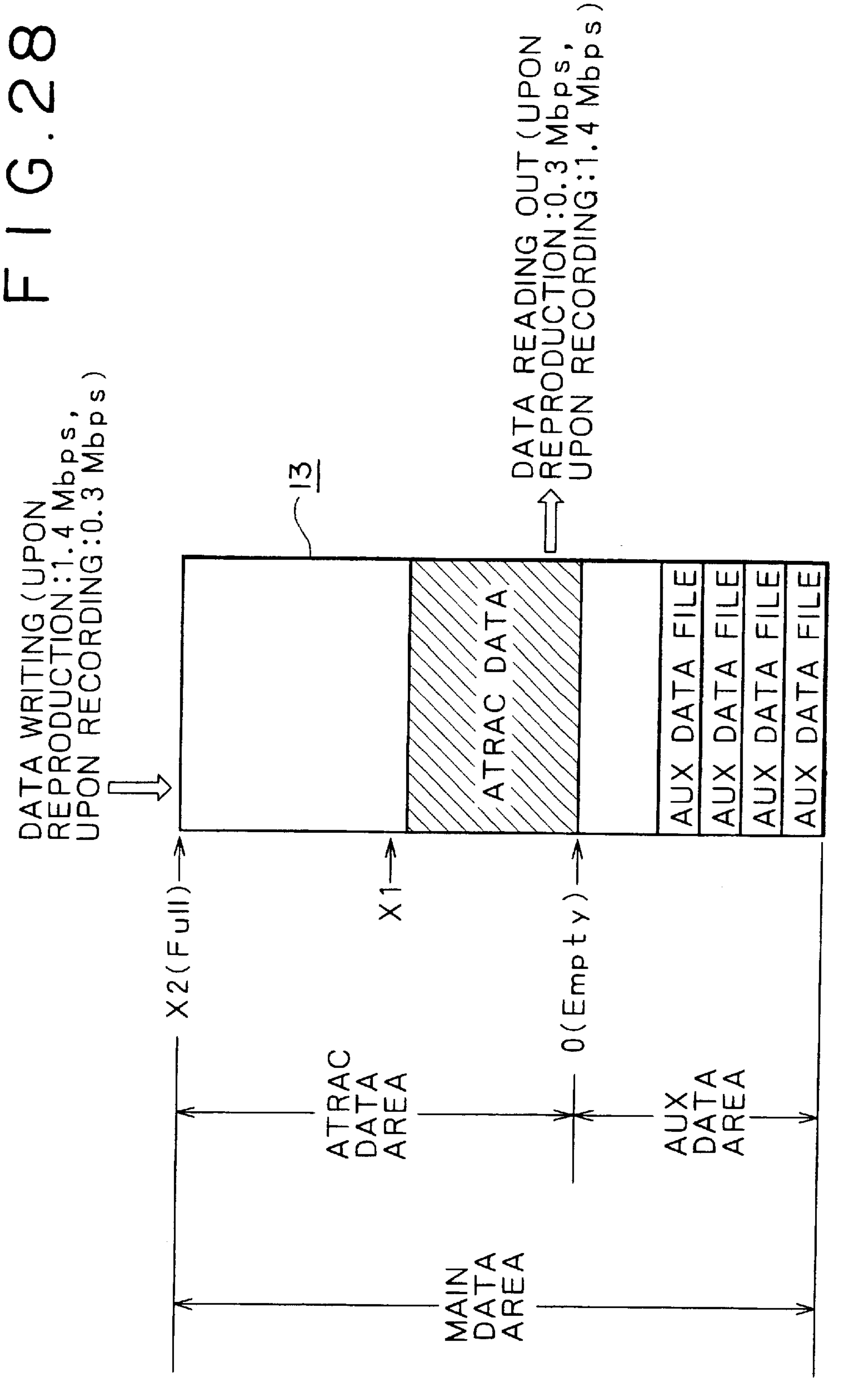
FIG. 28 is a diagrammatic view illustrating writing and reading out operations upon recording and reproduction into and from an ATRAC data area of the buffer memory.

FIG. 28 shows a data allocation structure of the main data area of the buffer memory 13 into which ATRAC data are to be stored.

As described hereinabove, upon reproduction, ATRAC data are written at a transfer rate of 1.4 Mbps into the buffer memory 13 and read out at another transfer rate of 0.3 Mbps which is lower than that upon writing. Due to the difference between the transfer rates, upon reproduction, the stored amount of ATRAC data in the buffer memory 13 has a tendency to increase, for example, unless a read error from the disc occurs frequently. Then, at a certain point of time, the stored amount in the ATRAC data area reaches a full level denoted at ×2 in FIG. 28. If this state is reached, then while reading out of ATRAC data from the buffer memory 13 is continued, the reading out operation from the disc is stopped. Thereafter, when the stored amount of ATRAC data in the ATRAC data are set in advance decreases to a value, for example, as denoted by ×1 in FIG. 28, reading out of ATRAC data from the disc is started again. In other words, intermittent reproduction of the disc is performed in response to the stored amount of ATRAC data in the buffer memory 13.

In the present embodiment, for a period after reading out of ATRAC data from the disc stops in the intermittent reproduction operation until the stored amount of ATRAC data decreases to the value denoted by ×1 in FIG. 28, an AUX data file which has not been stored into the buffer memory 13 as yet is read out from the disc in accordance with the fetching preferential order described hereinabove and stored into the buffer memory 13.

For example, according to the foregoing description, the cover picture which is the picture file Picture #3 to which the preferential order number I is set is stored into the buffer memory 13 in a stage prior to reproduction of the track of the ATRAC data as audio data. Therefore, in the recording and reproduction apparatus, a reading out stopping period of ATRAC data from the disc after track reproduction is started is made use of to successively fetch the picture file Picture #1 to which the preferential order number II is given, the picture file Picture #2 of the preferential order number III, the picture file Picture #4 of the preferential order number IV, the picture file Picture #3 of the preferential order number V and the picture file Picture #5 of the preferential order number VI. Then, if storage of all of the AUX data files up to the picture file Picture #5 of the preferential order number VI is completed at a certain point of time during track reproduction, then the reading out operation of AUX data from the disc within a reading out stopping period of ATRAC data during track reproduction is stopped.

If storage of a certain AUX data file into the buffer memory 13 is completed by reproduction outputting starting time of the AUX data file by performing the operation of successively reading out AUX data files from the disc and storing them into the buffer memory 13 within reading out stopping periods of ATRAC data from the disc in such a manner as described above, then the AUX data file can be displayed at an accurate timing in accordance with the time of procedure of track reproduction.

More particularly, for example, if at least an operation of reading out the picture file Picture #1 from the disc and storing it into the buffer memory 13 is completed for a time from a reproduction starting time of the track TR #1 whose reproduction time is T1 as seen in FIG. 23C till a reproduction T1+f(L1), then synchronized reproduction of the picture file Picture #1 is started appropriately at the reproduction time T1+f(L1).

Then, such a manner of reading out of AUX data files as described above eliminates the necessity for reading in all AUX data files required for synchronized reproduction prior to starting of track reproduction. Consequently, the waiting time from a point of time at which the disc is loaded to a point of time at which track reproduction is enabled can be reduced as much.

It is to be noted that, for example, if it is prescribed that an AUX data file be reproduced and outputted simultaneously with starting of a track or if an AUX data file is present which is prescribed so as to be reproduced or outputted comparatively quickly after the point of time of starting of reproduction of a track, then if a reading out stopping period of ATRAC data from the disc is made use of to fetch the AUX data file from the disc as described above, then there is the possibility that storage of the AUX data file into the buffer memory 13 may not be completed by starting time of reproduction outputting, and consequently, displaying outputting may not be performed appropriately from the starting time of reproduction outputting.

In order to avoid this, for example, the recording and reproduction apparatus may be constructed such that an AUX data file which is prescribed to be reproduced or outputted within a predetermined period from a starting time of track reproduction to a certain reproduction time is read out from the disc and stored into the buffer memory 13 in advance in a stage before reproduction of the disc is started after it is loaded. For example, in the case of FIGS. 23A, 23B, 23C, 23D and 23E, the picture file Picture #1 to be reproduced in synchronism with the track TR #1 corresponds to the AUX data file which is prescribed to be reproduced or outputted within a predetermined time from the track reproduction starting time to a certain reproduction time. In such an instance, in a stage preceding to starting of track reproduction, the picture file Picture #1 is read out together with the cover picture of the picture file Picture #0 described hereinabove from the disc and stored into the buffer memory 13.

By the operation just described, for example, if reproduction is stared from the track TR #1, then even if the actual time length till the reproduction starting time T1 to T1+f(L1) (offset start address L1) of the track TR #1 is so short that all data of the picture file Picture #1 cannot be stored into the buffer memory 13 within a total time of reading out stopping time of ATRAC data from the disc, which are usually obtained within the period of the actual time length, the picture file Picture #1 can be reproduced or outputted with certainty from the reproduction starting time T1+f(L1).

In this instance, the amount of data of AUX data files to be read in from the disc before starting of track reproduction increases a little. However, since the data to be read in then are limited to those of minimum but required AUX data files in an initial stage of track reproduction as described above, the increased waiting time is very short and is not felt significantly late by the user. Consequently, there is no particular problem.

Depending upon conditions of size setting of the AUX data area, the capacity of AUX data files to be reproduced in synchronism, and so forth, in a stage before storage of a certain AUX data file into the buffer memory 13 is completed before storage of all AUX data files required for synchronized reproduction into the buffer memory 13 is completed, the free capacity of the AUX data area of the buffer memory 13 becomes so small that storage of a further AUX data file is not allowed any more.

In order to cope with the situation just described, the recording and reproduction apparatus may possibly be constructed such that storage of a further AUX data file is stopped and AUX data files stored already in the buffer memory 13 are utilized to perform synchronized reproduction within a possible range. In this instance, since the AUX data file which has not been stored in the buffer memory 13 is not reproduced or outputted, it is preferable, for example, to display some message so that the user may be informed that the memory has become occupied fully and reading in from the disc has not been performed successfully within the synchronized reproduction period.

It is an alternative possible idea, for example, to erase a picture file which has been reproduced in synchronism with a track reproduced already but is not supposed to be used later to assure a free area of the buffer memory 13 and to read out a picture file, which has not been stored as yet, from the disc and store it into the buffer memory 13. In the case of FIGS. 23A, 23B, 23C, 23D and 23E, this corresponds to an operation of erasing, if the AUX data area of the buffer memory 13 is occupied fully when the picture file Picture #3 of the preferential order number V is read out and stored into the buffer memory 13, for example, all or some of the picture files Picture #1, #2 and #4, which have been reproduced in synchronism with the track TR #1, from the buffer memory 13 to obtain a free capacity of the AUX data area and reading out the picture file Picture #5 from the disc and storing it into the buffer memory 13. In this instance, for example, if the recording and reproduction apparatus is constructed such that not all but some of the picture files Picture #1, #2 and #4 are erased, then it is preferable to erase the picture files

#1, #2 and #4 one by one in the order of, for example, the picture files Picture #4→#2→#1 until a required free capacity is obtained. This is intended to allow an AUX data file, which is positioned at a preceding position with respect to the reproduction time, to remain stored in the buffer memory 13 as long as possible so as to facilitate, for example, head searching of the track TR #1 to be performed upon actual reproduction.

7-2 Processing Operation

Subsequently, the processing operation for realizing a disc reading out operation upon synchronized reproduction described above is described below with reference to the flow charts of FIGS. 29 and 30. The processing illustrated in FIGS. 29 and 30 is executed by the system controller 11.

Figure 29:
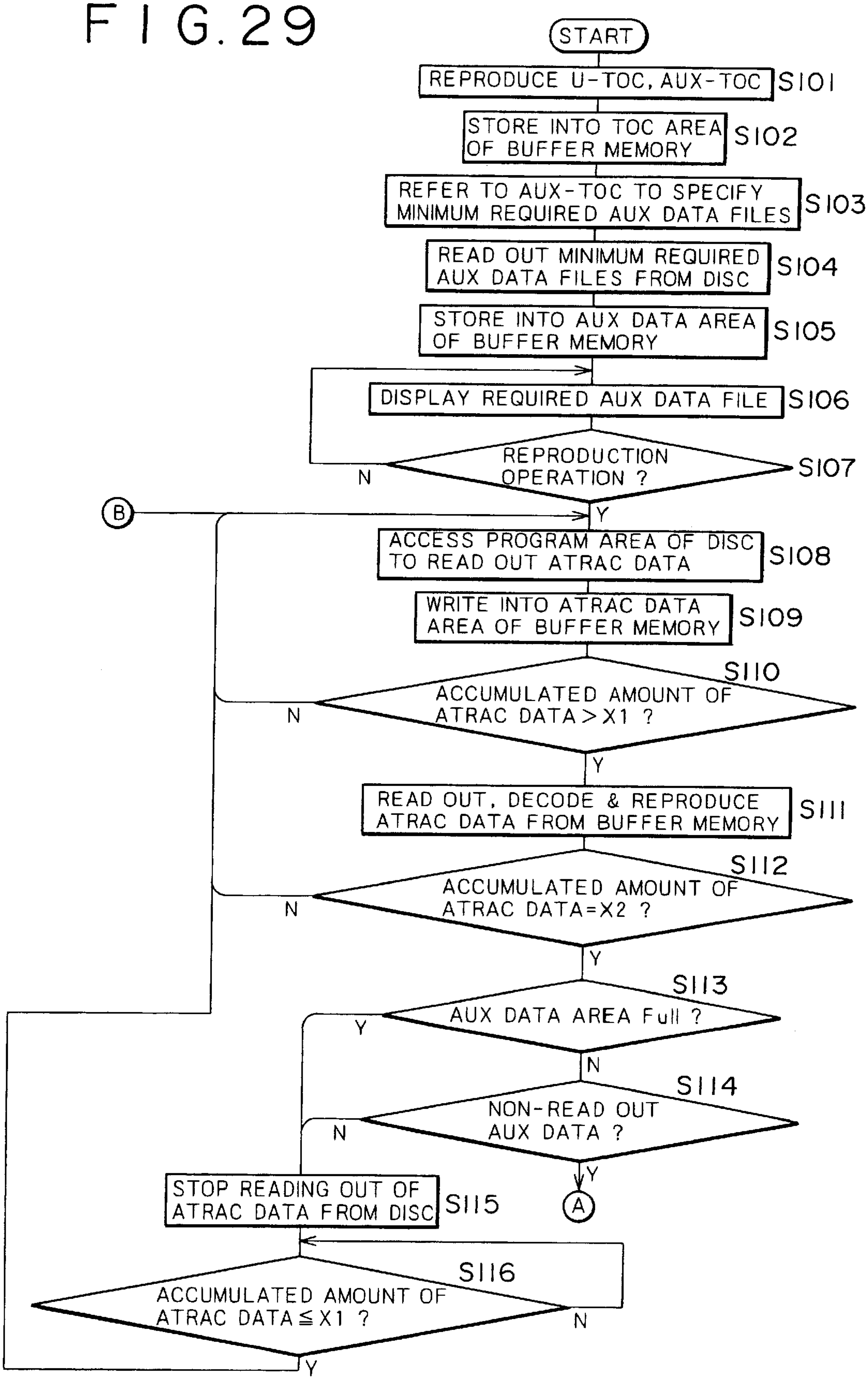
FIGS. 29 and 30 are flow charts illustrating a processing operation for realizing a data reading out operation from a disc upon synchronous reproduction of the recording and reproduction apparatus of FIG. 1.
Figure 30:
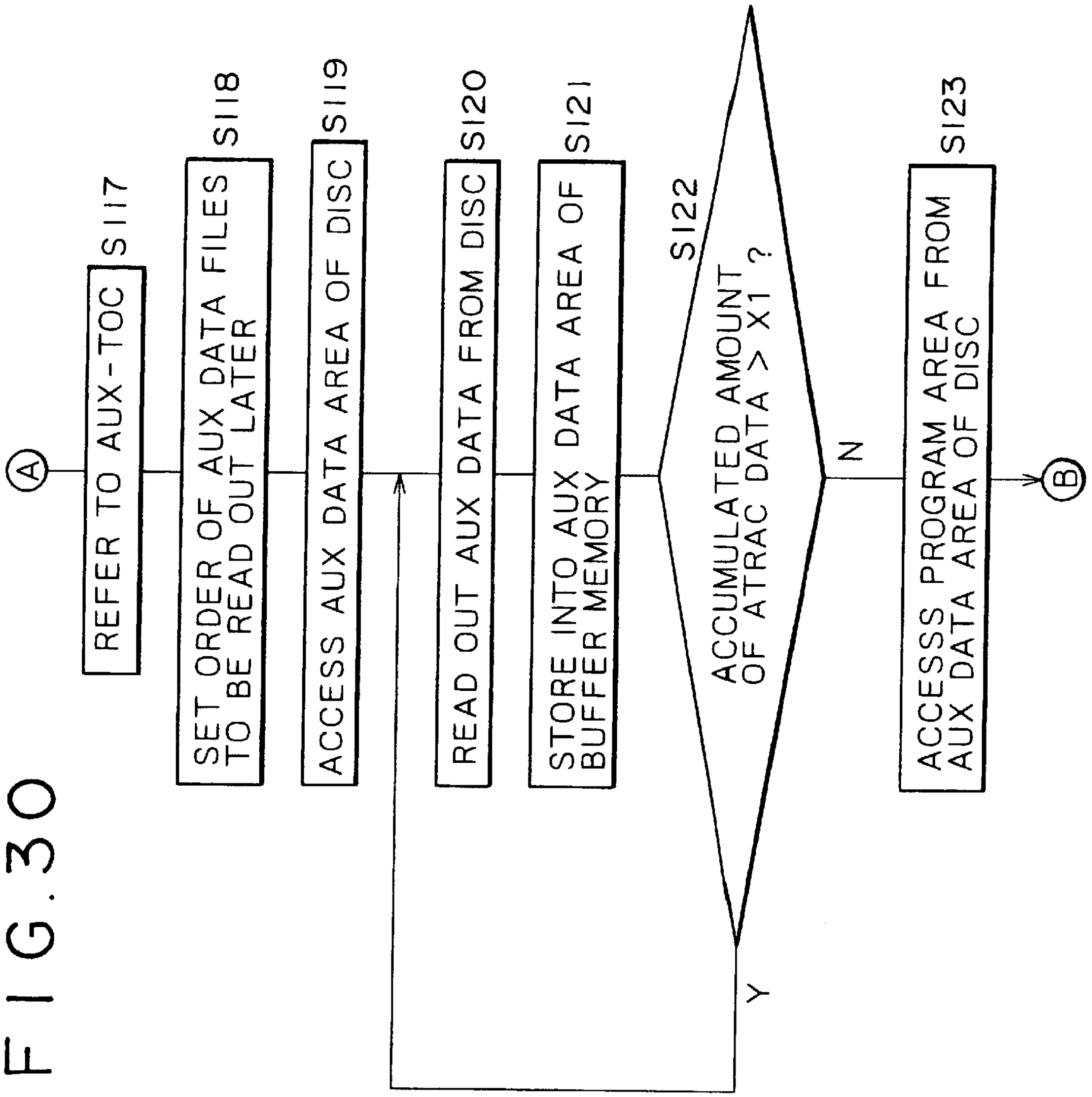

For example, if power supply is made available to the recording and reproduction apparatus after a disc is loaded into the recording and reproduction apparatus or while a disc is loaded in the recording and reproduction apparatus already, then the system controller 11 advances its control to step S101 shown in FIG. 29, in which it accesses the management area of the disc to read out the U-TOC and the AUX-TOC. Then, the system controller 11 advances the control to step S102, in which it stores the U-TOC and the AUX-TOC read out from the disc into the TOC area of the buffer memory 13. Consequently, the system controller 11 can thereafter refer to the U-TOC and the AUX-TOC stored in the TOC area of the buffer memory 13 to execute various control processes for recording and reproduction operations and other various editing operations.

In next step S103, the system controller 11 refers, for example, to contents of the AUX-TOC sector 3 to specify minimum necessary AUX data files to be stored into the buffer memory 13 before track reproduction. Candidates for the minimum required AUX data files described include, if an AUX data file prescribed to be reproduced and outputted before track reproduction such as a cover picture as described above is present, the AUX data file, and another AUX data file which should be reproduced and outputted within a predetermined period which is regarded as an early stage from a reproduction starting point of time of, for example, the track TR #1.

Then, in next step S104, the system controller 11 reads out the AUX data file or files specified by the processing in step S103 from the disc, and then in step S105, the system controller 11 executes processing for storing the AUX data file or files into the AUX data area of the buffer memory 13.

Then, in step S106, the system controller 11 controls so that an AUX data file prescribed so as to be displayed before starting of track reproduction such as, for example, a cover picture, may be reproduced, that is, displayed or outputted. Then, while the displaying or outputting is continued, the system controller 11 waits until an operation for track reproduction is performed by a user.

If it is discriminated in step S107 that an operation for track reproduction is performed, then the system controller 11 advances the control to step S108, in which it refers, for example, to the U-TOC sector 1 to access a required address of the program area of the disc to read out ATRAC data as data of the track. Then in next step S109, the system controller 11 writes the ATRAC data read out in step S108 described above into the ATRAC data area of the buffer memory 13. The writing rate in this instance is 1.4 Mbps as described with reference to FIG. 28 above. It is to be noted that, in this initial stage of reproduction, reading out of ATRAC data from the buffer memory 13 is not started as yet, and accordingly, a state wherein ATRAC data are merely accumulated in the ATRAC data area of the buffer memory 13 as ATRAC data are written into the buffer memory 13 is obtained.

Then in step S110, the system controller 11 discriminates whether or not the accumulated amount of ATRAC data in the ATRAC data area of the buffer memory 13 exceeds the predetermined X1. For the accumulated amount X1, a value is set which corresponds to an accumulated data amount with which, even if writing of ATRAC data as read out data from the disc into the buffer memory 13 is stopped, the vibration withstanding function is maintained because reproduction sound corresponding to a required time is obtained from data read out from the buffer memory 13. While a negative result is obtained in step S110, the processing operations in steps S108 and S109 described above are repeated to continue an accumulation operation of ATRAC data into the ATRAC data area of the buffer memory 13.

Then, if an affirmative result is obtained soon in step S110, then the system controller 11 advances the control to step S111, in which it starts reading out of the ATRAC data at 0.3 Mbps from the buffer memory 13. Decoding processing principally including ATRAC decompression processing is performed for the thus read out data, and resulting data are reproduced and outputted as an audio signal.

In the following steps beginning with step S111, both of writing and reading out operations of ATRAC data into and from the buffer memory 13 are performed. Since the writing rate of 1.4 Mbps is higher than the reading out rate of 0.3 Mbps, within a period within which a reproduction operation from the disc is executed appropriately, the accumulated amount of ATRAC data in the buffer memory 13 gradually increases, for example, at a rate corresponding to 1.1 Mbps.

Thus, in next step S112, it is discriminated whether or not the accumulated amount of ATRAC data in the ATRAC data area of the buffer memory 13 is equal to the value X2 illustrated in FIG. 28, that is, a fully stored state. The processing in steps S108 to S111 is repeated until an affirmative result is obtained in step S112. In other words, an operation of reading in of ATRAC data from the disc into the buffer memory 13 and an operation of audio reproduction of ATRAC data read out from the buffer memory 13 are executed.

Then, if an affirmative result is obtained in step S112, then the system controller 11 advances the control to step S113, in which it discriminates whether or not the storage capacity of the AUX data area of the buffer memory 13 at present is the full state. Here, if it is discriminated that the storage capacity of the AUX data area of the buffer memory 13 is the full state, then the system controller 11 advances the control to step S115, but if it is discriminated that the storage capacity is not the full state, then the system controller 11 advances the control to step S114. In step S114, the system controller 11 discriminates whether or not there remains a data file which has not been read out from the disc as yet from among all AUX data files required for synchronized reproduction. Here, if an affirmative result is obtained, then the system controller 11 advances the control to step S117 illustrated in FIG. 30, but if a negative result is obtained, then the system controller 11 advances the control to step S115.

When the step 115 is reached, the ATRAC data area of the buffer memory 13 is in the full state. Therefore, in step S115, the system controller 11 stops the reading out operation of ATRAC data from the disc, and then in step S116, the system controller 11 waits, for example, until the accumulated amount of ATRAC data becomes equal to or smaller than the value X1. However, in order that the ATRAC data area of the buffer memory 13 may keep an accumulated state as near as possible to the full state, the accumulated amount of ATRAC data for discrimination in step S116 may actually be set to a value higher than the value X1 and comparatively near to the full state.

Then, if an affirmative result is obtained in step S116, then the system controller 11 returns the control to the processing of step S108.

Here, the processing in the steps from step S113 or S114 through steps S115→S116 back to step S108 signifies that an operation for storing an AUX data file read out from the disc into the buffer memory 13 is not executed any more, but a reading out operation from the disc for ordinary track reproduction is executed.

If an affirmative result is obtained in step S114, then the system controller 11 advances the control to step S117 illustrated in FIG. 30. In step S117, the system controller 11 refers to contents of, for example, the AUX-TOC sector 3, and then in step S118, the system controller 11 executes processing for determining a preferential order of data files to be read out later based on the referred contents of the AUX-TOC sector 3. The data files to be read out are data files which are required for synchronized reproduction and have not been stored into the buffer memory 13 as yet.

Then in step S119, the system controller 11 accesses the AUX data area of the disc. Consequently, reading out of ATRAC data from the program area of the disc which has been performed till then is stopped.

Then in next step S120, the system controller 11 performs reading out of an AUX data file from the disc in accordance with the preferential order determined in step S118 described above. The AUX data file read out from the disc is stored into the AUX data area of the buffer memory 13 by processing in step S121. The processing in steps S120 and S122 is repeated as long as it is discriminated in step S122 by the system controller 11 that the accumulated amount of ATRAC data in the buffer memory 13 is greater than the value X1. Then, when it is discriminated in step S122 that the accumulated amount of ATRAC data is equal to or smaller than the value X1, then the system controller 11 advances the control to step S123, in which it stops the reading out operation of an ATRAC data file from the AUX data area of the disc till then and accesses the program area of the disc, whereafter the system controller 11 returns the control to step S108 described above.

While the processing in steps S117 to S121 is repeated each time the accumulated amount of ATRAC data in the buffer memory 13 becomes the full state, all AUX data files required for synchronized reproduction are finally written from the disc into the buffer memory 13.

It is to be noted that the processing routine shown in FIGS. 29 and 30 is ended if reproduction of all tracks comes to an end or a reproduction stopping operation is performed by the user. Further, although description with reference to a flow chart is omitted here, control processing for causing synchronized reproduction of AUX data files with tracks to be performed as prescribed by contents of description of the AUX-TOC sector 3 is executed by the system controller 11 in parallel to the processing operation described hereinabove with reference to FIGS. 29 and 30.

It is to be noted that, while, in the present embodiment, two kinds of files including a picture file and a text file are prescribed as the AUX data files as described hereinabove, since a text file is formatted such that a time stamp as synchronized reproduction information is embedded in a structure of the text file itself, in order to effect synchronized reproduction of text files, basically it is required to read out all text files from a disc and store them into the buffer memory 13 before track reproduction is started and then scan the text files stored in the buffer memory 13 to read out the time stamps to grasp information of the synchronized reproduction timings in a reproduction outputting order. Accordingly, in the present embodiment, the data reading out processing illustrated in FIGS. 29 and 30 is performed for picture files, but it is difficult to perform the data reading out processing for text files. However, the processing illustrated in FIGS. 29 and 30 can be applied to text files if the preferential order in file fetching determined based on synchronized reproduction timings is ignored and, for example, fetching into the buffer memory 13 is performed in an order of text file numbers or a management manner of synchronized reproduction similar to that with the AUX-TOC sector 3 is adopted also for text files.

8. Program/Data File Simultaneous Recording Operation

8-1 Outline of Operation

When audio data are recorded onto a disc using the recording and reproduction apparatus of the present embodiment, the transfer rate when ATRAC data are transferred from the audio compression decoder 14 and written into the ATRAC data area of the buffer memory 13 is 0.3 Mbps and the transfer rate as the reading out rate from the buffer memory 13 when data are read out from the buffer memory 13 and recorded onto the disc through the encoder 8 is 1.4 Mbps as seen from FIG. 28.

Upon recording, for example, in a normal state wherein a recording error caused by a fault such as a disturbance little occurs, the accumulated amount of ATRAC data in the buffer memory 13 has a decreasing tendency because the data writing rate and the data reading out rate into and from the buffer memory 13 are different from each other as described above, and at a certain point of time, a state wherein the accumulated amount of ATRAC data in the buffer memory 13 becomes equal to 0, that is, becomes empty, is reached. After this state is reached, while the accumulation of ATRAC data as recording data into the buffer memory 13 is continued, recording of ATRAC data onto the disc, that is, reading out of data from the buffer memory 13, is interrupted. Then, while recording of ATRAC data onto the disc stops, the capacity of ATRAC data accumulated in the buffer memory 13 is supervised, and when the accumulated amount reaches, for example, the level X1 in FIG. 28, an operation of reading out ATRAC data from the buffer memory 13 and recording the ATRAC data onto the disc is resumed. In other words, also data recording onto the disc is performed intermittently. It is to be noted that the value X1 here need not necessarily be equal to the value X1 set upon reproduction described above.

Thus, in the present embodiment, the recording and reproduction apparatus is constructed such that, upon recording of ATRAC data, picture files or text files as AUX data files required to be recorded onto a disc are stored into the AUX data area of the buffer memory 13 and, when a period wherein recording of ATRAC data onto the disc described above is interrupted comes, an AUX data file stored in the buffer memory 13 is read out and recorded into the AUX data area of the disc.

The intermittent recording operation described above is considered to be an operation which is inevitably necessitated, in the recording and reproduction apparatus of the present embodiment, by a difference between the writing and reading out rates into and from the buffer memory 13. Accordingly, if the recording and reproduction apparatus is constructed such that an AUX data file is recorded together with ATRAC data as described above, then also recording of an AUX data file can be performed within a period required to record ATRAC data. Conversely speaking, there is no need of performing recording of an AUX data file in an opportunity different from that of recording of ATRAC data, and while ATRAC data are recorded, also an AUX data file can be recorded simultaneously. Accordingly, to the user, an increase in efficiency in time can be achieved and the convenience of use can be augmented as much.

It is to be noted that such a recording operation as described above can be performed not only for a picture file but also for a text file similarly as an AUX data file.

8-2 Processing Operation

Figure 31:
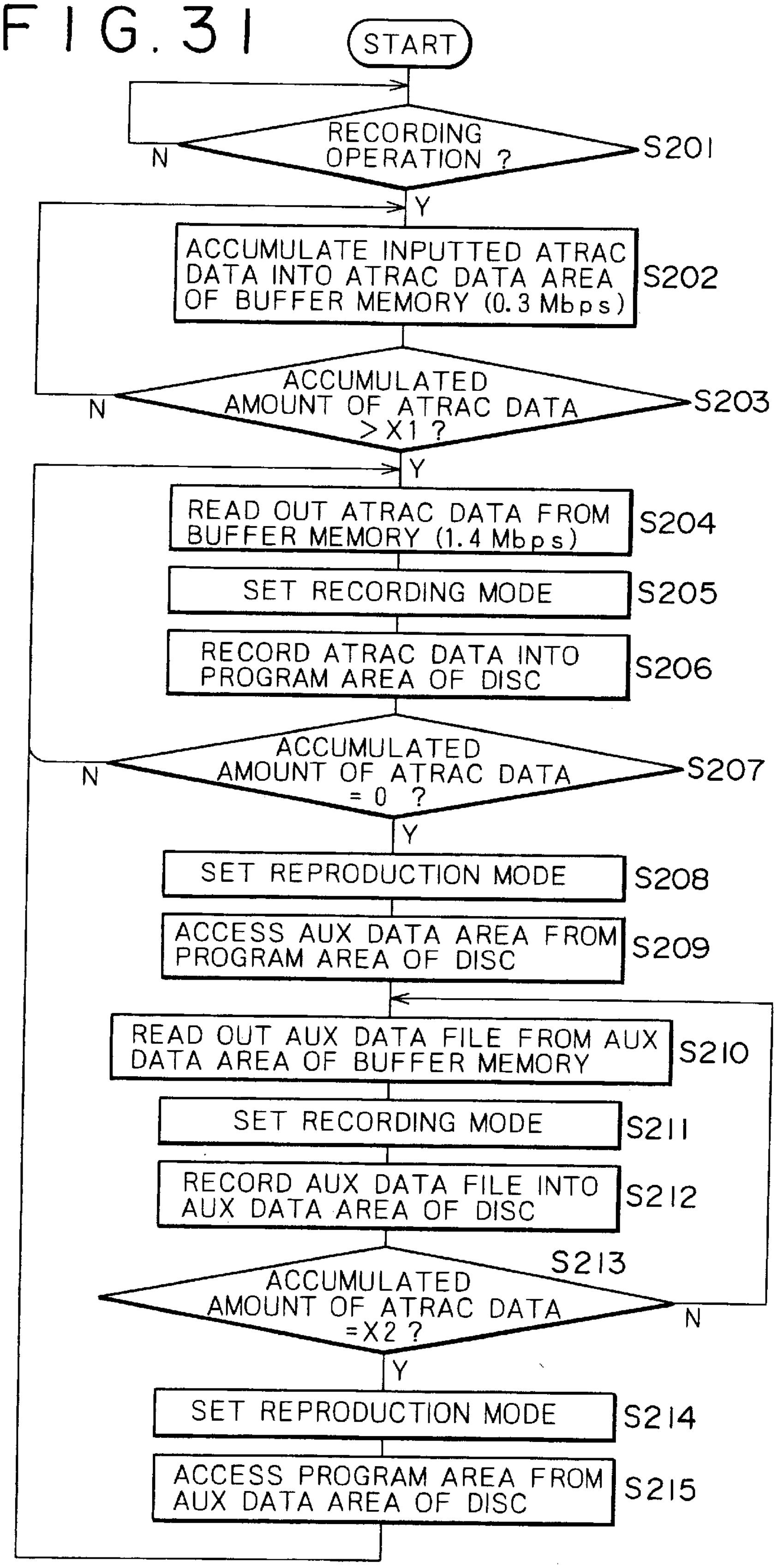
FIG. 31 is a flow chart illustrating a processing operation for realizing simultaneous recording of ATRAC data and an AUX data file of the recording and reproduction apparatus of FIG. 1.

FIG. 31 is a flow chart illustrating a processing operation of the system controller 11 for realizing the recording operation described above. It is to be noted here that it is presumed that, in a stage before a recording operation is started, AUX data files as recorded data are stored in the buffer memory 13 already.

In the routine shown in FIG. 31, the system controller 11 waits, first in step S201, that a recording operation is performed, for example, by a predetermined operation of the operation section 23 by the user. If the system controller 11 discriminates that a recording operation is performed, then it advances the control to step S202.

In step S202, the system controller 11 executes processing for writing ATRAC data inputted as recording data and transferred through the audio compression decoder 14 into the ATRAC data area of the buffer memory 13. Here, the data writing rate into the buffer memory 13 is 0.3 Mbps as described hereinabove, and in the processing state in step S202, data reading out from the buffer memory 13 is not performed, but an operation only of accumulation of data written into the ATRAC data area occurs with the buffer memory 13.

The data accumulation operation in step S202 is performed until it is discriminated in step S203 that the accumulated amount of ATRAC data exceeds the value X1. If it is discriminated that the value X1 is exceeded, then the system controller 11 advances the control to step S204.

In step S204, the system controller 11 starts reading out of ATRAC data from the buffer memory 13. The reading out rate then is 1.4 Mbps as described hereinabove.

Before this stage, the optical head 3 already accesses an address of a recording starting position of the program area of the disc. Then, in step S205 next to step S204, the system controller 11 first sets a recording mode. In particular, the system controller 11 establishes a set condition wherein various characteristics such as a laser power and a servo gain are suitable for a recording operation. Then, the system controller 11 advances the control to step S206, in which it records ATRAC data read out from the buffer memory 13 by the processing in step S204 described above into the program area of the disc.

In step S207, the system controller 11 discriminates whether or not a condition wherein the accumulated amount of ATRAC data in the buffer memory 13 is 0, that is, the buffer memory 13 is empty, is reached. If the system controller 11 discriminates that the empty condition is reached, then it returns the control to the processing of step S204 to repeat recording of ATRAC data onto the disc.

Then, if the system controller 11 discriminates in step S207 that the condition wherein the accumulated amount of ATRAC data in the buffer memory 13 is 0 (empty) is reached, then it advances the control to step S208.

In step S208, the system controller 11 executes processing for switching the mode from the recording mode to a reproduction mode. In other words, the system controller 11 ends the recording operation till then and performs setting to a condition wherein required characteristics such as a laser power are suitable for a reproduction operation. Consequently, even if the optical head 3 is moved for seeking, recorded data on the disc are not destroyed. Then in next step S209, the system controller 11 executes control processing for accessing an address as a recording starting position of the AUX data area from the program area which has been accessed by the optical head 3 till then.

In next step S210, the system controller 11 performs reading out of the AUX data files as recorded data stored in the AUX data area of the buffer memory 13.

Then, the system controller 11 sets the recording mode in next step S211 and then advances the control to step S212, in which it executes control processing for recording the AUX data file read out from the buffer memory 13 into the AUX data area of the disc.

Since reading out of ATRAC data from the buffer memory 13 is not performed while the processing in steps S210 to 212 described above is successively performed, the accumulated amount of ATRAC data in the ATRAC data area in the buffer memory 13 gradually increases.

Therefore, in step S213 next to step S212, the system controller 11 waits that the accumulated amount of ATRAC data becomes equal to the value X2, that is, the full state illustrated in FIG. 28. Here, the processing in steps S210 to S212 described above is repeated to continue recording of AUX data files until the system controller 11 discriminates that the accumulated amount of ATRAC data reaches the value X2. It is to be noted that, if recording of all AUX data files to be recorded onto the disc is completed by the processing in steps S210 to S212, then the recording operation should be stopped immediately and then it should be waited that the accumulated amount of ATRAC data becomes equal to the value X2 by the processing in step S213. In other words, the processing in steps S210 to S212 should be omitted in the process of a series of repetitions illustrated in steps S210 to S213.

If the system controller 11 discriminates in step S213 that the accumulated amount of ATRAC data in the buffer memory 13 reaches the value X2, then it advances the control to step S214.

In step S214, the system controller 11 sets the reproduction mode, and then in step S215, the system controller 11 accesses an address as a recording position of the program area from the AUX program area of the disc which has been accessed till then. Then, the system controller 11 returns the control to the processing in step S204. The routine illustrated in FIG. 31 is ended when, for example, information of a request to stop recording is obtained in response to a recording stopping operation by the user.

It is to be noted that, while, in the present embodiment, it is described that ATRAC data as audio data which are program data as main data and AUX data files as sub data are accumulated into the buffer memory 13 upon recording and reproduction, the present invention is not limited to this, and for example, the recording and reproduction apparatus may be constructed otherwise such that, for example, a memory into which AUX data files are stored exclusively is provided separately from the buffer memory 13. Further, where a plurality of different kinds of data files are prescribed as AUX data files as in the present embodiment, a memory for exclusive use may be provided for each of the data files.

The buffer memory 13 may be omitted in order to reduce the number of parts to reduce the size or the cost of the apparatus although it is difficult to reproduce sub data in a fully synchronized relationship with main data at a timing indicated by the AUX-TOC. In this instance, the file size of sub data is made small or sub data are reproduced at a high rate so as to allow sub data to be read in except periods within which main data are read out intermittently to make it possible to reproduce the sub data in a substantially synchronized relationship with the main data.

Further, the present invention is not limited to the construction described above and can be modified in various manners. For example, the reading out operation from a disc upon synchronized reproduction described hereinabove can be applied also to a reproduction only apparatus by which an AUX data file can be reproduced in synchronism with a program. Further, the recording operation described hereinabove with reference to FIG. 31 can be applied also to a recording only apparatus for use with a disc onto which audio data as a program and an AUX data file can be recorded.

Further, while the embodiment described above is a mini disc system as a recording and reproduction apparatus, the present invention can be applied to a recording or reproduction apparatus by which a disc of a different type can be recorded or reproduced.

As described above, a reproduction apparatus of the present invention is constructed such that, for example, within a period within which the accumulated amount of a buffer memory upon reproduction of programs which are audio data as main data is greater than a predetermined level such as a fully stored state and reading out of data from the disc is stopped, data files such as image information which are sub data required for synchronized reproduction with the audio data are read out in a preferential order in accordance with a synchronized reproduction order from the disc.

This construction makes it possible to successively acquire data files necessary for synchronized reproduction while reproduction outputting of a track of a program is performed, and realizes also to appropriately perform synchronized reproduction of a data file with respect to a track substantially with certainty. Consequently, it is not necessary to read in all data files necessary for synchronized reproduction from the disc in a stage before starting of track reproduction. This reduces the waiting time, before starting of track reproduction is enabled after the disc is loaded, for example, and the convenience of use of the reproduction apparatus to the user is augmented as much.

Further, with the construction described above, since a data file is required only to be read in before a time at which synchronized reproduction of it is required, the capacity of the memory into which sub data are to be recorded in advance can be reduced. Further, where the capacity of sub data is small, an alternative construction is possible wherein a buffer memory into which a data file is to be read is not required. The construction just described allows reduction of the number of parts and miniaturization of the apparatus and besides reduction of the power consumption.

Further, where the construction described above includes a memory serving as data file storage means for storing a data file read out from a recording medium, a data file read out once from the disc can be stored and held in the memory. In this instance, upon synchronized reproduction, the data file held in the memory can be read out. For example, if a data file required at a certain synchronized reproduction timing and stored in the memory is required for later certain synchronized reproduction, then the data file should be read out from the memory and reproduced or outputted. Accordingly, there is no need of reading in the same data file from the disc again, and the reliability of synchronized reproduction can be raised.

A recording apparatus of the present invention is constructed such that, within a period within which the accumulated amount of a buffer memory upon recording of programs which are, for example, audio data as main data is smaller than a predetermined level, for example, an empty state and data recording onto the disc is stopped, a data file, for example, as image data or text data, that is, sub data, is recorded onto the disc. Consequently, the recording apparatus is provided with a function of performing recording of a data file simultaneously with recording of data of a program. In other words, the restriction that recording of a program and recording of a data file must be performed at separate timings from each other is eliminated, and recording can be performed in the same opportunity. Consequently, for example, the total time required for recording of program data and recording of data files is reduced, and an increase in efficiency in data recording can be achieved. Also in this regard, the convenience of use can be augmented.

While a preferred embodiment of the present invention has been described using specific terms, such description is for illustrative purposes only, and it is to be understood that changes and variations may be made without departing from the spirit or scope of the following claims.

What is claimed is:

1. A reproduction apparatus for playing back a recording medium, on which one or a plurality of main data to be reproduced continuously with respect to time, main management data to be used for management of recorded positions of the main data, one or a plurality of sub data, and sub management data to be used for management of recorded positions and reproduction operation definitions of the sub data are recorded, based on the main management data to intermittently perform reading of the main data from the recording medium, comprising:

main data storage means for temporarily storing the main data read from the recording medium; and control means for intermittently reading the main data from the recording medium based on the main management data and storing the main data into said main data storage means, and for reading the sub data from the recording medium based on the sub management data within a period within which the reading of the main data is not performed and reproducing the sub data in a synchronized or non-synchronized relationship with the reproduction of the main data based on the reproduction operation definitions of the sub data managed with the sub management data.

2. A reproduction apparatus according to claim 1, wherein the sub management data include, for each of the sub data, a main data identifier for designating one of the main data with which the corresponding sub data is to be reproduced in synchronism, and a sub reproduction period within which the sub data is to be reproduced, the sub reproduction period being indicated by a start address and an end address.

3. A reproduction apparatus according to claim 2, wherein the start address is indicated by a relative value from a reproduction starting point of the main data designated by the main data identifier.

4. A reproduction apparatus according to claim 2, wherein any of the sub data whose main data identifier has a prescribed value is reproduced in a nonsynchronized relationship with the main data.

5. A reproduction apparatus according to claim 1, wherein the sub data are image data.

6. A reproduction apparatus according to claim 1, wherein the sub data are character data.

7. A reproduction apparatus according to claim 1, wherein the sub data are image data or character data relating to the recording medium.

8. A reproduction apparatus according to claim 1, wherein the rate at which the main data are read from said main data storage means is lower than the rate at which the main data are read from the recording medium.

9. A reproduction apparatus according to claim 1, further comprising sub data storage means for temporarily storing the sub data read from the recording medium, and wherein the sub data are read from said sub data storage means and reproduced.

10. A reproduction apparatus according to claim 9, wherein, when said sub data storage means has no free area, part or all of the sub data stored in said sub data storage means are erased.

11. A reproduction apparatus according to claim 10, wherein the erasure of the sub data from said sub data storage means is performed beginning with the one of the sub data which is comparatively late in regard to the reproduction time.

12. A reproduction apparatus according to claim 1, further comprising display means for displaying the sub data.

13. A recording apparatus for recording onto a recording medium, which allows recording thereon of one or a plurality of main data inputted continuously with respect to time and one or a plurality of sub data and has main management data to be used for management of recorded positions of the main data and sub management data to be used for management of recorded positions of the sub data, the main data intermittently written based on the main management data, comprising:

main data storage means for temporarily storing the main data; and control means for writing the main data stored in said main data storage means intermittently onto the recording medium based on the main management data, and for writing the sub data onto the recording medium based on the sub management data within a period within which the writing of the main data is not performed.

14. A recording apparatus according to claim 13, wherein the rate at which the main data are stored into said main data storage means is lower than the rate at which the main data are written onto the recording medium.

15. A recording apparatus according to claim 13, further comprising sub data storage means for temporarily storing the sub data, and wherein the sub data stored in said sub data storage means are written onto the recording medium.

16. A recording apparatus according to claim 13, wherein the writing operation onto the recording medium is stopped within a period within which writing of the main data and the sub data onto the recording medium is not performed.

17. A recording apparatus according to claim 13, wherein the sub data are image data.

18. A recording apparatus according to claim 13, wherein the sub data are character data.

19. A reproduction method for playing back a recording medium, on which one or a plurality of main data to be reproduced continuously with respect to time, main management data to be used for management of recorded positions of the main data, one or a plurality of sub data, and sub management data to be used for management of recorded positions and reproduction operation definitions of the sub data are recorded, based on the main management data to intermittently perform reading of the main data from the recording medium, comprising:

intermittently reading the main data from the recording medium based on the main management data, storing the main data into main data storage means provided for temporarily storing the main data, reading the sub data from the recording medium based on the sub management data within a period within which the reading of the main data is not performed, and reproducing the sub data in a synchronized or non-synchronized relationship with the reproduction of the main data based on the reproduction operation definitions of the sub data managed with the sub management data.

20. A reproduction method according to claim 19, wherein the sub management data include, for each of the sub data, a main data identifier for designating one of the main data with which the corresponding sub data is to be reproduced in synchronism, and a sub reproduction period within which the sub data is to be reproduced, the sub reproduction period being indicated by a start address and an end address.

21. A reproduction method according to claim 20, wherein the start address is indicated by a relative value from a reproduction starting point of the main data designated by the main data identifier.

22. A reproduction method according to claim 20, wherein any of the sub data whose main data identifier has a prescribed value is reproduced in a non-synchronized relationship with the main data.

23. A reproduction method according to claim 19, wherein the rate at which the main data are read from said main data storage means is lower than the rate at which the main data are read from the recording medium.

24. A reproduction method according to claim 19, wherein the sub data are read from sub data storage means provided for temporarily storing the sub data read from the recording medium, and reproduced.

25. A reproduction method according to claim 24, further comprising a step of erasing, when said sub data storage means has no free area, part or all of the sub data stored in said sub data storage means.

26. A reproduction method according to claim 25, wherein the erasure of the sub data from said sub data storage means is performed beginning with the one of the sub data which is comparatively late in regard to the reproduction time.

27. A recording method for recording onto a recording medium, which allows recording thereon of one or a plurality of main data inputted continuously with respect to time and one or a plurality of sub data and has main management data to be used for management of recorded positions of the main data and sub management data to be used for management of recorded positions of the sub data, the main data intermittently written based on the main management data, comprising:

writing the main data stored in main data storage means provided for temporarily storing the main data intermittently onto the recording medium based on the main management data, and writing the sub data onto the recording medium based on the sub management data within a period within which the writing of the main data is not performed.

28. A recording method according to claim 27, wherein the rate at which the main data are stored into said main data storage means is lower than the rate at which the main data are written onto the recording medium.

29. A recording method according to claim 27, wherein the sub data stored in sub data storage means provided for temporarily storing the sub data are written onto the recording medium.

30. A recording method according to claim 27, further comprising the steps of:

writing the main data onto the recording medium;

stopping the writing onto the recording medium;

searching for a writing position of the sub data on the recording medium based on the sub management data; and writing the sub data to the writing position on the sub data;

whereby the writing operation onto the recording medium is stopped within a period within which writing of the main data and the sub data onto the recording medium is not performed.

* * * * *